United States Patent
Da Silva et al.

(10) Patent No.: US 12,356,365 B2
(45) Date of Patent: Jul. 8, 2025

(54) METHODS, UE AND FIRST NETWORK NODE FOR HANDLING MOBILITY INFORMATION IN A COMMUNICATIONS NETWORK

(71) Applicant: Telefonaktiebolaget LM Ericsson (publ), Stockholm (SE)

(72) Inventors: Icaro Leonardo J. Da Silva, Solna (SE); Victor Farias Monteiro, Fortaleza (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 281 days.

(21) Appl. No.: 17/781,859

(22) PCT Filed: Dec. 10, 2019

(86) PCT No.: PCT/SE2019/051256
§ 371 (c)(1),
(2) Date: Jun. 2, 2022

(87) PCT Pub. No.: WO2021/118418
PCT Pub. Date: Jun. 17, 2021

(65) Prior Publication Data
US 2023/0025432 A1   Jan. 26, 2023

(51) Int. Cl.
*H04W 36/00* (2009.01)
*H04W 64/00* (2009.01)
*H04W 36/36* (2009.01)

(52) U.S. Cl.
CPC . *H04W 64/006* (2013.01); *H04W 36/008375* (2023.05); *H04W 36/362* (2023.05)

(58) Field of Classification Search
CPC ............ H04W 36/00; H04W 36/0055; H04W 36/0058; H04W 36/0064; H04W 36/00698; H04W 36/08; H04W 36/00837; H04W 36/008375; H04W 36/0085; H04W 36/36;
(Continued)

(56) References Cited

U.S. PATENT DOCUMENTS

| 10,924,915 B2 * | 2/2021 | Dimou .................... H04W 8/08 |
| 11,265,696 B2 * | 3/2022 | Zou ............... H04W 36/008375 |
| 11,272,417 B2 * | 3/2022 | Chen .............. H04W 36/00838 |

(Continued)

FOREIGN PATENT DOCUMENTS

| EP | 2833657 A1 | 2/2015 |
| WO | 2013022392 A1 | 2/2013 |

(Continued)

OTHER PUBLICATIONS

Tayyab et al., A Survey on Handover Management: From LTE to NR, IEEE, 25 pages, Aug. 26, 2019.*

(Continued)

*Primary Examiner* — Frank Duong
(74) *Attorney, Agent, or Firm* — Withrow & Terranova, PLLC

(57) ABSTRACT

The present disclosure relates to a method performed by a User Equipment (UE) for handling mobility information in a communications network. The UE predicts the mobility
(Continued)

information. The UE reports the predicted mobility information to a first network node currently serving the UE in the communications network.

18 Claims, 15 Drawing Sheets

(58) Field of Classification Search
CPC . H04W 36/362; H04W 64/00; H04W 64/006; H04W 76/15; H04W 76/19
See application file for complete search history.

(56) References Cited

U.S. PATENT DOCUMENTS

| 11,490,313 B2 * | 11/2022 | Isaksson | H04W 36/362 |
| 2014/0171106 A1 | 6/2014 | Cheng et al. | |
| 2016/0337842 A1 | 11/2016 | Martin | |
| 2018/0352492 A1 | 12/2018 | Dang et al. | |
| 2022/0217556 A1 * | 7/2022 | Ryden | H04B 17/318 |

FOREIGN PATENT DOCUMENTS

| WO | 2013063371 A1 | 5/2013 |
| WO | 2013156687 A1 | 10/2013 |
| WO | 2014021749 A1 | 2/2014 |
| WO | 2015063371 A1 | 5/2015 |
| WO | 2016055095 A1 | 4/2016 |
| WO | 2019172813 A1 | 9/2019 |

OTHER PUBLICATIONS

Ericsson, 11.9.3 Handover robustness improvements, 3GPP TSG RAN WG2 #105, R2-1900404, 6 pages, Feb. 25,-Mar. 1, 2019.*
Ericsson, Conditional Handover, 3GPP TSG-RAN WG2 #99-bis on NR Tdo, c R2-1710850, 5 pages, Oct. 9-13, 2017.*
Mohamed et al., Mobility Prediction for Handover Management in Cellular Networks with Control/Data Separation, IEEE, 6 pages, 2015.*
Lee et al., Predictionbased Conditional Handover for 5G MM-Wave Networks, IEEE, 9 pages, Jan. 19, 2020.*
European Search Report for European Patent Application No. 19955634.1, mailed Nov. 24, 2022, 4 pages.
Examination Report for European Patent Application No. 19955634.1, mailed Dec. 6, 2022, 8 pages.
Zhang, et al., "Mobility Prediction: A Survey on State-of-the-Art Schemes and Future Applications," IEEE Access, vol. 7, Dec. 10, 2018, pp. 802-822 pages.
International Search Report and Written Opinion for International Patent Application No. PCT/SE2019/051256, mailed Oct. 15, 2020, 13 pages.
Examination Report for European Patent Application No. 19955634.1, mailed Feb. 13, 2025, 4 pages.

* cited by examiner

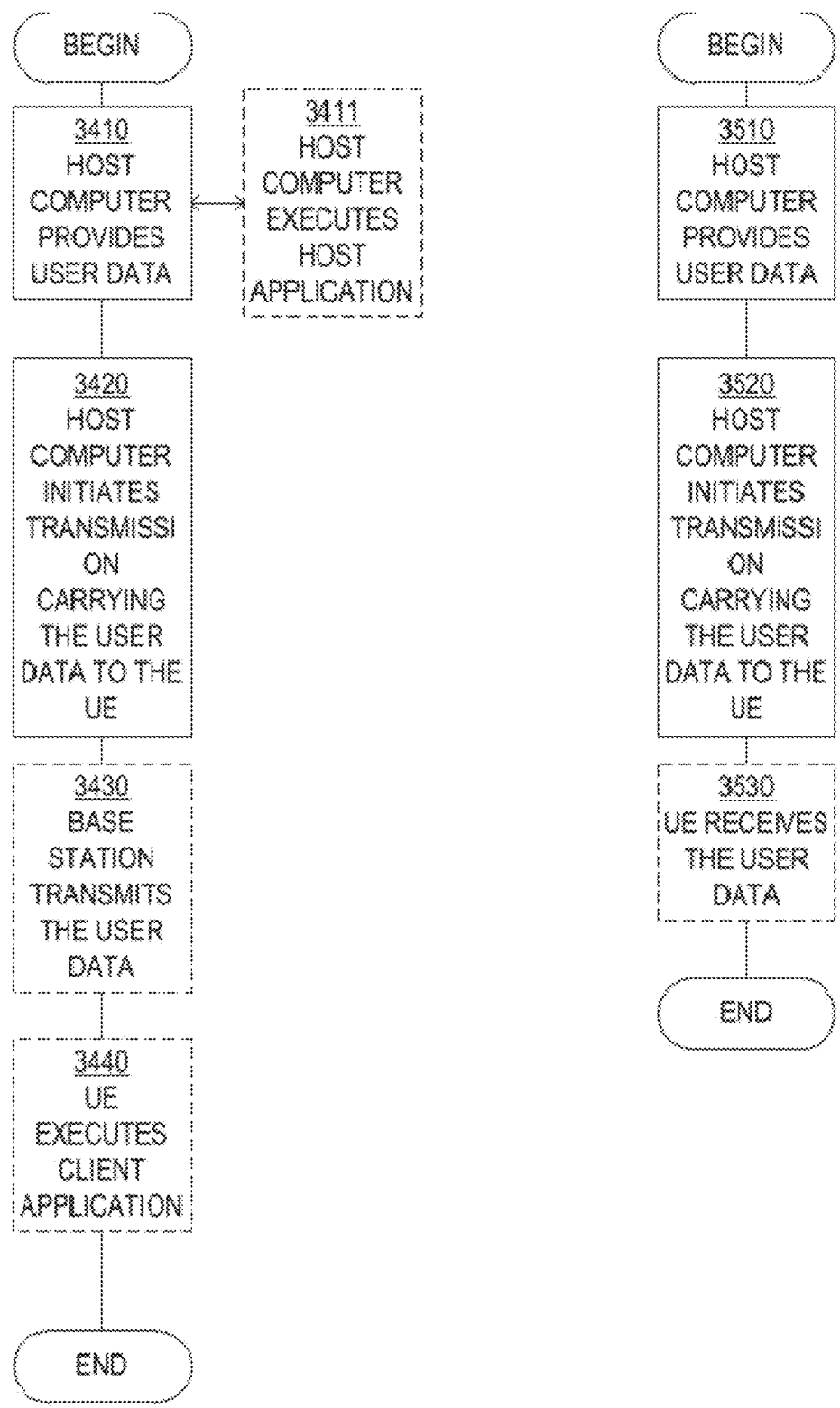

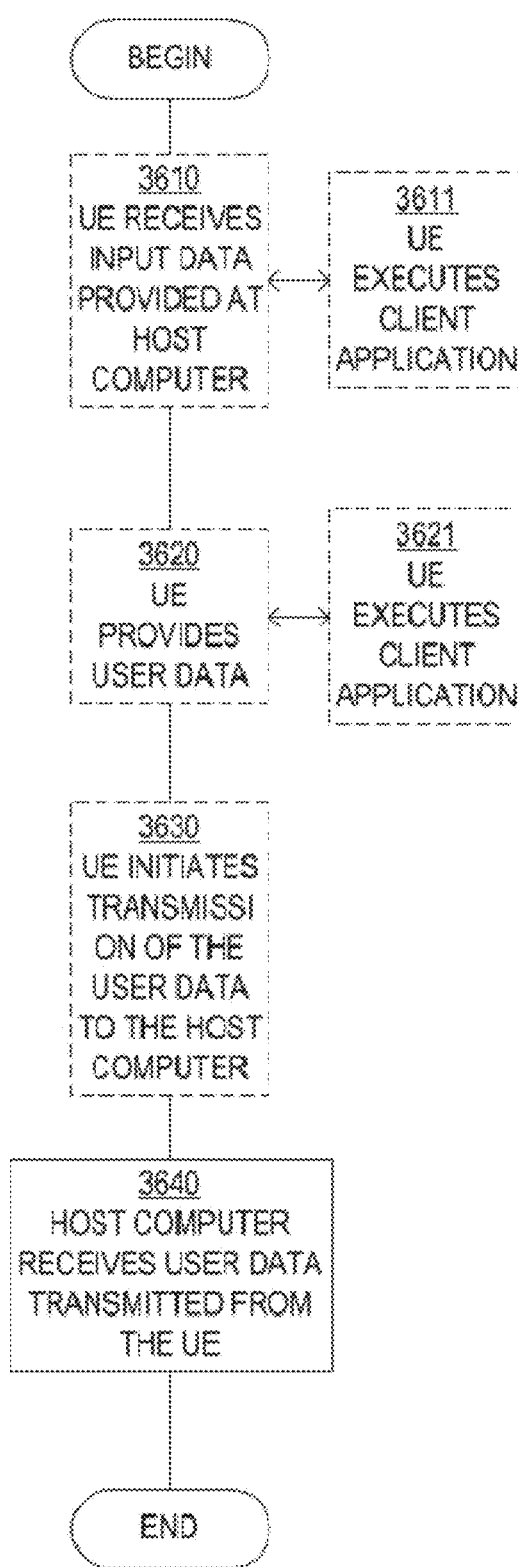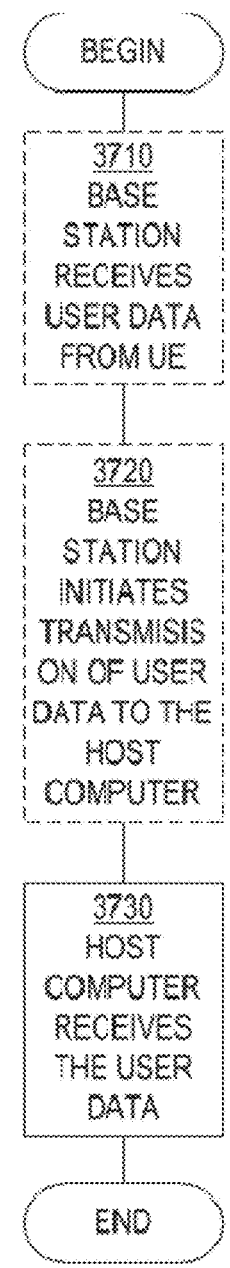
FIG. 15
FIG. 16

METHODS, UE AND FIRST NETWORK NODE FOR HANDLING MOBILITY INFORMATION IN A COMMUNICATIONS NETWORK

This application is a 35 U.S.C. § 371 national phase filing of International Application No. PCT/SE2019/051256, filed Dec. 10, 2019, the disclosure of which is incorporated herein by reference in its entirety.

TECHNICAL FIELD

The present disclosure relate generally to a User Equipment (UE), a method performed by the UE, a first network node and a method performed by the first network node. The present disclosure relate to handling mobility information in a communications network.

BACKGROUND

Mobility in RRC_CONNECTED in LTE and NR

In Long Term Evolution (LTE) and New Radio (NR), an RRC_CONNECTED UE may be configured by the network to perform measurements and, upon triggering measurement reports the network may send a HandOver (HO) command to the UE. RRC is short for Radio Resource Control. In LTE, the HO command is an RRConnectionReconfiguration with a field called mobifityControlInfo In NR, the HO command is an RRCReconfiguration with a reconfigurationWithSync field.

These reconfigurations are prepared by the target cell upon a request from the source node, and over the X2 interface in case of EUTRA-EPC or the Xn interface in case of EUTRA-5GC or NR. These reconfigurations take into account the existing RRC configuration the UE has with source cell, which are provided in the inter-node request. EUTRA or E-UTRA is short for Evolved-UMTS Terrestrial Radio Access, UMTS is short for Universal Mobile Telecommunications System, EPC is short for Evolved Packet Core and 5GC is short for Fifth Generation Core. The X2 interface is an interface between two radio access nodes, e.g. evolved Node B (eNB), in case of EUTRA-EPC, and the Xn interface is an interface between two radio access nodes, e.g. gNodeB (gNB), in case of EUTRA-5GC or NR. Among other parameters, the reconfiguration provided by the target cell comprises all information the UE needs to access the target cell, e.g., random access configuration, a new Cell-Radio Network Temporary Identifier (C-RNTI) assigned by the target cell and security parameters enabling the UE to calculate new security keys associated to the target cell so the UE may send a handover complete message on Signaling Radio Bearer 1 (SRB1), encrypted and integrity protected, based on new security keys upon accessing the target cell.

Herein, the terms source, serving, old and first may be used interchangeably when referring to the node, e.g. gNB, eNB, which the UE is currently served by and will be handed over from. The terms target, new and second may be used interchangeably when referring to the node, e.g. gNB, eNB, which the UE will be served by after the handover.

FIG. 1a and FIG. 1b illustrates the flow signaling between the UE, the source node and the target node during a HO procedure. The source node is exemplified with a source gNB and the target node is exemplified with a target gNB. FIG. 1a illustrates steps 101-114 and FIG. 1b illustrates steps 115-123. FIG. 1b is a continuation of FIG. 1a. The following nodes are comprised in the method shown in FIGS. 1a and 1b: UE 101, source gNB 103a, target gNB 103b, Access and Mobility Management Function (AMF) node 105 and one or more User Plane Function (UPF) node(s) 108. User data is indicated with dotted arrows in FIGS. 1a and 1b.

FIGS. 1a and 1b comprise least one of the following steps, which steps may be performed in any suitable order than described below:

Step 101

This step is seen in FIG. 1a. User data is transmitted between the UE 101 and the source gNB 103a, and between the source gNG 103a and the UPF(s) 108. User data may also be referred to as User Plane (UP) data.

Step 102

This step is seen in FIG. 1a. Mobility control information is provided by AMF node 105 to the source gNB 103a and the target gNB 103b.

Step 103

This step is seen in FIG. 1a. The UE 101 and the source gNB 103a perform measurement control and provide reports to each other about this.

Step 104

This step is seen in FIG. 1a. The source gNB 103a takes a HO decision, i.e. a decision to handover the UE 101 from the source gNB 103a to the target gNB 103b.

Step 105

This step is seen in FIG. 1a. The source gNB 103a sends a handover request message to the target gNB 103b. The target gNB 103b receives the handover request message from the source gNB 103a.

Step 106

This step is seen in FIG. 1a. The target gNB 103b performs admission control related to the handover request message.

Step 107

This step is seen in FIG. 1a. The target gNB 103b sends a handover request acknowledgement message to the source gNB 103a. The handover request acknowledgement message indicates acknowledgement of the handover request message form step 105.

Steps 101-107 described above may be comprised in a handover preparation procedure.

Step 108

This step is seen in FIG. 1a. The source gNB 103b triggers Uu handover of the UE 101.

Step 109

This step is seen in FIG. 1a. The source gNB 103a transmits a Sequence Number (SN) status transfer message to the target gNB 103b. The target gNB 103b receives the SN status transfer message from the source gNB 103a.

Step 110

This step is seen in FIG. 1a. The UE 101 detaches from the old cell, i.e. the source gNB 103a, and synchronizes to the new cell, i.e. the target gNB 103b.

Step 111

This step is seen in FIG. 1a. The source gNB 103a delivers buffered and in transit user data to the target gNB 103b.

Step 112

This step is seen in FIG. 1a. The source gNB 103a forwards user data to the target gNB 103b. The target gNB 103b receives user data from the source gNB 103a.

Step 113

This step is seen in FIG. 1a. The target gNB 103b buffers the user data received from the source gNB 103a.

Step 114

This step is seen in FIG. 1a. The UE 101 synchronizes to the new cell, i.e. the target gNB 103b, and completes the RRC handover procedure.

Steps 108-114 described above may be comprised in a handover execution procedure.

Step 115

This step is seen in FIG. 1b. User data is transmitted between the UE 101 and the target gNB 103b. User data may also be referred to as UP data.

Step 116

This step is seen in FIG. 1b. User data is transmitted between the target gNB 103b and the UPF node(s) 108.

Step 117

This step is seen in FIG. 1b. The target gNB 103b transmits a path switch request message to the AMF node 105. The AMF node 105 receives the path switch request message from the target gNB 103b.

Step 118

This step is seen in FIG. 1b. The AMF node 105 performs path switch related 5G CN internal signaling and actual DL path switch in the UPF node(s) 108.

Step 119

This step is seen in FIG. 1b. The AMF node 105 sends an end marker to the source gNB 103a. The source gNB 103a receives the end marker from the AMF node 105.

Step 120

This step is seen in FIG. 1b. The source gNB 103a sends the end marker to the target gNB 103b. The target gNB 103b receives the end marker from the source gNB 103a.

Step 121

This step is seen in FIG. 1b. User data is transmitted between the target gNB 103b and the UPF node(s) 108.

Step 122

This step is seen in FIG. 1b. The AMF node 105 sends a path switch request acknowledgement message to the target gNB 103b. The path switch request acknowledgement message indicates acknowledgement of the path switch request message from step 117.

Step 123

This step is seen in FIG. 1b. The target gBN 103b sends a UE context release message to the source gNB 103a. The source gNB 103a receives the UE context release message from the target gNB 103b. The source gNB 103a releases the UE context, as indicated in the UE context release message.

Steps 115-123 in FIG. 1b are comprised in a handover completion procedure.

Both in LTE and NR, some principles exist for handovers, or in more general terms, mobility in RRC_CONNECTED:

Mobility in RRC_CONNECTED is network based as the network has best or most information regarding the current situation such as load conditions, resources in different nodes, available frequencies, etc. The network may also take into account the situation of many UEs 101 in the network from a resource allocation perspective.

The network prepares a target cell before the UE 101 accesses that cell. The source gNB 103a provides the UE 101 with the RRC configuration to be used in the target cell, comprising SRB1 configuration to send handover complete message.

The UE 101 is provided by target with a target C-RNTI, i.e. the target cell identifies the UE 101 from message 3 (MSG.3) on the Medium Access Control (MAC) level for the handover complete message. Hence, there is no context fetching, unless a failure occurs.

To speed up the handover, the network provides needed information on how to access the target e.g. Random Access Channel (RACH) configuration, so the UE 101 does not have to acquire System Information (SI) prior to the handover.

The UE 101 may be provided with Contention Free RACH (CFRA) resources, i.e. in that case target identifies the UE 101 from the preamble, e.g. message 1 (MSG.1). The principle behind this is that the procedure may always be optimized with dedicated resources. In Conditional handover (CHO) that might be a bit tricky as there is uncertainty about the final target but also the timing.

Security is prepared before the UE 101 accesses the target cell i.e. keys must be refreshed before sending RRC Connection Reconfiguration Complete message, based on new keys and encrypted and integrity protected so UE 101 may be verified in the target cell.

Both full and delta reconfiguration are supported so that the handover command may be minimized.

Mobility Robustness Work Item in Rel-16 for LTE and NR and Conditional Handover

Two new work items for mobility enhancements in LTE and NR have started in 3GPP in release 16. The main objectives of the work items are to improve the robustness at handover and to decrease the interruption time at handover.

One problem related to robustness at handover is that the handover command, RRCConnectionReconfiguration with mobilityControlInfo and RRCReconfiguration with a reconfigurationWithSync field, is normally sent when the radio conditions for the UE 101 are already quite bad. That may lead to that the handover command may not reach the UE 101 in time if the message is segmented or there are retransmissions.

In LTE and NR, different solutions to increase mobility robustness have been discussed in the past. One solution discussed in NR is called conditional handover or early handover command. In order to avoid the undesired dependence on the serving radio link upon the time and radio conditions where the UE 101 should execute the handover, the possibility to provide RRC signaling for the handover to the UE 101 earlier should be provided. To achieve this, it should be possible to associate the handover command with a condition, e.g., based on radio conditions possibly similar to the ones associated to an A3 event, where a given neighbour becomes X decibel (dB) better than source cell. As soon as the condition is fulfilled, the UE 101 executes the handover in accordance with the provided handover command.

Such a condition could be, e.g., that the quality of the target cell or beam becomes X dB stronger than the serving cell. The threshold Y used in a preceding measurement reporting event should then be chosen lower than the one in the handover execution condition. This allows the serving cell to prepare the handover upon reception of an early measurement report and to provide the conditional handover command, e.g. an RRCConnectionReconfiguration with mobilityControlInfo, at a time when the radio link between the source cell and the UE 101 is still stable. The execution of the handover is done at a later point in time and with a threshold which is considered optimal for the handover execution.

FIG. 2 is a signalling diagram illustrating a conditional handover execution with a serving gNB 103a and a target gNB 103b. In practice there may often be many cells or beams that the serving gNB 103a identifies as possible candidates based on UE preceding Radio Resource Management (RRM) measurements. The network should then have the freedom to issue conditional handover commands for several of those candidates. The conditional handover command for each of those candidates may differ, e.g., in terms of the handover execution condition, Reference Signal (RS) to measure and threshold to exceed, as well as in terms of the Random Access (RA) preamble to be sent when a condition is met.

While the UE 101 evaluates the condition, it should continue operating per its current RRC configuration, i.e., without applying the conditional handover command. When the UE 101 determines that the condition is fulfilled, it disconnects from the serving cell, applies the conditional handover command and connects to the target cell. These steps are equivalent to the current, instantaneous handover execution.

User data or user plane data is illustrated with dotted arrows in FIGS. 2.

The method illustrated in FIG. 2 comprises at least one of the following steps, which steps may be performed in any suitable order than described below:

Step 201
The serving gNB 103*a* transmits user data to the UE 101. The UE 101 receives user data from the serving gNB 103*a*.

Step 202
The UE 101 transmits a measurement report to the serving gNB 103*a*. The measurement report is triggered based on a threshold that has a first value, e.g. a lower threshold than a typical threshold used to trigger a handover, i.e. so that there is still some time until a handover is executed. In other words, the trigger is based on that a threshold has not been reached or exceeded. The serving gNB 103*a* receives the measurement report from the UE 101.

Step 203
The serving gNB 103*a* takes a handover decision based on an early report. The report is early compared to the typical handover case where the report is transmitted and the gNB 103 acts on it by triggering a handover. Here, gNB 103 may not want the UE 101 to leave immediately.

Step 204
The serving gNB 103*a* sends an early handover request message to the target gNB 103*b*. The target gNB 103*b* receives the early handover request message from the serving gNB 103*a*.

Step 205
The target gNB 103*b* accepts the handover and builds a RRC configuration. Building a RRC configuration may also be referred to as determining a RRC configuration or creating a RRC configuration.

Step 206
The target gNB 103*b* sends a handover acknowledgement comprising the RRC configuration to the source gNB 103*a*.

Step 207
The source gNB 103*a* sends a conditional handover command to the UE 101. The conditional handover command indicates a threshold with a second value, e.g. a higher threshold than a typical threshold used to trigger a handover, i.e. so that there is not more time until a handover is executed. In other words, the trigger is based on that a threshold has been reached or exceeded. The second value of the threshold is higher than the first value in step 202.

The UE 101 transmits a measurement report to the serving gNB 103*a*. The measurement report is triggered based on a threshold that has a first value. The serving gNB 103*a* receives the measurement report from the UE 101.

Step 208
The UE 101 determines that measurements fulfil the handover condition, and consequently triggers the pending conditional handover.

Step 209
The UE 101 transmits synchronization and random access information to the target gNB 103*b*. The target gNB 103*b* receives synchronization and random access information from the UE 101.

Step 210
The UE 101 transmits a HO confirmation message to the target gNB 103*b*. The target gNB 103*b* receives the HO confirmation message from the UE 101.

Step 211
The target gNB 103*b* transmits a handover completed message to the source gNB 103*a*.
The source gNB 103*a* receives the handover completed message from the target gNB 103*b*.

Step 212
User data is transmitted from the target gNB 103*b* to the UE 101. The UE 101 receives the user data from the target gNB 103*b*.

Mobility Prediction and Artificial Intelligence/Machine Learning Applied to Radio Access Networks Recently, many works have been dedicated to study mobility prediction. By mobility prediction it may be referred to the technique to predict that a given UE 101 is going to leave the coverage of a source cell and is going to enter the coverage of a neighbor cell before it does, i.e. even the UE 101 reports a measurement report to the network associated to an A3 like event, neighbor offset better than source cell, the network figures out that the event is going to happen before it happens with a certain likelihood, of course. Some of the applications and scenarios addressed by the studies of mobility prediction works are:

Handover anticipation: in small and densified mmWave cellular networks, frequent HOs and the resultant high switching latency degrade the system performance, which is further exacerbated by the fact that an mmWave channel is vulnerable to the line-of-sight (LOS) blockage, leading to sudden drops or outage of the signal. In this type of scenario, mobility prediction could be used to alleviate the mentioned problems by starting handover process ahead of time. In the baseline process without predictions, the UE 101 sends a measurement report, the source cell prepares the target cell possibly in a target node 103*b*, the target node 103*b* gives the source the reconfiguration, e.g. in a container, the source node 103*a* gives the reconfiguration to the UE 101, e.g. an RRCReconfiguration with a reconfiguration with synchronization, the UE 101 receives the RRCReconfiguration properly and the UE 101 accesses the target cell in target node 103*b*. Notice that the inter-node messages exchange and the processing time in both source and target nodes 103*a*, 103*b* may take some time, so that it may be a significant delay from the time the UE 101 sends the measurement report, i.e. from the time the A3 condition for HO is fulfilled, to the time the UE 101 gets the RRCReconfiguration with target configuration.

Keeping users' continuous connection: this type of application is usually addressed by works considering delay sensitive services, where, based on the prediction of a moving UE's next position, the network proactively pre-fetches the UE content to edge catching base stations, guaranteeing data delivery performance with near-zero delay, e.g. seamless handover. Compared to the previous discussion, this benefit is more related to the user plane data delivery.

Load balancing: works considering mobility prediction and the expected growth of mobile traffic in 5G networks have used the prior knowledge of user mobility to predict time-varying traffic load and offload part of the traffic to small cells, e.g. turn on/off, for preventing the network from congesting.

Location based services (LBSs): LBSs aims to enhance UE's experience through services related to the UE's specific location, e.g., sending target advertisements, local traffic information, instant communication with people nearby and merchant recommendation. However, real time geographical location is a critical issue, e.g., Global Positioning System (GPS) is unsuitable for indoor location estimation. In this context, works related to LBSs and mobility prediction usually benefit of foreknowing where the users will be in the future.

Despite considering different approaches, the frameworks for mobility prediction are usually structured as illustrated in FIG. 3. In summary, a central node, e.g., the serving node, aggregates UE periodically reported data, such as location history and received signal strength, and uses this data as input for prediction algorithms. The prediction outputs represent what the central node desire to acquire through prediction, e.g. transition probability or future location.

In more detail, FIG. 3 shows three categories of applications: handover management 301, resource management 302 and location-based services 303. FIG. 3 shows the following performance matrices: prediction accuracy 304, deviation error 305, handover dropping probability 306 and new call blocking probability 307. Procedures of mobility prediction are input from the applications to the performance matrices. Evaluating results from prediction outputs such as moving direction 308, transition probability 309, future location 310, user trajectory 311 and the next cell ID 312 are provided to the performance matrices. FIG. 3 shows prediction algorithms such as Markov chain 313, Hidden Markov model 314, artificial neural network 315, Bayesian network 316 and data mining 317, which provides prediction outputs. FIG. 3 shows the following required information: location information 318, cell transition history 319, road topology information 320, user behavior 321 and received signal strength 322, which provides extracted knowledge to the prediction algorithms. Data is collected from the UE 101, the base station 103, data server 350, the satellite 360 and the sensor 370.

Regarding specifically the prediction algorithms, the recent ones are mostly based on Machine Learning (ML). Although the terms Artificial Intelligence (AI) and ML are sometimes interchangeably used, this is a misconception. ML is a sub-field of AI, as well as game theory and control theory. In general, ML encompasses methods that learn from data.

The most common ML techniques may be classified in at least three broad categories:

Supervised learning: Methods that learn a model/function based on training sets assembling examples of inputs and their expected outputs. Neural Networks (NNs) illustrate this category. In NNs, nodes, using activation functions to perform nonlinear computation, are connected to each other by variable link weights. A training set is used to adjust the weights in order to map inputs into outputs.

Unsupervised learning: Methods that try to find hidden patterns without having any prior knowledge, e.g., training sets, of the output that they should come up with for each input. K-means is a well-known algorithm used in this category. It tries to find clusters only based on unlabelled input and a predefined number of clusters.

Reinforcement Learning (RL): Methods that learn based on trial and error. Their objective is to find a policy, i.e., sequence of actions to be taken by an agent that maximizes the expected reward in the long term. For this, the agent takes actions in order to learn the reward associated to each action from a specific system state. RL is neither supervised, since it does not rely on training sets, nor unsupervised, since it uses actions and rewards to sense the environment. Q-learning is one of the most famous RL techniques.

Measurement Reporting in NR/LTE

In LTE and 5G NR, legacy handovers may benefit from measurement reports that are configured by the source node 103a where the UE 101 is connected to. The source node 103a configures the UE 101 to detect cells in a given frequency, e.g. Primary Cell (PCell) frequency, for intra-frequency handover, without providing a list of cells to the UE 101. To assist intra-frequency handovers, the network configures either periodic measurement reports or configures an A3 event, e.g. in a reportConfig associated to a measurement object and associated to a measurement identity, that is triggered when one of the neighbor cells in the frequency associated to the indicated measurement object, i.e. the same PCell frequency in case of intra-frequency handovers, becomes an offset better than the PCell. When the event is triggered for at least one cell, a measurement report is transmitted, and the source node 103a may request a handover preparation via Xn, where resources are reserved in the target cell for an incoming UE 101.

In summary, the UE 101 may be configured by the network to perform RRM measurements, typically called RRM/L3 measurements, and report them periodically or based on the triggering of configured events, e.g. A1, A2, A3, A4, A5, A6, B1, B2, as defined below:

Event A1: Serving becomes better than absolute threshold;

Event A2: Serving becomes worse than absolute threshold;

Event A3: Neighbor becomes amount of offset better than PCell/PSCell;

Event A4: Neighbor becomes better than absolute threshold;

Event A5: PCell/PSCell becomes worse than absolute threshold1 and Neighbor/SCell becomes better than another absolute threshold2;

Event A6: Neighbor becomes amount of offset better than SCell.

In LTE there are other types of events, in addition to the ones above, that may also be later introduced in NR, related to other use cases such as the following ones:

Event C1: A Channel State Information-Reference Signal (CSI-RS) resource becomes better than an absolute threshold;

Event C2: A CSI-RS resource becomes amount of offset better than a reference CSI-RS resource;

Event V1: Channel Busy Ratio (CBR) becomes larger than an absolute threshold;

Event V2: Channel Busy Ratio (CBR) becomes smaller than an absolute threshold.

Event H1: Aerial UE height becomes higher than an absolute threshold;

Event H2: Aerial UE height becomes lower than an absolute threshold.

In the case of NR, the network may configure an RRC_CONNECTED UE to perform measurements and report them in accordance with the measurement configuration. The measurement configuration is provided by means of dedicated signaling i.e. using the RRCReconfiguration or RRCResume. The network may configure the UE 101 to perform the following types of measurements:

NR measurements;
Inter-Radio Access Technology (inter-RAT) measurements of E-UTRA frequencies.

The network may configure the UE 101 to report the following measurement information based on Synchronization Signals/Physical Broadcast Channel (SS/PBCH) block(s):

Measurement results per SS/PBCH block;
Measurement results per cell based on SS/PBCH block(s);
SS/PBCH block(s) indexes.

The network may configure the UE 101 to report the following measurement information based on CSI-RS resources:

Measurement results per CSI-RS resource;
Measurement results per cell based on CSI-RS resource(s);

In this legacy handover, the source network node contacts a target network node only when it is certain that a handover needs to be performed. Until then, there is no contact with neighbor node to configure measurements, at least for LTE measurements based on cell-specific reference signals and NR measurements based on SS/PBCH Blocks (SSBs), which may only be detected once at least the frequency location is known.

Measurement Prediction Based on ML and AI.
Existing solutions for mobility prediction, e.g. to improve handover performance, rely on the following aspects:
Periodic measurement reports and/or;
Event trigger measurement reports but using an early trigger, e.g. trigger condition more conservative than the condition closer to a handover, i.e. source is still good enough;
Predictions are performed at the network side having the measurements above as input.

This approach has several drawbacks/limitations. In the case the prediction on the network side relies on periodic reports, the UEs need to constantly send measurement reports to their serving Base Stations (BS) in order of the serving BS to be able to perform the predictions. This increases the Uplink (UL) signaling and also increases UE power consumption since the UE needs to constantly perform measurements and periodically report them. In the case of an early event triggered report signaling is reduced, but the amount of input for the prediction model is also limited, which may affect the performance of the prediction algorithm at the network side. A third limitation is that in principle the network is not aware of many other local parameters at the UE, such as positioning, rotation of the device/UE, speed, applications that are running that may be related to a UE's route, e.g. mapping/GPS/navigation applications, etc. Besides, depending on the delay between the measurement performed at the UE and the use of this measurement by the serving BS, the predictions might be based on out-of-date data, e.g. due to the delay between the time when the UE performs the measurement and the time this measurement is used by the BS, like queueing delay, transmission delay, processing, etc.

Usage of Measurement Reports in Conditional Handover
In CHO the network configures the UE 101 with a list of candidate target cells and for each CHO configuration the UE 101 gets a trigger condition configuration, which is at least one measurement identity refereeing to a measurement configuration, and a dedicate configuration to be used in target when/if the UE 101 executes CHO, e.g. an RRCReconfiguration prepared by each target candidate within a container.

The source node 103a may be assisted by measurement reports before it configures CHO to a given UE 101. This is one by configuring the UE 101 to report an A3 and/or A5 like events but using an early trigger condition e.g. few dBs before the real condition that would trigger a handover in source. These early reports contain triggered cell(s) that are an indication to the source node 103a which neighbor cells are good candidates to be contacted and to be configured for CHO.

On the other hand, there is no certainty that the early triggered cells that are reported will necessarily contain one of the cells the UE 101 will end up being handed over. In some scenarios this may cause some problems. If the UE 101 reports a set of cells C1, C2, C3, the network might configure CHO for these cells and provide CHO configuration to the UE 101. However, the UE 101 may discover further cells after it receives CHO configuration and before it executes CHO, send a measurement report, e.g. a new good cell C4 is found, and based on that network may trigger a handover to C4 or add a new CHO target candidate. That is costly in terms of inter-node signaling and air interface e.g. in case network decides to add a new CHO target candidate, e.g. C4, but also increases the probability of failures, which is bad for mobility robustness.

Therefore, there is a need to at least mitigate or solve this issue.

SUMMARY

An objective of embodiments herein is therefore to obviate at least one of the above disadvantages and to improved handling of mobility information.

According to a first aspect, the object is achieved by a method performed by a UE for handling mobility information in a communications network. The UE predicts the mobility information, and reports the predicted mobility information to a first network node currently serving the UE in the communications network.

According to a second aspect, the object is achieved by a method performed by a first network node for handling mobility information in a communications network. The first network node obtains predicted mobility information from a UE which the first network node currently serves. Based on the predicted mobility information, the first network node determines to initiate a mobility procedure associated with the UE. The first network node initiates the mobility procedure.

According to a third aspect, the object is achieved by a UE for handling mobility information in a communications network. The UE is adapted to predict the mobility information, and to report the predicted mobility information to a first network node currently serving the UE in the communications network.

According to a fourth aspect, the object is achieved by a first network node for handling mobility information in a communications network. The first network node is adapted to obtain predicted mobility information from a UE which the first network node currently serves. The first network node is adapted to, based on the predicted mobility information, the first network node, determine to initiate a mobility procedure associated with the UE. The first network node is adapted to initiate the mobility procedure.

Since the UE predicts mobility information such as radio conditions of serving and/or neighbour cells in serving and/or neighbour frequencies, list of cells and/or beams the UE is moving to etc., up-to-date information is provided to the first network node, and thus the handling of mobility information is improved.

The present disclosure affords many advantages, of which a non-exhaustive list of examples follows:

One advantage is that, since the predictions are done by the UE, it allows the use of up-to-date measurements without the need of increasing the frequency of periodic measurement reports, as it is necessary in solutions where the prediction is performed at the network node side. It is important to highlight that even if the prediction model runs in the UE side, i.e. decentralized, they benefit of the knowledge of a centralized solution, since the prediction model is learnt in the network node side.

Another advantage is that, when used for predicting target network nodes to be used in conditional HO, it allows configuring a smaller set of neighbour network nodes, when compared to solutions based on legacy handover and different threshold for earlier measurement report.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail by way of example only in the following detailed description by reference to the appended drawings illustrating the embodiments and in which:

FIG. 13 is a flowchart depicting embodiments of a method in a communications system comprising a host computer, a base station and a UE.

FIG. 14 is a flowchart depicting embodiments of a method in a communications system comprising a host computer, a base station and a UE.

FIG. 15 is a flowchart depicting embodiments of a method in a communications system comprising a host computer, a base station and a UE.

FIG. 16 is a flowchart depicting embodiments of a method in a communications system comprising a host computer, a base station and a UE.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1A:
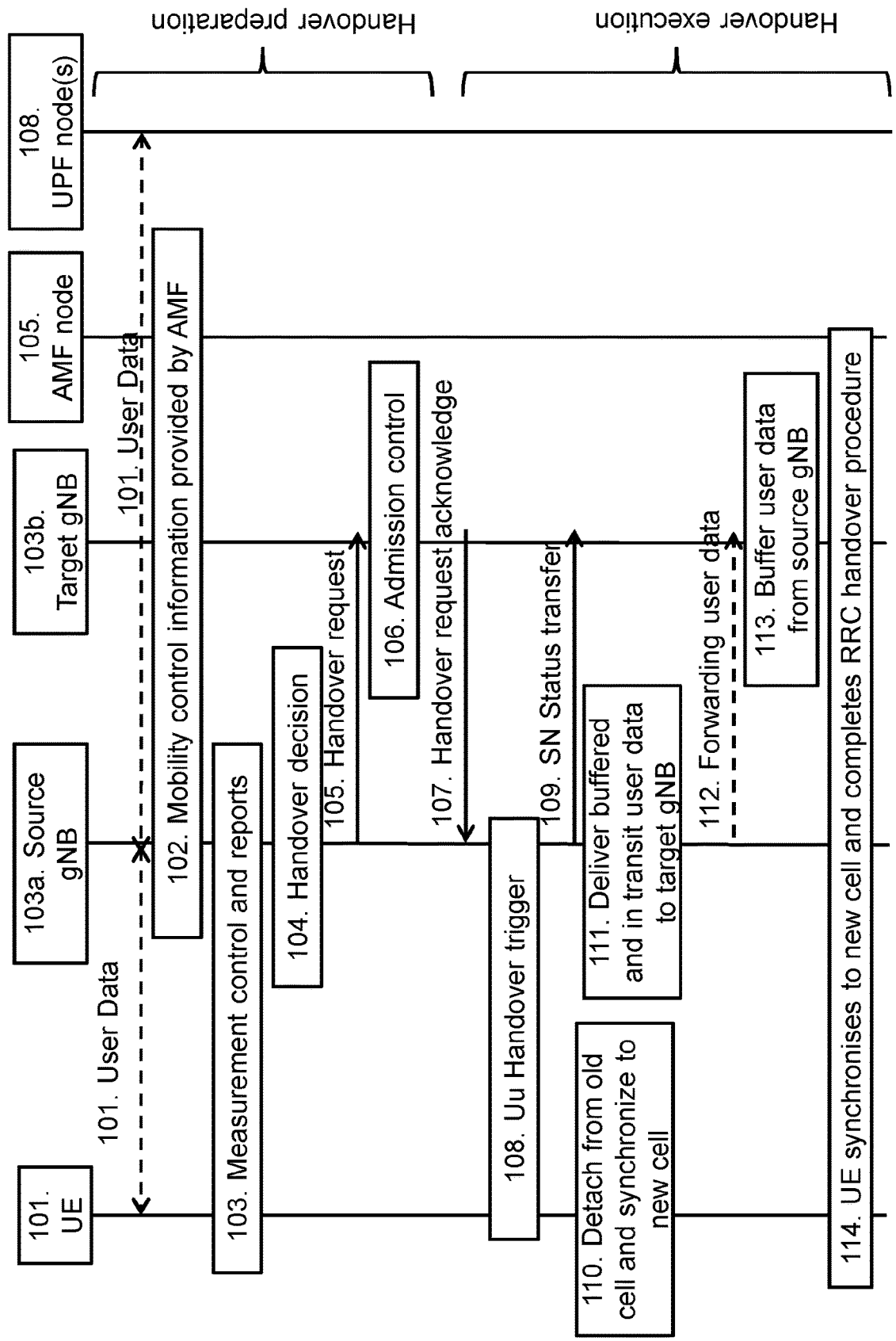
FIG. 1a is a signaling diagram illustrating a handover procedure.
Figure 1B:
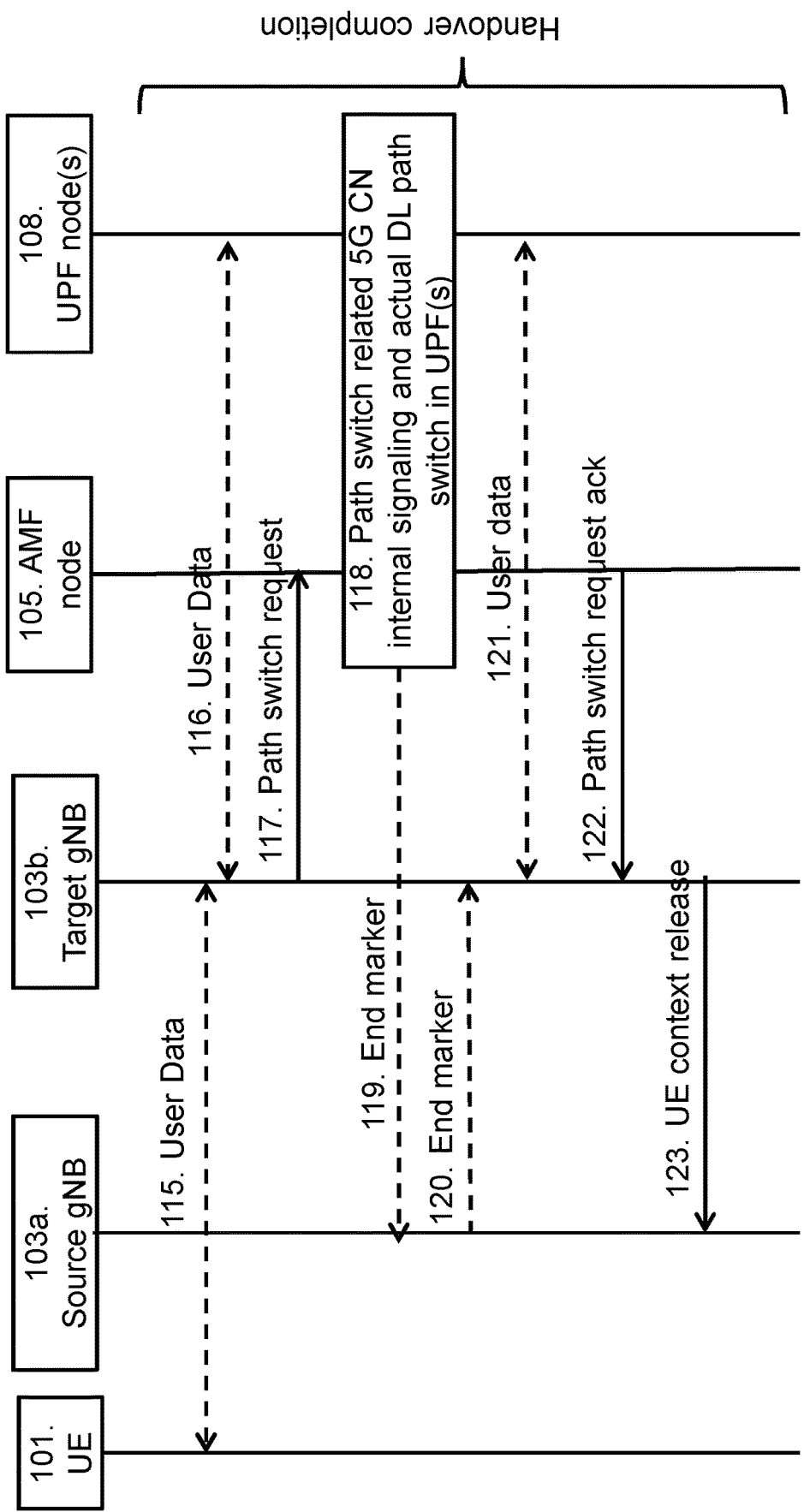
FIG. 1b is a signaling diagram illustrating a handover procedure.
Figure 2:
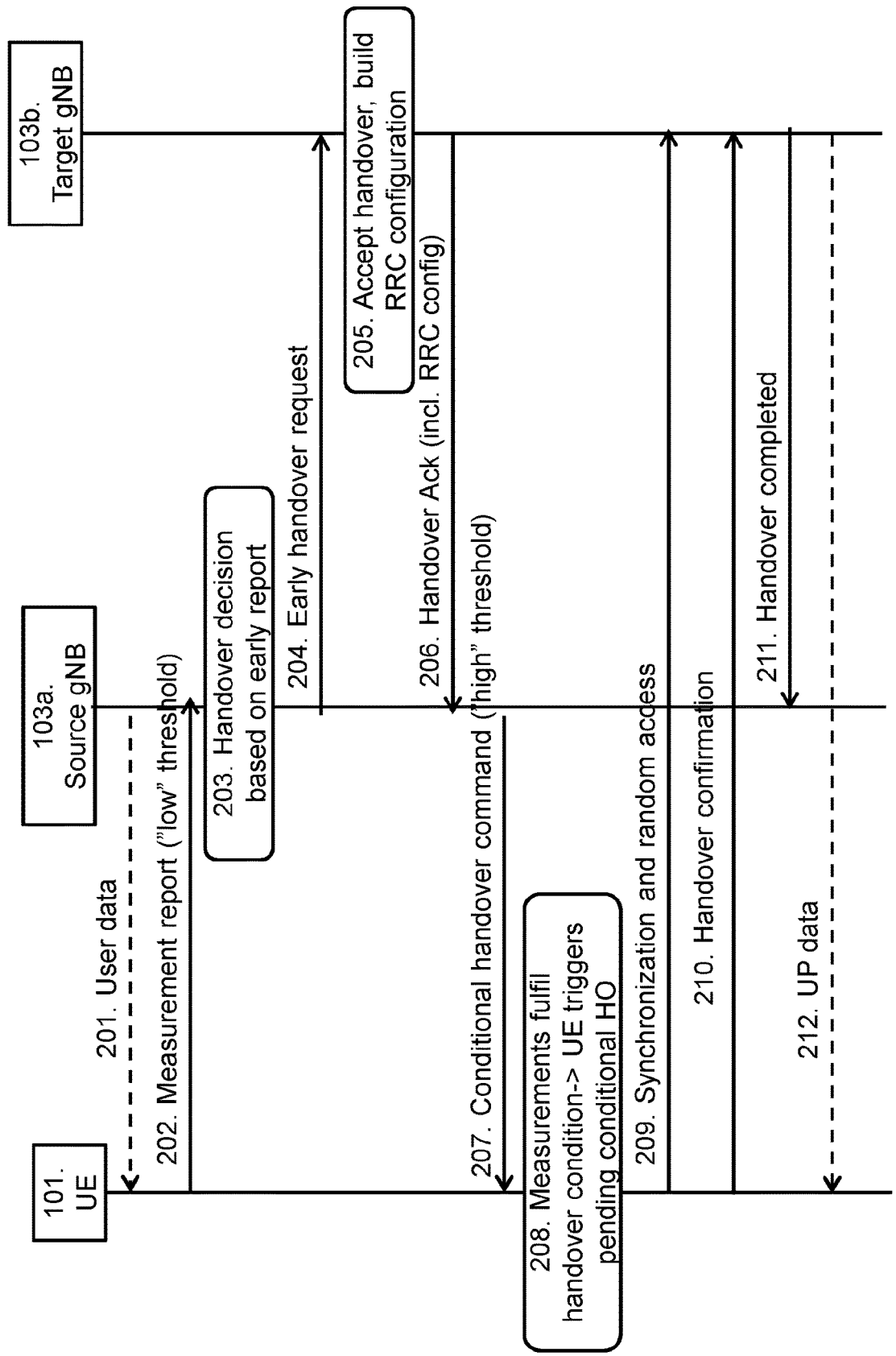
FIG. 2 is a signaling diagram illustrating conditional handover.
Figure 3:
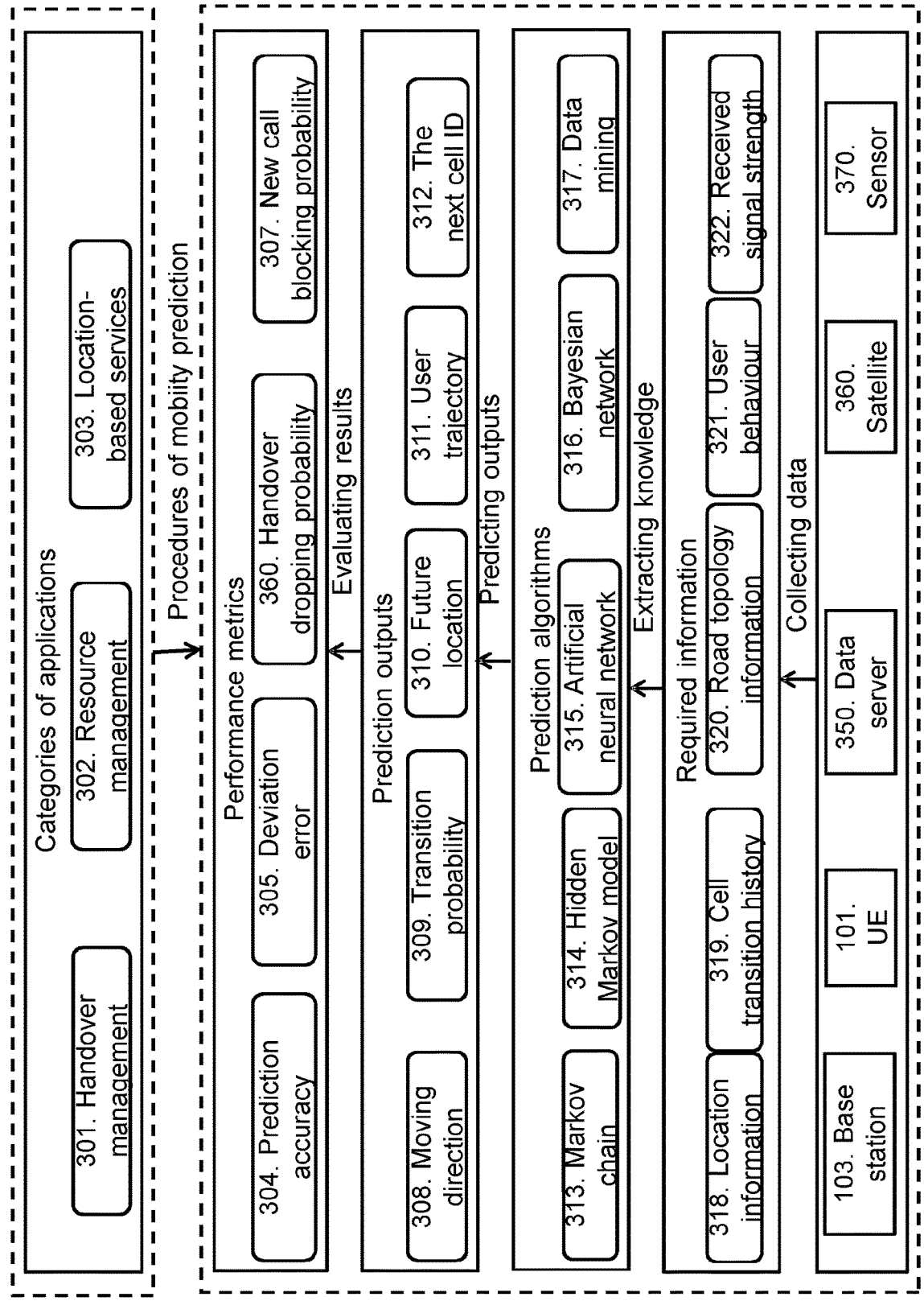
FIG. 3 is a block diagram illustrating mobility prediction.
Figure 4:
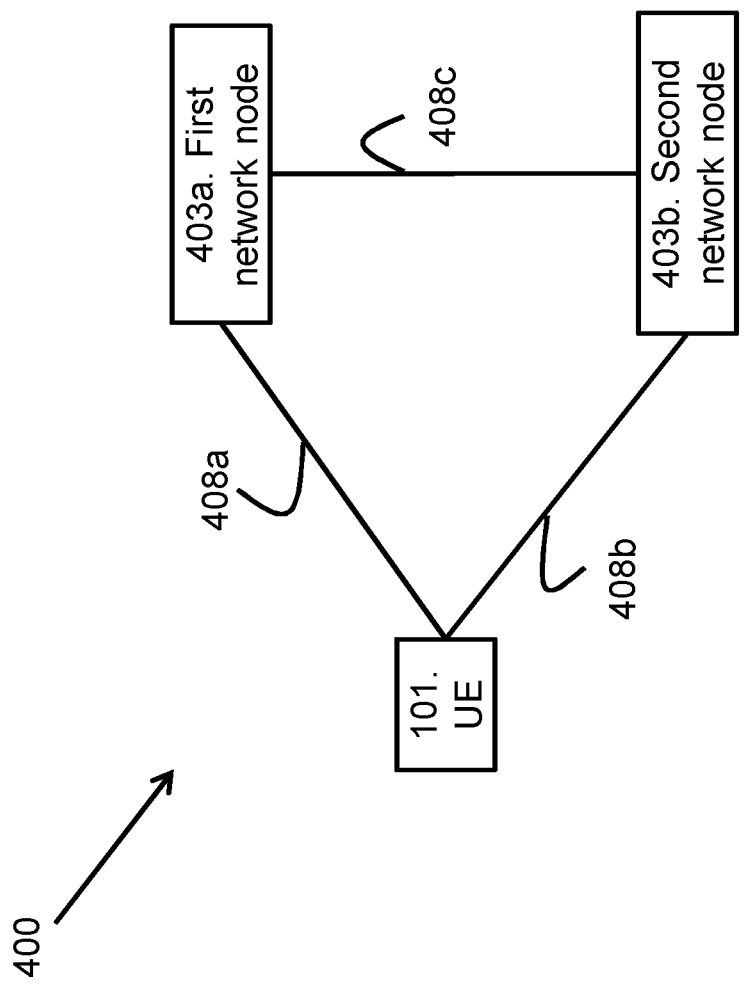
FIG. 4 is a block diagram illustrating a communications network.

FIG. 4 depicts a communications network 400, which may be a wireless communications system, sometimes also referred to as a wireless communications network, cellular radio system, or cellular network. The communications network 400 may be a 5G system, 5G network, NR-U or Next Gen system or network. The communications network 400 may alternatively be a younger system than a 5G system. The communications network 400 may support other technologies such as, for example LTE, LTE-Advanced/LTE-Advanced Pro, e.g. LTE Frequency Division Duplex (FDD), LTE Time Division Duplex (TDD), LTE Half-Duplex Frequency Division Duplex (HD-FDD), LTE operating in an unlicensed band, Narrow Band-Internet of Things (NB-IoT). Thus, although terminology from 5G/NR and LTE may be used in this disclosure, this should not be seen as limiting the present disclosure to only the aforementioned systems.

The communications network 400 comprises one or a plurality of network nodes, whereof a first network node 401a and a second network node 401b are depicted in FIG. 4. Any of the first network node 403a and the second network node 401b may be a radio network node, such as a radio base station, or any other network node with similar features capable of serving a user equipment, such as a wireless device or a machine type communication device, in the communications network 400. The first network node 401a may be an eNB and the second network node 401b may be a gNB. The first network node 401a may be a first eNB, and the second network node 401b may be a second eNB. The first network node 401a may be a first gNB, and the second network node 401b may be a second gNB. The first network node 401a may be a MeNB and the second network node 401b may be a gNB. Any of the first network node 401a and the second network node 401b may be co-localized, or be part of the same network node. The first network node 401a may be referred to as a source node or source network node, whereas the second network node 401b may be referred to as a target node or target network node. When the reference number 401 is used herein without the letters a or b, it refers to a network node in general, i.e. it refers to any of the first network node 401a or second network node 401b.

The communications network 400 covers a geographical area which may be divided into cell areas, wherein each cell area may be served by a network node, although, one network node may serve one or several cells. In FIG. 4, the communications network 400 comprises a first cell and a second cell. Note that any n number of cells may be comprised in the communication network 400, where n is any positive integer. A cell is a geographical area where radio coverage is provided by the network node at a network node site. Each cell is identified by an identity within the local network node area, which is broadcast in the cell. In FIG. 4, first network node 401a serves the first cell, and the second network node 401b serves the second cell. Any of the first network node 401a and the second network node 401b may be of different classes, such as, e.g., macro BS, home BS or pico BS, based on transmission power and thereby also cell size. Any of the first network node 401a and the second network node 401b may be directly connected to one or more core networks, which are not depicted in FIG. 4 for the sake of simplicity. Any of the first network node 401a and the second network node 401b may be a distributed node, such as a virtual node in the cloud, and it may perform its functions entirely on the cloud, or partially, in collaboration with another network node. The first cell may be referred to as a source cell, whereas the second cell may be referred to as a target cell.

One or a plurality of UEs 101 is located in the communication network 400. Only one UE 101 is exemplified in FIG. 4 for the sake of simplicity. A UE 101 may also be referred to simply as a device. The UE 101, e.g. a LTE UE or a 5G/NR UE, may be a wireless communication device which may also be known as e.g., a wireless device, a mobile terminal, wireless terminal and/or mobile station, a mobile telephone, cellular telephone, or laptop with wireless capability, etc. The UE 101 may be a device by which a subscriber may access services offered by an operator's network and services outside operator's network to which the operator's radio access network and core network provide access, e.g. access to the Internet. The UE 101 may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device, Internet of Things (IoT) device, terminal device, communication device or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the radio access network, with another entity, such as another UE, a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in the communications network 400.

The UE 101 is enabled to communicate wirelessly within the communications network 400. The communication may be performed e.g. between two devices, between a devices and a regular telephone, between the UE 101 and a network node, between network nodes, and/or between the devices and a server via the radio access network and possibly one or more core networks and possibly the internet.

The first network node 401a may be configured to communicate in the communications network 400 with the UE 101 over a first communication link 408a, e.g., a radio link. The second network node 401b may be configured to communicate in the communications network 400 with the UE 105 over a second communication link 408b, e.g., a radio link. The first network node 401a may be configured to communicate in the communications network 400 with the second network node 101b over a third communication link 408c, e.g., a radio link or a wired link, although communication over more links may be possible.

It should be noted that the communication links in the communications network may be of any suitable kind comprising either a wired or wireless link. The link may use any suitable protocol depending on type and level of layer, e.g. as indicated by the Open Systems Interconnection (OSI) model, as understood by the person skilled in the art.

UE Aspects

The UE 101 may predict mobility information such as radio conditions of serving and/or neighbor cells, in serving and/or neighbor frequencies, list of cells and/or beams the UE 101 is moving or being handed over to, and the inclusion of these predictions in measurement reports, such as the existing periodic measurement reports and event-triggered measurement reports.

A method performed by the UE 101 for assisting mobility management, the method comprising:

Predicting mobility information, such as radio quality related parameters such as Reference Signals Received Power (RSRP), Reference Signal Received Quality (RSRQ), Signal to Interference plus Noise Ratio (SINR) in a given frequency in different levels of granularities such as per cell, per beam, per RS type like SSB and/or CSI-RS, list of cells and/or list of beams and/or list of RS type coverage, like SSB identifier coverage or CSI-RS identifier coverage, the UE is moving to, etc.;

Reporting predicted values to a serving node upon a condition, for example, determined by a network configuration provided to the UE.

The prediction of mobility information to be comprised in the measurement reports should be interpreted in a broad sense. The prediction of the mobility information may comprise at least an indication of the likelihood/probability of the UE 101 moving to a given cell, beam or coverage of a given RS type, e.g. SSB identifier, CSI-RS identifier, Transmitter/Receiver Point (TRP), or each reported cell/beam/TRP.

Prediction Model

There may be different possibilities related to how the prediction is performed at the UE 101 e.g. choice of the prediction model used by the UE 101.

The UE 101 may receive a prediction model/function from the first network node 403a. The prediction model may be a software function that is provided from the first network node 403a to the UE 101, for example in a procedure where the UE 101 downloads this software function. The prediction model may rely on Application Protocol Interfaces (APIs) that are exposed by the UE 101 to the first network node 403a, so an entity at the first network node side is able to configure a prediction model at the UE 101. In that case, there may be a procedure where the UE 101 indicates, to the first network node 403a, a capability related information i.e. the UE 101 indicates to the first network node 403a that it may download/receive a prediction model from the first network node 403a, for example for mobility prediction information. This capability may be related to the software and hardware aspects at the UE 101, availability of sensors, etc. Once the UE 101 has the function available, it may be configured by the first network node 403a to use it e.g. in a measurement configuration like reporting configuration, measurement object configuration, etc.

The first network node 403a may take different input from the UE 101 to take a decision concerning the prediction model to provide the UE 101 and/or its configurations. A first network node 403a, e.g. a BS or a cloud, may receive the UEs' measurement reports and use them to train a NN. To train the NN one may use as input to the NN signal measurements, e.g., RSRP, RSRQ or SINR, at instant "t" and as output, signal measurements at instant "t+X". Thus, the NN would be able to predict the value of this measurement, "X" instants of time in advance. Since a NN may be characterized by the number of layers, number of nodes per layer and the nodes' weights, after the training process, the network node broadcasts to the UEs 101 the NN parameters in order to allow the UEs 101 to reconstruct the NN and use it to predict future values of a given signal measurement. Since this is an example of supervised learning, from time to time, the first network node 403a updates the NN weights based on new UEs' measurement reports. The predicted values at instant "t" may be compared to the measured values at instant "t+X" in order to validate if the NN accuracy and to force, if necessary, the NN weights update.

The UE 101 may have stored a prediction model/function, e.g., UE proprietary prediction model, to perform the prediction. In that case, there could be a procedure where the UE 101 indicates to the first network node 403a a capability related to that i.e. indicate that it may perform a certain prediction according to the method, e.g. prediction of RSRP and/or RSRQ and/or SINR based on SSBs, prediction of RSRP and/or RSRQ and/or SINR based on CSI-RS, etc. A capability may be reported to the first network node 403a in different levels of granularity such as i) UE 101 has a prediction model and/or ii) which exact prediction model the UE 101 has available, e.g., out of a list defined in the specifications and/or iii) which kinds of predictions the model(s) the UE 101 has available performs and/or iv) what kinds of input the model(s) the UE 101 has available take into account, etc.

At least one prediction model may be standardized to be implemented at the UE 101 and configured by the first network node 403a, with a set of parameters. Many possibilities may be considered, for example: a NN, the UE 101 already knows that it will implement a NN of "L" layers, where each layer "i" has "$N_i$" nodes, and each node "j" has a set of weights "$W_j$", but the values of "L", "$N_i$" and "$W_j$" are set by the network. A Random Forest model may also be used, where the first network node 403a may set the number of estimators, i.e. trees in the forest, the depth of each tree and the threshold of each leaf. A capability may be reported to the first network node 403a in different levels of granularity such as i) UE 101 has a prediction model and/or ii) which exact prediction model the UE 101 has available, e.g., out of a list defined in the specifications and/or iii) which kinds of predictions the model(s) the UE 101 has available performs and/or iv) what kinds of input the model(s) the UE 101 has available take into account, etc.

The prediction model may be based on Recurrent Neural Network (RNN). Unlike standard feedforward NNs, a RNN has feedback connections that work as a memory state. This memory state may allow a UE 101 to preserve signal measurement statistics across time steps which are useful for predicting time series. The UE 101 may feed the RNN with the last "N" signal measurements, e.g., RSRP, RSRQ or SINR, and the RNN will be able to output signal measurements shifted by "Y" measurement periods. To train the RNN, the UE 101 may use a Back Propagation Through Time (BPTT) method. A Long short-term memory (LSTM) architecture is a RNN that may be used. It learns what to store in the long-term state, what to throw away, and what to read from it.

Parameters Possibly Used by the Prediction Model

There may be different prediction models that may be used, and these may be based on different set of parameters known at the UE 101.

Real/current measurements may be used as input parameters for the mobility prediction model, e.g., RSRP, RSRQ, SINR at a certain point in time T0 for the same cells the UE 101 perform predictions, based on an RS type like SSB and/or CSI-RS and/or Demodulation Reference Signal (DRMS), either instantaneous values or filtered values, e.g. with L3 filter parameters configured by RRC, from the serving and/or neighbor cells and/or serving or neighbor beams.

Parameters from sensors may also be used, such as UE positioning information, e.g. GPS coordinates, barometric sensor information or other indicators of height, rotation sensors, proximity sensors, and mobility such as, location information, previous connected base stations history, speed and mobility direction, information from mapping/guiding applications.

Metrics related to a UE connection may also be considered, such as average package delay. The UE 101 may also use input from sensors such as rotation, movement, etc. UE uses some route information, e.g. current location, final destination and route, as input.

UE mobility history information may be used, such as last visited beams, last visited cells, last visited tracking areas, last visited registration areas, last visited RAN areas, last visited Public Land Mobile Networks (PLMN), last visited countries, last visited cities, last visited states, etc.

Time information may be used, such as the current time, e.g. 10:15 am, and associated time zone, e.g. 10:15 GMT. That may be relevant if the UE 101 has a predictable trajectory and it is typical that at a certain time the UE 101 is in a certain location. The UE 101 may be configured, e.g. by the first network node 403a, via an RRC message, to utilize at least one of the above parameters as input to mobility predictions models. The availability of these parameters, e.g. in case of sensors, the availability at the UE of a sensor, like barometric sensor, depends on a capability information indicated to the network. If first network node 403a is aware that the UE 101 is capable of performing certain measurements, like based on sensors, and, if the first network node 403a is aware that a UE 101 benefits in using a parameter in a prediction model, the UE 101 may be configured to use at least one of these input parameters in the prediction model for which the first network node 403a is configuring the UE 101 to report. In that case, there may be a procedure where the UE 101 indicates to the first network node 403a, a capability related information i.e. UE 101 indicates, to the first network node 403a, that it may download/receive a prediction model from the first network node 403a, for example for mobility prediction information. This capability may be related to the software and hardware aspects at the UE 101, availability of sensors, etc. Once the UE 101 has the function available, it may be configured by the network to use it e.g. in a measurement configuration like reporting configuration, measurement object configuration, etc.

Prediction Reporting Configurations

There may be different ways of how the predictions are reported by the UE, e.g. based on which triggers.

Periodic Reports

The UE 101 may report mobility prediction information periodically, where the first network node 403a may have configured periodicity and/or pre-determined slots where these predictions are to be reported. This may be configured via RRC signaling from a network, for example, in a ReportConfig structure where there may be a new report type called periodicalPredictions, as shown below:

```
ReportConfigNR : := SEQUENCE {
  reportType CHOICE {
  periodical PeriodicalReportConfig,
  eventTriggered EventTriggerConfig,
  ... ,
  reportCGI ReportCGI,
  [[
  reportSFTD ReportSFTD-NR
  ]],
  [[
  periodicalPrediction PeriodicalPredictionReportConfig
  ]]
  }
Periodical PredictionReportConfig : : = SEQUENCE {
  rsType NR-RS-Type,
  reportInterval ReportInterval,
  reportAmount ENUMERATED (r1, r2, r4, r8, r16, r32, r64, infinity),
  reportQuantityCell MeasReportQuantity,
  maxReportCells INTEGER (1 . . maxCellReport),
  reportQuantityRS-Indexes MeasReportQuantity OPTIONAL, -- Need R
  maxNrofRS-IndexesToReport INTEGER (1 . . maxNrofIndexesToReport) OPTIONAL, --
Need R
  includeBeamMeasurements BOOLEAN,
  useWhiteCelllist BOOLEAN,
  ...
}
```

The parameters configured, e.g. in PeriodicalPredictionReportConfig above, indicate what is to be predicted and comprised in the measurement report predictions. The configuration may indicate which RS type, e.g. SSB or CSI-RS, the UE 101 shall measure and, based on these measurements, it may perform predictions. If SSB is configured, the UE 101 may perform SSB measurements and may comprise SSB based measurement predictions in the reports. The field reportInterval or equivalent may indicate the interval for which the UE 101 transmits the measurement report predictions. The field reportAmount may indicate how many measurement prediction reports the UE 101 transmits. The reportQuantityCell field or equivalent may indicate what measurement quantities for cell level measurement predictions are to be predicted and reported periodically, such as RSRO and/or RSRQ and/or SINR.

The maxReportCells field or equivalent may indicate the maximum number of cells whose predictions have been performed are to be comprised in the measurement prediction report.

The reportQuantityRS-Indexes field or equivalent may indicate which measurement information per RS index the UE 101 shall comprise in the measurement prediction report, such as RSRP and/or RSRQ and/or SINR. Notice that this may be about the inclusion of which beam measurement predictions.

The maxNrofRS-IndexesToReport field or equivalent may indicate to the UE 101 the maximum number of RS indexes to comprise in the measurement prediction report. In this context, RS indexes may mean beam indexes in the cases these RSs are beamformed, such as in the case of high frequencies like mmWave or THz.

The includeBeamMeasurements field, if configured, may indicate that the UE 101 shall comprise the SS/PBCH based measurement predictions for the quantities in reportQuantityRS-Indexes set to true for each SS/PBCH block index or CSI-RS, if CSI.RS is configured as RS type.

The useWhiteCellList or equivalent may indicate whether the UE 101 shall use the list of cells in the associated measurement object and consider these cells as applicable cells for which measurement predictions are to be performed. This may rely on a list of cells possibly configured in a measurement object, e.g. identified by a physical cell identified and the frequency information, like an SSB Absolute Radio Frequency Channel Number (ARFCN) or CSI-RS point A and offset, in the measurement object. In that sense, the measurement object may comprise a white cell list only for the measurement report prediction, not only for periodical but more generally. Hence, if the flag is set to true, the UE 101 may perform measurement predictions according to the configuration only for the cells indicated in the list.

Periodic prediction configured in ReportConfigNR may be associated to a measurement object, i.e., to indicate to the UE 101 in which frequency the UE 101 may perform the predictions. In other words, it indicates which ARFCN the SS/PBCH Block needs to be searched and detected, so the UE 101 may perform the measurement predictions.

Periodic prediction configured in ReportConfigNR may be associated to a measurement identifier, i.e., to indicate to the UE 101 which identifier may be comprised in the measurement prediction report, so the first network node 403a knows upon reception of the report to which measurement object and reporting prediction configuration the report is associated.

Regarding the configuration of measurement reporting predictions, the UE may be configured to perform measurements and report measurement periodically, e.g. by being configured in ReportConfigNR with report type periodical, and in addition to perform predictions and comprise measurement predictions in the periodic measurement reports e.g. based on an additional configuration in PeriodicalPredictionReportConfig, as shown below in two examples. In the first example, this may be a falg:

```
ReportConfigNR : := SEQUENCE {
  reportType CHOICE {
  periodical PeriodicalReportConfig,
  eventTriggered EventTriggerConfig,
```

```
...
reportcGI ReportCGI,
[[
reportsFTD ReportsFTD-NR
]]
}
PeriodicalReportconfig : :=         SEQUENCE {
  rsTypeNRRS-Type,
  reportinterval ReportInterval,
  reportAmount ENUMERATED (r1, r2, r4, r8, r16, r32, r64, infinity),
  reportQuantityCell MeasReportCuantity,
  maxReportCells INTEGER (1. . maxCellReport),
  reportQuantityRS-Indexes MeasReportQuantity OPTIONAL, -- Need R.
  maxNrofRS-IndexesPoReport INTEGER (1 . . maxNrofIndexesToReport) OPTIONAL, --
Need R
  includeBeamMeasurements BQOLEAN ,
  useWhiteCelllist BOOLEAN
      [
      includePredictions                    BOOLEAN,
      ]
  ...
}
```

In the following second example, a detailed configuration is provided to indicate the UE 101 what to report in terms of predictions:

```
PeriodicalReportConfig : :=         SEQUENCE {
  rsType NR-RSType,
  reportInterval ReportInterval,
  reportAmount ENUMERATED {r1, r2, r4, r8, r16, r32, r64, infinity},
  reportCuantityCell MeasReportQuantity,
  maxkeportCells INTEGER (1 . . maxcellReport),
  reportQuantityRS-Indexes MeasReportQuantity OPTIONAL, -- Need R
  maxNrofRS IndexesToReport INTEGER (1. . maxNrofindexesToReport) OPTIONAL, -- Need
R
  includeBeamMeasurements BOOLEAN,
  useWhiteCellList BOOLEAN,
      [
      predictionConfig                  PeriodicalPredictionReportConfig,
      ]
  ...
}
```

Even Triggered Reports

Mobility prediction information may be comprised in event-triggered measurement reports. The UE 101 may be configured by the first network node 403a with an Ax/Bx-like event configurations, e.g. A1, A2, A3, A4, A5, A6, B1, B2, C1, C2, C3, V1, V2, H1 or H2, where that has an additional configuration indicating to the UE 101 that the UE 101 may comprise mobility information predictions, e.g. predicted RSRP, RSRQ or SINR for a given triggered cell, in a measurement report, if a measurement report is triggered, e.g. if Ax or Bx event is triggered, depending what the UE is configure with.

A configuration may be provided to the UE 101, e.g. by the first network node 403a via RRC signaling, may indicate what predicted information are to be reported, which may comprise measurement predictions and/or current/real measurements, possibly comprising measurements used as input to have the reported predictions.

The comprising of predictions in an event-triggered measurement report may be configured in ReportConfigNR and may be associated to a measurement object, i.e., to indicate to the UE 101 in which frequency the UE 101 may perform the predictions. In other words, it may indicate which ARFCN the SS/PBCH Block needs to be searched and detected, so the UE 101 may perform the measurement predictions.

This may be captured in the RRC as follows:
ReportConfigNR

The IE ReportConfigNR may specify a criterion for triggering of an NR measurement reporting event. Measurement reporting events may be based on cell measurement results, which may either be derived based on SS/PBCH block or CSI-RS. These events are labelled AN with N equal to 1, 2 and so on.

Event A1: Serving becomes better than absolute threshold;
   Event A2: Serving becomes worse than absolute threshold;
   Event A3: Neighbour becomes amount of offset better than PCell/PSCell;

Event A4: Neighbour becomes better than absolute threshold;

Event A5: PCell/PSCell becomes worse than absolute threshold1 AND Neighbour/SCell becomes better than another absolute threshold2;

Event A6: Neighbour becomes amount of offset better than SCell.

The following shows a ReportConfigNR information element:

```
-- ASNTSTART
-- TAG-REPORTCONFIGNR-START
ReportConfigNR : : = SEQUENCE {
   reportType CHOICE {
   periodical PeriodicalReportConfig,
   eventTriggered EventTriggerConfig,
   . . . ,
   reportCGI ReportCGI,
   [[
   reportSFTD ReportSFTD-NR
   ]]
   }
}
ReportCGI SEQUENCE {
   cell ForWhichToReportCGI PhysCellId,
   . . .
}
ReportSFTD-NR : : = SEQUENCE {
   reportSFTD-Meas BOOLEAN .
   reportRSRP BOOLEAN,
   . . .
}
EventTriggerConfig : : = SEQUENCE {
   eventId CHOICE {
   eventA1 SEQUENCE {
   a1-Threshold MeasTriggerQuantity,
   reportOnLeave BOOLEAN,
   hysteresis Hysteresis,
   timeToTrigger TimeTotrigger
   },
   eventA2 SEQUENCE {
   a2-Threshold MeasTriggeQuantity,
   reportOnLeave BOOLEAN,
   hysteresis Hysteresis,
   timeToTrigger TimeToTrigger
   },
   eventA3 SEQUENCE {
   a3-Offset MeasTriggerQuantityOffset
   reportOnLeave BOOLEAN,
   hysteresis Hysteresis,
   timeToTrigger TimeToTrigger
   useWhitecellList BOOLEAN
   },
   eventA4 SEQUENCE {
   a4-Threshold MeasTriggerQuantity,
   reportOnLeave BOOLEAN,
   hysteresis Hysteresis,
   timeToTrigger TimeToTrigger,
   useWhitecellList BOOLEAN
   },
   eventA5 SEQUENCE {
   a5-Threshold1 MeasTriggerQuantity,
   a5-Threshold2 MeasTriggerQuantity,
   reportOnLeave BOOLEAN,
   hysteresis Hysteresis,
   timeToTrigger TimeToTrigger,.
   useWhitecellList BOOLEAN
   },
   eventA6 SEQUENCE {
   a6-Offset MeasTriggerQuantityOffset,
   reportOnLeave BOOLEAN,
   hysteresis Hysteresis,
   timetoTrigger TimeToTrigger,
   usewhitecellList BOOLEAN
   },
   . . .
   },
   rsType NR-RS-Type,
   reportInterval Reportinterval,
   reportAmount ENUMERATED (r2, r2, r4, r8, r16, r32, r64, infinity),
   reportQuantityCell MeasReportQuantity,
   maxReportCells INTEGER (1 . . maxCellReport),
   reportQuantityRS-Indexes MeasReportQuantity OPTIONAL, -- Need R
```

```
    maxNrofRS-IndexesToReport INTEGER (1. . maxNrofIndexesToReport) OPTIONAL, --
NeedR
    includeBeamMeasurements BOOLEAN,
    reportAddNeighMeas ENUMERATED (setup) OPTIONAL, -- Need R
      [[
      includePredictions            BOOLEAN,
      ]]
 . . .
}
```

The following shows a ReportConfigNR information element when the UE 101 is configured with detailed information concerning what kind of predicted mobility information is to be reported.

```
-- ASNTSTART
-- TAG-REPORTCONFIGNR-START
ReportConfigNR : : = SEQUENCE {
  reportType CHOICE (
  periodical PeriodicalReportConfig,
  eventTriggered EventTriggerConfig,
  . . .
  reportCGI ReportCgI,
  [[
  reportSFTD ReportSFTD-NR
  ]]
  }
}
ReportCGI : := SEQUENCE {
  cellForWhichToReportVGI PhysCellId,
  . . .
}
ReportSFTD-NR : : = SEQUENCE {
  report SFTD-Meas BOOLEAN,
  reportRSRP BOOLEAN,
  . . .
}
EventTriggerConfig : : = SEQUENCE {
  eventId CHOICE {
  eventA1 SEQUENCE {
  a1-ThresholdMeasTriggerQuantity,
  reportOnLeave BOOLEAN,
  hysteresis Hysteresis,
  timeToTrigger TimeToTrigger
  },
  eventA2 SEQUENCE )
  a2-Threshold MeasTriggerOuantity,
  reportOnLeave BOOLEAN,
  hysteresis Hysteresis,
  timeToTrigger TimeToTrigger
  },
  eventA3 SEQUENCE }
  a3-Offset MeasTriggerQuantityOffset,
  reportOnLeave BOOLEAN,
  hysteresis Hysteresis,
  timeToTrigger TimeToTrigger,
  useWhiteCellList BOOLEAN
  },
  eventA3 SEQUENCE {
  a4-Threshold MeasTriggerQuantity,
  reportOnLeave BOOLEAN,
  hysteresis Hysteresis,
  timeToTrigger TimeToTrigger,
  useWhiteCellList BOOLEAN
  },
  eventA5 SEQUENCE {
  a5-Threshold1 MeasTriggerQuantity,
  a5-Threshold2 MeasTriggerQuantity,
  reportonLeave BOOLEAN,
  hysteresis Hysteresis,
  timeToTrigger TimeToTrigger,
  usewhitecellList BOOLEAN .
  },
  eventA6 SEQUENCE {
  a6-Offset MeasTriggerQuantityOffset,
  reportonLeave BOOLEAN,
```

```
hysteresis Hysteresis,
timeToTrigger TimeToTrigger,
useWhiteCellList BOOLEAN .
},
...
},
rSTypeNR-RS-Type,
reportInterval ReportInterval,
reportAmount ENUMERATED {r1, r2, r4, r8, r16, r32, r64, infinity},
reportQuantityCell MeasReportQuantity,
maxReportCells INTEGER (1. . maxcellReport),
reportQuantityRS-indexes MeasReportQuantity OPTIONAL, -- Need R
maxNrofRS-IndexesToReport INTEGER (1. . maxNrofIndexesToReport) OPTIONAL, -- Need R
includeBeamMeasurements BOOLEAN,
reportAddNeighMeas ENUMERATED {setup} OPTIONAL, -- Need R
   [
   predictionConfig                EventPredictionReportConfig,
   ]
...
}
EventPredictionReportConfig : : = SEQUENCE {
   reportPredictionQuantityCell MeasReportQuantity,
   maxPredictionReportCells INTEGER (1 . . maxCellReport),
   reportPredictionQuantityRS-Indexes MeasReportQuantity OPTIONAL, -- Need R
   maxNrofPredictionRS-IndexesToReport INTEGER (1. . maxNrofindexesToReport) OPTIONAL, --
Need
R
   includeBeamMeasurementsPrediction BOOLEAN,
   reportAddNeighPredictionMeas ENUMERATED (setup) OPTIONAL, -- Need R
```

The prediction reporting configuration may be implicitly derived from the event-triggered reporting configuration, e.g. as in ReportConfigNR. The UE 101 may comprise, in the measurement report predictions, associated to the same RS type for which it has been configured to perform measurement e.g. if UE 101 configured with a measId whose associated RS type is SSB, the UE 101 may comprise in the report predictions associated to SSB measurements, cell list derived from measurements based on SSB. The UE 101 may comprise in the measurement report predictions associated to the same trigger quantity for which it has been configured to perform measurement e.g. if the UE 101 is configured with a measId whose trigger quantity is RSRP, the UE 101 may comprise in the report predictions associated to RSRP measurements, e.g. cell list derived from measurements based on RSRP.

The predicted mobility information may be comprised in an event triggered measurement report may differ depending on the configuration in reportConfig.

The predicted mobility information may be comprised in an event triggered measurement report may differ depending on which event triggers the report.

A1 Event Comprising Predicted Measurement Information

If the UE 101 is configured with an A1 event, i.e. when the serving becomes better than a threshold, the UE 101 may be configured with an associated measurement object to indicate in a measurement report that a serving cell, with the associated measurement object, became better than a configured threshold based on a measurement quantity and RS type. Based on these A1 reports, the first network node 403a may take further actions such as activate a configured SCell that becomes in good conditions, route traffic via an SCell or PSCell that becomes better, consider that as a candidate for a handover/reconfiguration with sync, e.g. in case that is not the PCell already, re-configure the UE 101 to perform fewer measurements considering that this serving cell is good, e.g. above threshold, etc.

When a measurement report is triggered due to the fulfillment of the entering conditions, like for an A1 event, i.e. serving becomes better than threshold, for a given serving cell, the UE may comprise prediction of mobility information associated to non-serving cells in the serving frequency associated to the measurement object for which the A1 event that has been fulfilled e.g. cells in same frequency as SCell-X. At least one of the following in addition to RSRP of SCell-X: [Predicted RSRP of SCell-X1, Predicted RSRP of SCell-X1 after X seconds, Predicted RSRP of SCell-X1 after 2*X seconds, etc.]. A list of cells may be provided where each element in the list comprises a cell in the serving frequency whose predictions fulfill the A1 conditions, e.g. after k*X seconds.

If the UE 101 is configured with an A1 event, i.e. serving becomes better than a threshold, and if the reportConfig associated with at least one measId comprised in the measIdList within VarMeasConfig contains a reportQuantityRS-Indexes and maxNrofRS-IndexesToReport and contains an rsType set to ssb, the UE 101 may derive layer 3 filtered per beam for the serving cell based on SS/PBCH block. An equivalent action exists for CSI-RS based measurements. The UE 101 may comprise mobility prediction information associated to beam measurements.

Beam measurement information predictions may be associated to the beams to be reported for the associated serving cell, according to the criteria defined for A1. At least one of the following in addition to RSRP of beam measurement information for beams 1, 2, 3 of SCell-X: [Predicted RSRP of beam-1 of SCell-X after X seconds, Predicted RSRP of beam-1 of SCell-X after 2*X seconds, . . . Predicted RSRP of beam-1 of SCell-X after K*X seconds, Predicted RSRP of beam-2 of SCell-X after X seconds, Predicted RSRP of beam-2 of SCell-X after 2*X seconds, . . . , Predicted RSRP of beam-3 of SCell-X after X seconds, Predicted RSRP of beam-3 of SCell-X after 2*X seconds, . . . , Predicted RSRP of beam-3 of SCell-X after K*X seconds, . . . ].

One variant of the reported prediction values, like predicted RSRP, may be prediction related to whether the condition fulfilled for comprising beam measurements in the report is to remain or not after k*X seconds, where k may be an integer. The criteria to comprise serving cell beams may be that measurements may be above the beam quality threshold in measurement object. Hence, like at least one of the following in addition to RSRP of beam measurement information for beams 1, 2, 3 of SCell-X: [indication=TRUE i.e. Predicted RSRP of beam-1 of SCell-X after X seconds>beam quality threshold in measObject, indication=TRUE i.e. Predicted RSRP of beam-1 of SCell-X after 2*X seconds>beam quality threshold in measObject, . . . , indication=FALSE i.e. Predicted RSRP of beam-1 of SCell-X after K*X seconds<beam quality threshold in measObject, indication=TRUE i.e. Predicted RSRP of beam-2 of SCell-X after X seconds>beam quality threshold in measObject, indication=FALSE i.e. Predicted RSRP of beam-2 of SCell-X after 2*X seconds<beam quality threshold in measObject, . . . , indication=TRUE i.e. Predicted RSRP of beam-1 of SCell-X after K*X seconds>beam quality threshold in measObject,]

Beam reporting for the serving cell may be used by the first network node 403a to indicate which downlink beams should be configured/re-configured in a serving cell for beam management related procedures such as Transmission Configuration Indication (TCI) state configurations/re-configurations/activations/deactivations, beam switching, Radio Link Monitoring, beam reporting, beam failure detection configuration, beam failure recovery configuration, configuration of contention-free random access resources, e.g. mapped to downlink beams, etc. If in addition to the beam measurements the first network node 403a obtains predictions concerning beam measurement information the first network node 403a may be able to make more educated decisions concerning these procedures. In the case of contention-free random access resources, the first network node 403a may decide not to configure resources associated to a given beam that is reported as a good one, but whose predictions show that it may become worse after k*X seconds, which may be when the UE tries to perform random access.

When a measurement report is triggered due to the fulfillment of the entering conditions for an A1 event, i.e. serving becomes better than threshold, for a given serving cell associated to a serving frequency according to the associated measurement object, the UE 101 may comprise predictions of mobility information associated to that serving cell for which A1 has been fulfilled e.g. SCell-X. The mobility prediction in this case may be a set of measurement predictions for the trigger quantities and/or reporting quantities (like RSRP, RSRP or SINR) for the serving cell SCell-X. The report may comprise at least one of the following in addition to RSRP of SCell-X: [Predicted RSRP of SCell-X after X seconds, Predicted RSRP of SCell-X after 2*X seconds, etc.] for trigger quantity or reporting quantity e.g. RSRP. A variant of the reported prediction values, like predicted RSRP, RSRQ or SINR, may be prediction related to whether the condition triggering the event, in this example A1, is to remain or not after X* seconds, for example, the following report in addition to RSRP of SCell-X: [indication=TRUE i.e. Predicted RSRP of SCell-X after X seconds>A1 threshold, indication=TRUE i.e. Predicted RSRP of SCell-X after 2*X seconds>A1 threshold, indication=FALSE i.e. Predicted RSRP of SCell-X after X seconds<A1 threshold].

When a measurement report is triggered due to the fulfillment of the entering conditions for an A1 event, i.e. serving becomes better than threshold, for a given serving cell associated to a serving frequency according to the associated measurement object, the UE 101 may comprise predictions of mobility information associated to other serving cells i.e. not only for the one for which A1 has been fulfilled.

One advantage of these reported predictions may be that they may provide the first network node 403a with a further level of certainty that the reported information for the serving cell remains valid, if the predicted values also show that the values remains above the threshold for Al. Hence, the first network node decision based on this may be more certain, which may improve performance, especially if other A1 event instances associated to other SCells are also being reported and showing a different pattern. Beam measurement information predictions may be associated to other beams of the serving cell that are not to be comprised in the measurement report according to the Al criteria. In other words, these may be information about additional beams in SCell-X. Assuming that according to the specified criteria, the UE 101 may be configured to report beams 1, 2, 3 of SCell-X, in addition to these the UE 101 may report at least one of the following: [Predicted RSRP of beam-5 of SCell-X1 after X seconds, Predicted RSRP of beam-5 of SCell-X1 after 2*X seconds, . . . , Predicted RSRP of beam-9 of SCell-X1 after X seconds, Predicted RSRP of beam-9 of SCell-X1 after 2*X seconds, . . . ,] where beam-9 and beam-5 would have not been necessarily comprised in the A1 measurement report if the method is not applied. A variant where only the state of these beams are comprised is also comprised e.g. an indication that the condition is fulfilled for the predictions after k*X seconds.

Predicted beam measurement information for the cells that are not the serving cell triggering the event A1 may be comprised.

Other predicted mobility information may also be comprised in measurement reports triggered by A1 events.

In prior art, the UE 101 may be configured to report the best cells in a serving frequency. According to the present disclosure, the UE 101 may be configured to report the best predicted cells in the serving frequency according to a time criteria e.g. in the next X seconds, where X could also be configured by the first network node 403a. There may be multiple lists, one per X value.

A2 Event Comprising Predicted Measurement Information

If the UE 101 is configured with an A2 event, e.g. serving becomes worse than a threshold, the UE 101 may be configured with an associated measurement object to indicate in a measurement report that a serving cell, with the associated measurement object, became worse than a configured threshold based on a measurement quantity and RS type. Based on these A2 reports, the first network node 403a may take further actions such as deactivate a configured SCell that becomes in worse conditions, route traffic via another SCell or PSCell that are still good or at least better than the reported cell, consider that as a candidate to be released and/or deactivated, re-configure the UE 101 to perform additional measurements to find other cells in that frequency, configure inter-frequency measurements, configure inter-RAT measurements, etc.

When a measurement report is triggered due to the fulfillment of the entering conditions for an A2 event, i.e. serving becomes worse than threshold, for a given serving cell associated to a serving frequency according to the associated measurement object, the UE 101 may comprise predictions of mobility information associated to that serving cell for which A2 has been fulfilled e.g. SCell-X. The mobility prediction in this case may be a set of measurement predictions for the trigger quantities and/or reporting quantities, like RSRP, RSRP or SINR, for the serving cell SCell-X. The report may comprise at least one of the following in addition to RSRP of SCell-X: [Predicted RSRP of SCell-X after X seconds, Predicted RSRP of SCell-X after 2*X seconds, etc.] for trigger quantity or reporting quantity e.g. RSRP. A variant of the reported prediction values like predicted RSRP, RSRQ or SINR, may be prediction related to whether the condition triggering the event, e.g. A2, is to remain or not after X* seconds, for example, the following report in addition to RSRP of SCell-X: [indication=TRUE i.e. Predicted RSRP of SCell-X after X seconds<A2 threshold, indication=TRUE i.e. Predicted RSRP of SCell-X after 2*X seconds<A2 threshold, indication=FALSE i.e. Predicted RSRP of SCell-X after X seconds<A2 threshold].

When a measurement report is triggered due to the fulfillment of the entering conditions for an A2 event, i.e. serving becomes worse than threshold, for a given serving cell associated to a serving frequency according to the associated measurement object, the UE 101 may comprise predictions of mobility information associated to other serving cells i.e. not only for the one for which A2 has been fulfilled.

One advantage of these reported predictions is that they may provide the first network node 403a with a further level of certainty that the reported information for the serving cell remains valid, if the predicted values also show that the values remains below the threshold for A2. Hence, the first network node decision based on this may be more certain, which may improve performance, especially if other A2 or A1 event instances associated to other SCells are also being reported and showing a different pattern.

When a measurement report is triggered due to the fulfillment of the entering conditions, like for an A2 event, i.e. serving becomes worse than threshold, for a given serving cell, the UE 101 may comprise prediction of mobility information associated to non-serving cells in the serving frequency associated to the measurement object for which the A2 event that has been fulfilled e.g. cells in same frequency as SCell-X. At least one of the following in addition to RSRP of SCell-X: [Predicted RSRP of SCell-X1, Predicted RSRP of SCell-X1 after X seconds, Predicted RSRP of SCell-X1 after 2*X seconds, etc.]. A list of cells may be provided where each element in the list comprises a cell in the serving frequency whose predictions fulfill the A2 conditions, e.g. after k*X seconds.

If the UE 101 is configured with an A2 event, i.e. serving becomes worse than a threshold, and if the reportConfig associated with at least one measId comprised in the measIdList within VarMeasConfig comprises a reportQuantityRS-Indexes and maxNrofRS-IndexesToReport and comprises an rsType set to ssb, the UE 101 may derive layer 3 filtered per beam for the serving cell based on SS/PBCH block. An equivalent action exists for CSI-RS based measurements. The UE 101 may comprise mobility prediction information associated to beam measurements.

Beam measurement information predictions may be associated to the beams to be reported for the associated serving cell, according to the criteria defined for A2. At least one of the following in addition to RSRP of beam measurement information for beams 1, 2, 3 of SCell-X: [Predicted RSRP of beam-1 of SCell-X after X seconds, Predicted RSRP of beam-1 of SCell-X after 2*X seconds, . . . Predicted RSRP of beam-1 of SCell-X after K*X seconds, Predicted RSRP of beam-2 of SCell-X after X seconds, Predicted RSRP of beam-2 of SCell-X after 2*X seconds, . . . , Predicted RSRP of beam-3 of SCell-X after X seconds, Predicted RSRP of beam-3 of SCell-X after 2*X seconds, . . . , Predicted RSRP of beam-3 of SCell-X after K*X seconds, . . . ].

One variant of the reported prediction values, like predicted RSRP, may be prediction related to whether the condition fulfilled for inclusion of beam measurements in the report is to remain or not after k*X seconds, where k may be an integer. The criteria to comprise serving cell beams may be that measurements should be above the beam quality threshold in measurement object. Hence, like at least one of the following in addition to RSRP of beam measurement information for beams 1, 2, 3 of SCell-X: [indication=TRUE i.e. Predicted RSRP of beam-1 of SCell-X after X seconds>beam quality threshold in measObject, indication=TRUE i.e. Predicted RSRP of beam-1 of SCell-X after 2*X seconds>beam quality threshold in measObject, . . . , indication=FALSE i.e. Predicted RSRP of beam-1 of SCell-X after K*X seconds<beam quality threshold in measObject, indication=TRUE i.e. Predicted RSRP of beam-2 of SCell-X after X seconds>beam quality threshold in measObject, indication=FALSE i.e. Predicted RSRP of beam-2 of SCell-X after 2*X seconds<beam quality threshold in measObject, . . . , indication=TRUE i.e. Predicted RSRP of beam-1 of SCell-X after K*X seconds>beam quality threshold in measObject,]

Beam reporting for the serving cell may be used by the first network node 403a to indicate which downlink beams should be configured/re-configured in a serving cell for beam management related procedures such as TCI state configurations/re-configurations/activations/deactivations, beam switching, Radio Link Monitoring, beam reporting, beam failure detection configuration, beam failure recovery configuration, configuration of contention-free random access resources, mapped to downlink beams, etc. If in addition to the beam measurements the first network node 403a obtains predictions concerning beam measurement information the first network node 403a is able to make more educated decisions concerning these procedures. In the case of contention-free random access resources, the first network node 403a may decide not to configure resources associated to a given beam that is reported as a good one, but whose predictions show that it may become worse after k*X seconds, which may be when the UE 101 tries to perform random access.

In another alternative, beam measurement information predictions may be associated to other beams of the serving cell that are not to be comprised in the measurement report according to the A2 criteria. In other words, these could be information about additional beams in SCell-X. Assuming that according to the specified criteria the UE 101 is configured to report beams 1, 2, 3 of SCell-X, in addition to these the UE 101 may report according to the method at least one of the following: [Predicted RSRP of beam-5 of SCell-X1 after X seconds, Predicted RSRP of beam-5 of SCell-X1 after 2*X seconds, . . . , Predicted RSRP of beam-9 of SCell-X1 after X seconds, Predicted RSRP of beam-9 of SCell-X1 after 2*X seconds, . . . ,] where beam-9 and beam-5 would have not been necessarily comprised in the A1 measurement report if the method is not applied. A variant where only the state of these beams are comprised is also comprised e.g. an indication that the condition is fulfilled for the predictions after k*X seconds.

The method also comprises the comprising of predicted beam measurement information for the cells that are not the serving cell triggering the event A2.

Other predicted mobility information as described in the section about the types of predicted mobility information may also be comprised in measurement reports triggered by A2 events.

In prior art, the UE 101 may be configured to report the best cells in a serving frequency. According to the present disclosure, the UE 101 may be configured to report the best predicted cells in the serving frequency according to a time-related criteria e.g. in the next X seconds, where X could also be configured by the network. There may be multiple lists, one per X value.

A3 Event Comprising Predicted Measurement Information

If the UE 101 is configured with an A3 event, i.e. Neighbour becomes offset better than SpCell. the UE 101 may be configured with an associated measurement object to indicate in a measurement report that a neighbor cell in the frequency associated to the measurement object became an offset better than the SpCell, e.g. PCell or PSCell in a serving frequency, where measurements are based on a measurement quantity and RS type. Based on these A3 reports, the first network node 403a may take further actions such as handovers, reconfiguration with sync, PSCell changes, PSCell releases, re-configure the UE 101 to perform additional measurements to find cells in another frequency, in case A3 has been configured for intra-frequency measurements, etc. Mobility prediction information associated to the following cells may be comprised when an A3 event is triggered:

SpCell for which the event A3 has been configured, e.g. PCell or PSCell;
Triggered Cells;
Non-triggered Cells;
Neighbor cells on serving frequencies, e.g. best cells;
Other serving cells e.g. SCells associated to the MCG, SCells associated to the Secondary Cell Group (SCG), PSCell, etc.
Other cells in the serving frequency;
Now, more details about these cells will be provided:

When a measurement report is triggered due to the fulfillment of the entering conditions for an A3 event, i.e. neighbor becomes offset better than SpCell, for an SpCell and the triggered neighbor cells, the UE 101 may comprise predictions of mobility information associated to that SpCell for which A3 has been fulfilled e.g. SCell-X. The mobility prediction in this case may be a set of measurement predictions for the trigger quantities and/or reporting quantities, like RSRP, RSRP or SINR, for the SpCell. The report may comprise at least one of the following in addition to RSRP and RSRQ, and possibly SINR, of SpCell: [Predicted RSRP of SpCell after X seconds, Predicted RSRP of SpCell after 2*X seconds . . . Predicted RSRP of SpCell after K*X seconds] for trigger quantity and/or reporting quantity e.g. RSRP, RSRQ, SINR, etc.

When a measurement report is triggered due to the fulfillment of the entering conditions for an A3 event, i.e. neighbor becomes offset better than SpCell, for an SpCell and the triggered neighbor cells, the UE 101 may comprise predictions of mobility information associated to the triggered cells for which A3 has been fulfilled, e.g. Cell-1, Cell-2, Cell-3. The mobility prediction in this case may be a set of measurement predictions for the trigger quantities and/or reporting quantities, like RSRP, RSRP or SINR, for the triggered cells, e.g. Cell-1, Cell-2, Cell-3. The report may comprise at least one of the following in addition to RSRP and RSRQ, and possibly SINR, of triggered cells, e.g. Cell-1, Cell-2, Cell-3: [Predicted RSRP of Cell-1 after X seconds, Predicted RSRP of Cell-1 after 2*X seconds, . . . , Predicted RSRP of Cell-1 after K*X seconds, Predicted RSRP of Cell-2 after X seconds, Predicted RSRP of Cell-2 after 2*X seconds, . . . , Predicted RSRP of Cell-2 after K*X seconds, Predicted RSRP of Cell-3 after X seconds, Predicted RSRP of Cell-3 after 2*X seconds, . . . , Predicted RSRP of Cell-3 after K*X seconds,] for trigger quantity and/or reporting quantity e.g. RSRP, RSRQ, SINR, etc.

A variant of the reported prediction values, like predicted RSRP, RSRQ or SINR, may be prediction related to whether the condition triggering the event, in this example A3, is to remain or not after X* seconds, for example for the triggered cells, as shown below in the case of triggered cells Cell-1, Cell2, Cell-3: [indication=TRUE i.e. prediction indicates that Cell-1 after X seconds still fulfills A3 condition, indication=TRUE i.e. prediction indicates that Cell-1 after 2*X seconds still fulfills A3 condition, . . . , indication=FALSE i.e. prediction indicates that Cell-1 after K*X seconds does not fulfill A3 condition, indication=TRUE i.e. prediction indicates that Cell-2 after X seconds still fulfills A3 condition, indication=TRUE i.e. prediction indicates that Cell-2 after 2*X seconds still fulfills A3 condition, . . . , indication=FALSE i.e. prediction indicates that Cell-2 after K*X seconds does not fulfill A3 condition, indication=TRUE i.e. prediction indicates that Cell-3 after X seconds still fulfills A3 condition, indication=TRUE i.e. prediction indicates that Cell-3 after 2*X seconds still fulfills A3 condition, . . . , indication=FALSE i.e. prediction indicates that Cell-3 after K*X seconds does not fulfill A3 condition,].

One advantage of these reported predictions is that they may provide the first network node 403a with a further level of certainty that the reported information for the serving cell remains valid, if the predicted values also show that the values remains below the threshold for A2. Hence, the first network node decision based on this may be more certain, which may improve performance, especially if other A2 or A1 event instances associated to other SCells are also being reported and showing a different pattern.

When a measurement report is triggered due to the fulfillment of the entering conditions for an A3 event the UE 101 may comprise predictions of mobility information associated to serving cells i.e. not only for SpCell. The predicted mobility information for the serving cells may be at least one of the information described for events A1 and/or A2.

When a measurement report is triggered due to the fulfillment of the entering conditions for an A3 event the UE 101 may comprise predictions of mobility information associated to best neighbor cells in serving frequencies. The predicted mobility information for the serving cells may be at least one of the information described for events A1 and/or A2.

When a measurement report is triggered due to the fulfillment of the entering conditions, like for an A3 event for a set of triggered cells and the associated SpCell, the UE 101 may comprise prediction of mobility information associated to non-triggered cells in the frequency associated to the measurement object for which the A3 event that has been fulfilled e.g. cells in same frequency of the triggered cells. For the best k-th cell Cell-X1 in the frequency for that A3 event, like at least one of the following: [Predicted RSRP of Cell-X1, Predicted RSRP of Cell-X1 after X seconds, Predicted RSRP of SCell-X1 after 2*X seconds, etc.]. A list of cells may be provided where each element in the list comprises a cell in the frequency associated to the A3 measurement object whose predictions fulfill the A3 conditions, e.g. after k*X seconds, where k and/or N may be configure. A selection or sorting function may be present where only predictions for the best N cells, where N could be configurable in a reporting configuration, are to be comprised.

If the UE 101 is configured with an A3 event associated to a measurement identity (measId) and if report QuantityRS-Indexes and maxNrofRS-IndexesToReport for the associated reportConfig are configured, the UE 101 may derive layer 3 filtered beam measurements only based on CSI-RS and/or SSB, depending on the associated RS type being configured as SSB or CSI-RS, for each measurement quantity indicated in reportQuantityRS-Indexes. And, when A3 event is triggered, the UE 101 may comprise in the measurement report beam measurement information for the triggered cells, similar beam measurement information for the SpCell, and similar beam measurement information for other configured serving cells.

Mobility prediction information may be comprised for beams in event-triggered measurements reports associated to an A3 event, for beams of types of cells as listed in this section such as triggered cells, associated SpCell, other configured serving cells, best cells in serving frequencies, non-triggered cells, etc. Some examples of this will now be provided.

Beam measurement information predictions may be associated to the beams to be reported for the associated SpCell, according to the criteria defined for A3. At least one of the following in addition to RSRP of beam measurement information for beams 1, 2, 3 of SpCell: [Predicted RSRP of beam-1 of SpCell after X seconds, Predicted RSRP of beam-1 of SpCell after 2*X seconds, . . . Predicted RSRP of beam-1 of SpCell after K*X seconds, Predicted RSRP of beam-2 of SpCell after X seconds, Predicted RSRP of beam-2 of SpCell after 2*X seconds, . . . , Predicted RSRP of beam-3 of SpCell after X seconds, Predicted RSRP of beam-3 of SpCell after 2*X seconds, . . . , Predicted RSRP of beam-3 of SpCell after K*X seconds, . . . ].

Where beam measurement information predictions may be associated to the beams to be reported for the triggered cells according to the criteria defined for A3, e.g. Cell-1, Cell-2, Cell-3. At least one of the following in addition to RSRP of beam measurement information for beams 1, 2, 3 of each triggered cell: [Predicted RSRP of beam-1 of Cell-1 after X seconds, Predicted RSRP of beam-1 of Cell-1 after 2*X seconds, . . . Predicted RSRP of beam-1 of Cell-1 after K*X seconds, Predicted RSRP of beam-2 of Cell-1 after X seconds, Predicted RSRP of beam-2 of Cell-1 after 2*X seconds, . . . , Predicted RSRP of beam-3 of Cell-1 after X seconds, Predicted RSRP of beam-3 of Cell-1 after 2*X seconds, . . . , Predicted RSRP of beam-3 of Cell-1 after K*X seconds, . . . , Predicted RSRP of beam-1 of Cell-2 after X seconds, Predicted RSRP of beam-1 of Cell-2 after 2*X seconds, . . . Predicted RSRP of beam-1 of Cell-2 after K*X seconds, Predicted RSRP of beam-2 of Cell-2 after X seconds, Predicted RSRP of beam-2 of Cell-2 after 2*X seconds, . . . , Predicted RSRP of beam-3 of Cell-2 after X seconds, Predicted RSRP of beam-3 of Cell-2 after 2*X seconds, . . . , Predicted RSRP of beam-3 of Cell-2 after K*X seconds, . . . Predicted RSRP of beam-1 of Cell-3 after X seconds, Predicted RSRP of beam-1 of Cell-3 after 2*X seconds, . . . Predicted RSRP of beam-1 20 of Cell-3 after K*X seconds, Predicted RSRP of beam-2 of Cell-3 after X seconds, Predicted RSRP of beam-2 of Cell-3 after 2*X seconds, . . . , Predicted RSRP of beam-3 of Cell-3 after X seconds, Predicted RSRP of beam-3 of Cell-3 after 2*X seconds, . . . , Predicted RSRP of beam-3 of Cell-3 after K*X seconds, . . . ].

The reported prediction values, like predicted RSRP, may be prediction related to whether the condition is fulfilled for inclusion of beam measurements in the report is to remain or not after k*X seconds, where k may be an integer. The criteria to comprise beams for triggered cells may be that measurements should be above the beam quality threshold in measurement object. Hence, like at least one of the following in addition to RSRP of beam measurement information for beams 1, 2, 3 of SpCell and/or triggered cells: [indication=TRUE i.e. Predicted RSRP of beam-1 of Cell-1 after X seconds>beam quality threshold in measObject].

Beam reporting for the triggered cells and serving cells may be used by the first network node 403a to indicate which downlink beams should be configured/re-configured in a potential target cell for beam management related procedures such as TCI state configurations/re-configurations/activations/deactivations, beam switching, Radio Link Monitoring, beam reporting, beam failure detection configuration, beam failure recovery configuration, configuration of contention-free random access resources, mapped to downlink beams, etc. If in addition to the beam measurements the first network node 403 may obtain predictions concerning beam measurement information the first network node 403a may be able to make more educated decisions concerning these procedures. In the case of contention-free random access resources, the first network node 403a may decide not to configure resources associated to a given beam that is reported as a good one, but whose predictions show that it may become worse after k*X seconds, which may be when the UE 101 tries to perform random access.

Beam measurement information predictions may be associated to other beams of the SpCell that are not to be comprised in the measurement report according to the A3 criteria. In other words, these may be information about additional beams in SpCell. Assuming that according to the specified criteria the UE 101 may be configured to report beams 1, 2, 3 of SpCell, in addition to these the UE 101 may report according to the method at least one of the following: [Predicted RSRP of beam-5 of SpCell after X seconds, Predicted RSRP of beam-5 of SpCell after 2*X seconds, . . . , Predicted RSRP of beam-9 of SpCell after X seconds, Predicted RSRP of beam-9 of SpCell after 2*X seconds, . . . ,] where beam-9 and beam-5 would have not been necessarily comprised in the A3v measurement report if the method is not applied. A variant where only the state of these beams are comprised is also comprised e.g. an indication that the condition is fulfilled for the predictions after k*X seconds.

Beam measurement information predictions may be associated to other beams of the triggered cells that are not to be comprised in the measurement report according to the A3 criteria. In other words, these may be information about additional beams in triggered cells. Assuming that according to the specified criteria the UE 101 may be configured to report beams 1, 2, 3 of a given triggered cell Cell-1, in addition to these the UE 101 may report according to the method at least one of the following: [Predicted RSRP of beam-5 of Cell-1 after X seconds, Predicted RSRP of beam-5 of Cell-1 after 2*X seconds, . . . , Predicted RSRP of beam-9 of Cell-1 after X seconds, Predicted RSRP of beam-9 of Cell-1 after 2*X seconds, . . . ,] where beam-9 and beam-5 would have not been necessarily comprised in the A3v measurement report if the method is not applied. A variant where only the state of these beams are comprised is also comprised e.g. an indication that the condition is fulfilled for the predictions after k*X seconds.

Predicted beam measurement information may be comprised for the cells that are not the SpCell triggering the event A3.

Other predicted mobility information may also be comprised in measurement reports triggered by A3 events.

In prior art, the UE 101 may be configured to report the best cells in a serving frequency. According to the present disclosure, the UE 101 may be configured to report the best predicted cells in the serving frequency according to a time-related criteria e.g. in the next X seconds, where X could also be configured by the first network node 403a. There may be multiple lists, one per X value.

A4 Event Comprising Predicted Measurement Information

If the UE 101 is configured with an A4 event, i.e. neighbor becomes better than a threshold, the UE 101 may be configured with an associated measurement object to indicate in a measurement report that a neighbor cell, with the associated measurement object, became better than a configured threshold based on a measurement quantity and RS type. Based on these A4 reports, the first network node 403a may take further actions such as configured a SCell that becomes in good conditions in a non-serving frequency, consider that as a candidate for a handover and for further even configuration, consider that as a candidate for load balancing, etc.

Mobility prediction information associated to the following cells may be comprised when an A4 event is triggered:
SpCell for which the event A4 has been configured, e.g. PCell or PSCell;
Triggered Cells;
Non-triggered Cells;
Neighbor cells on serving frequencies, e.g. best cells;
Other serving cells e.g. SCells associated to the MCG, SCells associated to the SCG, PSCell, etc.
Other cells in the serving frequency;

When a measurement report is triggered due to the fulfillment of the entering conditions for an A4 event, i.e. neighbor becomes better than threshold, for a given neighbor cell associated to a frequency according to the associated measurement object, the UE 101 may comprise predictions of mobility information associated to the neighbor cells that fulfilled the triggering condition for the event, i.e. neighboring triggered cells, for which A4 has been fulfilled e.g. Cell-X. The mobility prediction in this case may be a set of measurement predictions for the trigger quantities and/or reporting quantity, like RSRP, RSRP or SINR) for the neighbor Cell-X. The report may comprise at least one of the following in addition to RSRP of Cell-X: [Predicted RSRP of Cell-X after X seconds, Predicted RSRP of Cell-X after 2*X seconds, etc.] for trigger quantity or reporting quantity e.g. RSRP. A variant of the reported prediction values, like predicted RSRP, RSRQ or SINR, may be prediction related to whether the condition triggering the event, in this example A4, is to remain or not after X* seconds, for example, the following report in addition to RSRP of Cell-X: [indication=TRUE i.e. Predicted RSRP of Cell-X after X seconds>A4 threshold, indication=TRUE i.e. Predicted RSRP of Cell-X after 2*X seconds>A4 threshold, indication=FALSE i.e. Predicted RSRP of Cell-X after X seconds<A4 threshold].

When a measurement report is triggered due to the fulfillment of the entering conditions for an A4 event, i.e. serving becomes better than threshold, for a given neighbor cell, associated to a frequency according to the associated measurement object, the UE 101 may comprise predictions of mobility information associated to serving cells.

One advantage of these reported predictions is that they may provide the first network node 403a with a further level of certainty that the reported information for the neighbor cells that are triggered cells remains valid, if the predicted values also show that the values remains above the threshold for A4. Hence, the first network node decision based on this may be more certain, which may improve performance, especially if other A4 event instances associated to other frequencies are also being reported and showing a different pattern.

When a measurement report is triggered due to the fulfillment of the entering conditions for an A4 event the UE 101 may comprise predictions of mobility information associated to best neighbor cells in serving frequencies. The predicted mobility information for the serving cells may be at least one of the information described for events A1 and/or A2.

When a measurement report is triggered due to the fulfillment of the entering conditions, like for an A4 event for a set of triggered cells and the associated SpCell, the UE 101 may comprise prediction of mobility information associated to non-triggered cells in the frequency associated to the measurement object for which the A4 event that has been fulfilled e.g. cells in same frequency of the triggered cells. For the best k-th cell Cell-X1 in the frequency for that A4 event, like at least one of the following: [Predicted RSRP of Cell-X1, Predicted RSRP of Cell-X1 after X seconds, Predicted RSRP of SCell-X1 after 2*X seconds, etc.]. A list of cells may be provided where each element in the list comprises a cell in the frequency associated to the A4 measurement object whose predictions fulfill the A4 conditions, e.g. after k*X seconds, where k and/or N may be configured. A selection or sorting function may be present where only predictions for the best N cells. N may be configurable in a reporting configuration.

If the UE 101 is configured with an A4 event, i.e. when the neighbor becomes better than a threshold, associated to a measurement identity (measId) and if reportQuantityRS-Indexes and maxNrofRS-IndexesToReport for the associated reportConfig are configured, the UE 101 may derive layer 3 filtered beam measurements only based on CSI-RS and/or SSB, depending on the associated RS type being configured as SSB or CSI-RS, for each measurement quantity indicated in reportQuantityRS-Indexes. And, when A4 event is triggered, the UE 101 may comprise in the measurement report beam measurement information for the triggered cells, similar beam measurement information for the SpCell, and similar beam measurement information for other configured serving cells.

Mobility prediction information for beams may be comprised in event-triggered measurements reports associated to an A4 event, for beams of types of cells as listed in this section such as triggered cells, associated SpCell, other configured serving cells, best cells in serving frequencies, non-triggered cells, etc. Below some details will be provided:

Beam measurement information predictions may be associated to the beams to be reported for the associated neighbour cells, according to the criteria defined for A4. At least one of the following in addition to RSRP of beam measurement information for beams 1, 2, 3 of a triggered neighbor cell Cell-X: [Predicted RSRP of beam-1 of Cell-X after X seconds, Predicted RSRP of beam-1 of Cell-X after 2*X seconds, . . . Predicted RSRP of beam-1 of Cell-X after K*X seconds, Predicted RSRP of beam-2 of Cell-X after X seconds, Predicted RSRP of beam-2 of Cell-X after 2*X seconds, . . . , Predicted RSRP of beam-3 of Cell-X after X seconds, Predicted RSRP of beam-3 of Cell-X after 2*X seconds, . . . , Predicted RSRP of beam-3 of Cell-X after K*X seconds, . . . ].

The reported prediction values, like predicted RSRP, may be prediction related to whether the condition fulfilled for inclusion of beam measurements in the report is to remain or not after k*X seconds, where k may be an integer. The criteria to comprise triggered cell beams may be that measurements should be above the beam quality threshold in the associated measurement object. Hence, like at least one of the following in addition to RSRP of beam measurement information for beams 1, 2, 3 of each triggered cell Cell-X: [indication=TRUE i.e. Predicted RSRP of beam-1 of Cell-X after X seconds>beam quality threshold in measObject, indication=TRUE i.e. Predicted RSRP of beam-1 of Cell-X after 2*X seconds>beam quality threshold in measObject, . . . , indication=FALSE i.e. Predicted RSRP of beam-1 of Cell-X after K*X seconds<beam quality threshold in measObject, indication=TRUE i.e. Predicted RSRP of beam-2 of Cell-X after X seconds>beam quality threshold in measObject, indication=FALSE i.e. Predicted RSRP of beam-2 of Cell-X after 2*X seconds<beam quality threshold in measObject, . . . , indication=TRUE i.e. Predicted RSRP of beam-1 of Cell-X after K*X seconds>beam quality threshold in measObject].

Beam reporting for the triggered cell may be used by the first network node 403a to indicate which downlink beams should be configured/re-configured in a serving cell for beam management related procedures such as TCI state configurations/re-configurations/activations/deactivations, beam switching, Radio Link Monitoring, beam reporting, beam failure detection configuration, beam failure recovery configuration, configuration of contention-free random access resources, e.g. mapped to downlink beams, etc. If in addition to the beam measurements the network obtains predictions concerning beam measurement information the first network node 403a is able to make more educated decisions concerning these procedures. In the case of contention-free random access resources, the first network node 403a may decide not to configure resources associated to a given beam that is reported as a good one, but whose predictions show that it may become worse after k*X seconds, which may be when the UE 101 tries to perform random access.

Beam measurement information predictions may be associated to other beams of a triggered cell that are not to be comprised in the measurement report according to the A4 criteria. In other words, these may be information about additional beams in Cell-X. Assuming that according to the specified criteria the UE 101 may be configured to report beams 1, 2, 3 of Cell-X, in addition to these the UE 101 may report according to the method at least one of the following: [Predicted RSRP of beam-5 of Cell-X1 after X seconds, Predicted RSRP of beam-5 of Cell-X1 after 2*X seconds, . . . , Predicted RSRP of beam-9 of Cell-X1 after X seconds, Predicted RSRP of beam-9 of Cell-X1 after 2*X seconds, . . . ,] where beam-9 and beam-5 would have not been necessarily comprised in the A1 measurement report if the method is not applied. A variant where only the state of these beams are comprised may also be comprised e.g. an indication that the condition is fulfilled for the predictions after k*X seconds.

Predicted beam measurement information may be comprised for the cells that are not the triggered cells triggering the event A4.

Other predicted mobility information may also be comprised in measurement reports triggered by A4 events.

In prior art, the UE 101 may be configured to report the best cells in a serving frequency. According to the present disclosure, the UE 101 may be configured to report the best predicted cells in the serving frequency according to a time criteria e.g. in the next X seconds, where X could also be configured by the network. There may be multiple lists, one per X value.

A5 Event Comprising Predicted Measurement Information

If the UE 101 is configured with an A5 event, i.e. SpCell becomes worse than threshold1 and neighbor becomes better than threshold2, the UE 101 may be configured with an associated measurement object to indicate in a measurement report that a neighbor cell in the frequency associated to the measurement object became better than threshold2, while the SpCell, e.g. PCell or PSCell in a serving frequency, becomes worse than a threshold 1, where measurements are based on a measurement quantity and RS type. Based on these A5 reports, the first network node 403a may take further actions in particular inter-frequency actions such as handovers, reconfiguration with sync, PSCell changes, PSCell releases, re-configure the UE 101 to perform additional measurements to find cells in another frequency in case A3 has been configured for intra-frequency measurements, release with redirect, etc. Receiving an A5 event and not an A3 could be an indication that the first network node 403a should try to move the UE to another frequency as there might be no better neighbors in that serving frequency.

Mobility prediction information may be comprised and may be associated to the following cells when an A5 event is triggered:

SpCell for which the event A5 has been configured, e.g. PCell or PSCell;
Triggered Cells;
Non-triggered Cells;
Neighbor cells on serving frequencies, e.g. best cells;
Other serving cells e.g. SCells associated to the MCG, SCells associated to the SCG, PSCell, etc.
Other cells in the serving frequency;
Some details about these cells will now be provided.

When a measurement report is triggered due to the fulfillment of the entering conditions for an A5 event, i.e. SpCell becomes worse than threshold1 and neighbor becomes better than threshold2, for an SpCell and the triggered neighbor cells, the UE 101 may comprise predictions of mobility information associated to that SpCell for which A5 has been fulfilled e.g. Cell-X. The mobility prediction in this case may be a set of measurement predictions for the trigger quantities and/or reporting quantities like RSRP, RSRQ or SINR for the SpCell. The report may comprise at least one of the following in addition to RSRP and RSRQ, and possibly SINR, of SpCell: [Predicted RSRP of SpCell after X seconds, Predicted RSRP of SpCell after 2*X seconds, . . . , Predicted RSRP of SpCell after K*X seconds] for trigger quantity and/or reporting quantity e.g. RSRP, RSRQ, SINR, etc.

When a measurement report is triggered due to the fulfillment of the entering conditions for an A5 event for a SpCell and the triggered neighbor cells, the UE 101 may comprise predictions of mobility information associated to the triggered neighbor cells for which A5 has been fulfilled, e.g. Cell-1, Cell-2, Cell-3. The mobility prediction in this case may be a set of measurement predictions for the trigger quantities and/or reporting quantities like RSRP, RSRP or SINR for the triggered cells, e.g. Cell-1, Cell-2, Cell-3. The report may comprise at least one of the following in addition to RSRP and RSRQ and possibly SINR of triggered cells, e.g. Cell-1, Cell-2, Cell-3: [Predicted RSRP of Cell-1 after X seconds, Predicted RSRP of Cell-1 after 2*X seconds, . . . , Predicted RSRP of Cell-1 after K*X seconds, Predicted RSRP of Cell-2 after X seconds, Predicted RSRP of Cell-2 after 2*X seconds, . . . , Predicted RSRP of Cell-2 after K*X seconds, Predicted RSRP of Cell-3 after X seconds, Predicted RSRP of Cell-3 after 2*X seconds, ..., Predicted RSRP of Cell-3 after K*X seconds,] for trigger quantity and/or reporting quantity e.g. RSRP, RSRQ, SINR, etc.

A variant of the reported prediction values, like predicted RSRP, RSRQ or SINR, may be prediction related to whether the condition triggering the event, in this example A5, is to remain or not after X* seconds, for example for the triggered cells, as shown below in the case of triggered cells Cell-1, Cell2, Cell-3: [indication=TRUE i.e. prediction indicates that Cell-1 and SpCell after X seconds still fulfills A5 condition, indication=TRUE i.e. prediction indicates that Cell-1 and SpCell after 2*X seconds still fulfills A5 condition, ..., indication=FALSE i.e. prediction indicates that Cell-1 and SpCell after K*X seconds does not fulfill A5 condition, indication=TRUE i.e. prediction indicates that Cell-2 and SpCell after X seconds still fulfills A5 condition, indication=TRUE i.e. prediction indicates that Cell-2 and SpCell after 2*X seconds still fulfills A5 condition, ..., indication=FALSE i.e. prediction indicates that Cell-2 and SpCell after K*X seconds does not fulfill A5 condition, indication=TRUE i.e. prediction indicates that Cell-3 and SpCell after X seconds still fulfills A5 condition, indication=TRUE i.e. prediction indicates that Cell-3 and SpCell after 2*X seconds still fulfills A5 condition, ..., indication=FALSE i.e. prediction indicates that Cell-3 and SpCell after K*X seconds does not fulfill A5 condition].

One advantage of these reported predictions is that they may provide the first network node 403a a further level of certainty that the reported information for the SpCell and neighbor cells in a given frequency remains valid, if the predicted values also show that the values remains below/above the thresholds for A5. Hence, the first network node decision based on this may be more certain, which may improve performance, especially if other report instances, like A3 and/or A5 and/or A2 and/or A4 and/or A1 associated are also being reported and showing a different pattern.

When a measurement report is triggered due to the fulfillment of the entering conditions for an A5 event the UE 101 may comprise predictions of mobility information associated to other serving cells, i.e. not only for SpCell. The predicted mobility information for the serving cells may be at least one of the information described for events A1 and/or A2.

When a measurement report is triggered due to the fulfillment of the entering conditions for an A3 event the UE 101 may comprise predictions of mobility information associated to best neighbor cells in serving frequencies. The predicted mobility information for the serving cells may be at least one of the information described for events A1 and/or A2.

The method may comprise that when a measurement report is triggered due to the fulfillment of the entering conditions, like for an A5 event for a set of triggered cells and the associated SpCell, the UE 101 may comprise prediction of mobility information associated to non-triggered neighbor cells in the frequency associated to the measurement object for which the A5 event that has been fulfilled e.g. cells in same frequency of the triggered cells. For the best k-th cell Cell-X1 in the frequency for that A5 event, like at least one of the following: [Predicted RSRP of Cell-X1, Predicted RSRP of Cell-X1 after X seconds, Predicted RSRP of SCell-X1 after 2*X seconds, etc.]. A list of cells may be provided where each element in the list comprises a cell in the frequency associated to the A5 measurement object whose predictions fulfill the A5 conditions, e.g. after k*X seconds, where k and/or N may be configured. The method may comprise a selection or sorting function where only predictions for the best N cells are to be comprised, where N could be configurable in a reporting configuration.

If the UE 101 is configured with an A5 event associated to a measurement identity (measId) and if report QuantityRS-Indexes and maxNrofRS-IndexesToReport for the associated reportConfig are configured, the UE 101 may derive layer 3 filtered beam measurements only based on CSI-RS and/or SSB, depending on the associated RS type being configured as SSB or CSI-RS, for each measurement quantity indicated in reportQuantityRS-Indexes. And, when A5 event is triggered, the UE 101 may comprise in the measurement report beam measurement information for the triggered neighbour cells, similar beam measurement information for the SpCell, and similar beam measurement information for other configured serving cells.

Mobility prediction information may be comprised for beams in event-triggered measurements reports associated to an A5 event, for beams of types of cells as listed in this section such as triggered cells, associated SpCell, other configured serving cells, best cells in serving frequencies, non-triggered cells, etc. Below some details of this will be provided.

Beam measurement information predictions may be associated to the beams to be reported for the associated SpCell, according to the criteria defined for A5. At least one of the following in addition to RSRP of beam measurement information for beams 1, 2, 3 of SpCell: [Predicted RSRP of beam-1 of SpCell after X seconds, Predicted RSRP of beam-1 of SpCell after 2*X seconds, ... Predicted RSRP of beam-1 of SpCell after K*X seconds, Predicted RSRP of beam-2 of SpCell after X seconds, Predicted RSRP of beam-2 of SpCell after 2*X seconds, ..., Predicted RSRP of beam-3 of SpCell after X seconds, Predicted RSRP of beam-3 of SpCell after 2*X seconds, ..., Predicted RSRP of beam-3 of SpCell after K*X seconds, ... ].

Beam measurement information predictions may be associated to the beams to be reported for the triggered cells according to the criteria defined for A5, e.g. Cell-1, Cell-2, Cell-3. At least one of the following in addition to RSRP of beam measurement information for beams 1, 2, 3 of each triggered cell: [Predicted RSRP of beam-1 of Cell-1 after X seconds, Predicted RSRP of beam-1 of Cell-1 after 2*X seconds, ... Predicted RSRP of beam-1 of Cell-1 after K*X seconds, Predicted RSRP of beam-2 of Cell-1 after X seconds, Predicted RSRP of beam-2 of Cell-1 after 2*X seconds, ..., Predicted RSRP of beam-3 of Cell-1 after X seconds, Predicted RSRP of beam-3 of Cell-1 after 2*X seconds, ..., Predicted RSRP of beam-3 of Cell-1 after K*X seconds, ..., Predicted RSRP of beam-1 of Cell-2 after X seconds, Predicted RSRP of beam-1 of Cell-2 after 2*X seconds, ... Predicted RSRP of beam-1 of Cell-2 after K*X seconds, Predicted RSRP of beam-2 of Cell-2 after X seconds, Predicted RSRP of beam-2 of Cell-2 after 2*X seconds, ..., Predicted RSRP of beam-3 of Cell-2 after X seconds, Predicted RSRP of beam-3 of Cell-2 after 2*X seconds, ..., Predicted RSRP of beam-3 of Cell-2 after K*X seconds, ... Predicted RSRP of beam-1 of Cell-3 after X seconds, Predicted RSRP of beam-1 of Cell-3 after 2*X seconds, ... Predicted RSRP of beam-1 of Cell-3 after K*X seconds, Predicted RSRP of beam-2 of Cell-3 after X seconds, Predicted RSRP of beam-2 of Cell-3 after 2*X seconds, ..., Predicted RSRP of beam-3 of Cell-3 after X seconds, Predicted RSRP of beam-3 of Cell-3 after 2*X seconds, ..., Predicted RSRP of beam-3 of Cell-3 after K*X seconds, ... ].

The reported prediction values, like predicted RSRP, may be prediction related to whether the condition fulfilled for inclusion of beam measurements in the report is to remain or not after k*X seconds, where k may be an integer. The criteria to comprise beams for triggered cells may be that measurements should be above the beam quality threshold in measurement object. Hence, like at least one of the following in addition to RSRP of beam measurement information for beams 1, 2, 3 of SpCell and/or triggered cells: [indication=TRUE i.e. Predicted RSRP of beam-1 of Cell-1 after X seconds>beam quality threshold in measObject].

Beam reporting for the triggered cells and serving cells may be used by the first network node 403a to indicate which downlink beams should be configured/re-configured in a potential target cell for beam management related procedures such as TCI state configurations/re-configurations/activations/deactivations, beam switching, Radio Link Monitoring, beam reporting, beam failure detection configuration, beam failure recovery configuration, configuration of contention-free random access resources, e.g. mapped to downlink beams, etc. If in addition to the beam measurements the network obtains predictions concerning beam measurement information the first network node 403a may be able to make more educated decisions concerning these procedures. In the case of contention-free random access resources, the first network node 403a may decide not to configure resources associated to a given beam that is reported as a good one, but whose predictions show that it may become worse after k*X seconds, which may be when the UE 101 tries to perform random access.

Beam measurement information predictions may be associated to other beams of the SpCell that are not to be comprised in the measurement report according to the A5 criteria. In other words, these may be information about additional beams in SpCell.

Assuming that according to the specified criteria the UE 101 may be configured to report beams 1, 2, 3 of SpCell, in addition to these the UE 101 may report according to the method at least one of the following: [Predicted RSRP of beam-5 of SpCell after X seconds, Predicted RSRP of beam-5 of SpCell after 2*X seconds, . . . , Predicted RSRP of beam-9 of SpCell after X seconds, Predicted RSRP of beam-9 of SpCell after 2*X seconds, . . . ,] where beam-9 and beam-5 would have not been necessarily comprised in the A3v measurement report if the method is not applied. A variant where only the state of these beams are comprised may be comprised e.g. an indication that the condition is fulfilled for the predictions after k*X seconds.

Bbeam measurement information predictions may be associated to other beams of the neighbour triggered cells that are not to be comprised in the measurement report according to the A5 criteria. In other words, these may be information about additional beams in neighbour triggered cells. Assuming that according to the specified criteria the UE 101 is configured to report beams 1, 2, 3 of a given triggered cell Cell-1, in addition to these the UE 101 may report according to the method at least one of the following: [Predicted RSRP of beam-5 of Cell-1 after X seconds, Predicted RSRP of beam-5 of Cell-1 after 2*X seconds, . . . , Predicted RSRP of beam-9 of Cell-1 after X seconds, Predicted RSRP of beam-9 of Cell-1 after 2*X seconds, . . . ,] where beam-9 and beam-5 would have not been necessarily comprised in the A5 measurement report if the method is not applied. A variant where only the state of these beams are comprised is also comprised e.g. an indication that the condition is fulfilled for the predictions after k*X seconds.

Predicted beam measurement information may be comprised for the cells that are not the SpCell triggering the event A5.

Other predicted mobility information may also be comprised in measurement reports triggered by A5 events.

In prior art, the UE 101 may be configured to report the best cells in a serving frequency. According to the present disclosure, the UE 101 may be configured to report the best predicted cells in the serving frequency according to a time-related criteria e.g. in the next X seconds, where X could also be configured by the network. There may be multiple lists, one per X value.

A6 Event Comprising Predicted Measurement Information

If the UE 101 is configured with an A6 event, i.e. neighbor becomes offset better than SCell, the UE 101 may be configured with an associated measurement object to indicate in a measurement report that a neighbor cell in the frequency associated to the measurement object became an offset better than an SCell where measurements are based on a measurement quantity and RS type. Based on these A6 reports, the first network node 403a may take further actions such as handovers, reconfiguration with sync, SCell additions, SCell releases, re-configure the UE to perform additional measurements to find cells in another frequency, SCell activations, SCell deactivations, etc.

Mobility prediction information may be comprised which may be associated to the following cells when an A6 event is triggered:

SCell for which the event A6 has been configured;
Triggered Cells, i.e. neighbor cells becoming better than the SCell;
Non-triggered Cells;
Neighbor cells on serving frequencies, e.g. best cells;
Other serving cells e.g. SpCell(s), SCells associated to the MCG, SCells associated to the SCG, PSCell, etc.
Other cells in the serving frequency;
Some more details about these cells will now be provided.

When a measurement report is triggered due to the fulfillment of the entering conditions for an A6 event, i.e. neighbor becomes offset better than SCell, for an SCell and the triggered neighbor cells, the UE 101 may comprise predictions of mobility information associated to that SCell for which A6 has been fulfilled e.g. SCell-X. The mobility prediction in this case may be a set of measurement predictions for the trigger quantities and/or reporting quantities, like RSRP, RSRP or SINR, for the SCell. The report may comprise at least one of the following in addition to RSRP and RSRQ, and possibly SINR, of SpCell: [Predicted RSRP of SCell-X after X seconds, Predicted RSRP of SCell-X after 2*X seconds, . . . , Predicted RSRP of SCell-X after K*X seconds] for trigger quantity and/or reporting quantity e.g. RSRP, RSRQ, SINR, etc.

When a measurement report is triggered due to the fulfillment of the entering conditions for an A6 event, i.e. neighbor becomes offset better than SpCell, for an SpCell and the triggered neighbor cells, the UE 101 may predictions of mobility information associated to the triggered cells for which A6 has been fulfilled, e.g. Cell-1, Cell-2, Cell-3. The mobility prediction in this case may be a set of measurement predictions for the trigger quantities and/or reporting quantities, like RSRP, RSRP or SINR, for the triggered cells, e.g. Cell-1, Cell-2, Cell-3. The report may comprise at least one of the following in addition to RSRP and RSRQ and possibly SINR of triggered cells, e.g. Cell-1, Cell-2, Cell-3: [Predicted RSRP of Cell-1 after X seconds, Predicted RSRP of Cell-1 after 2*X seconds, . . . , Predicted RSRP of Cell-1 after K*X seconds, Predicted RSRP of Cell-2 after X seconds, Predicted RSRP of Cell-2 after 2*X seconds, . . . , Predicted RSRP of Cell-2 after K*X seconds, Predicted RSRP of Cell-3 after X seconds, Predicted RSRP of Cell-3 after 2*X seconds, . . . , Predicted RSRP of Cell-3 after K*X seconds,] for trigger quantity and/or reporting quantity e.g. RSRP, RSRQ, SINR, etc.

A variant of the reported prediction values, like predicted RSRP, RSRQ or SINR, may be prediction related to whether the condition triggering the event, in this example A6, is to remain or not after X* seconds, for example for the triggered cells, as shown below in the case of triggered cells Cell-1, Cell2, Cell-3: [indication=TRUE i.e. prediction indicates that Cell-1 and SCell-X after X seconds still fulfills A6 condition, indication=TRUE i.e. prediction indicates that Cell-1 and SCell-X after 2*X seconds still fulfills A6 condition, . . . , indication=FALSE i.e. prediction indicates that Cell-1 and SCell-X after K*X seconds does not fulfill A6 condition, indication=TRUE i.e. prediction indicates that Cell-2 and SCell-X after X seconds still fulfills A6 condition, indication=TRUE i.e. prediction indicates that Cell-2 and SCell-X after 2*X seconds still fulfills A6 condition, . . . , indication=FALSE i.e. prediction indicates that Cell-2 and SCell-X after K*X seconds does not fulfill A6 condition, indication=TRUE i.e. prediction indicates that Cell-3 and SCell-X after X seconds still fulfills A6 condition, indication=TRUE i.e. prediction indicates that Cell-3 and SCell-X after 2*X seconds still fulfills A6 condition, . . . , indication=FALSE i.e. prediction indicates that Cell-3 and SCell-X after K*X seconds does not fulfill A6 condition].

One advantage of these reported predictions is that they may provide the first network node 403a with a further level of certainty that the reported information for the SCell in a given frequency and neighbor cells supposedly better remains valid, if the predicted values also show that the conditions for A6 remain for some time. Hence, the first network node 403a decision based on this may be more certain, which may improve performance, especially if other event instances associated to other SCells are showing a different pattern.

When a measurement report is triggered due to the fulfillment of the entering conditions for an A6 event the UE 101 may comprise predictions of mobility information associated to serving cells i.e. not only for the SCell associated to that A6 event. The predicted mobility information for the serving cells may be at least one of the information described for events A1 and/or A2.

When a measurement report is triggered due to the fulfillment of the entering conditions for an A3 event the UE 101 may comprise predictions of mobility information associated to best neighbor cells in serving frequencies. The predicted mobility information for the serving cells may be at least one of the information described for events A1 and/or A2.

When a measurement report is triggered due to the fulfillment of the entering conditions, like for an A6 event for a set of triggered cells and the associated SCell, the UE 101 may comprise prediction of mobility information associated to non-triggered cells in the frequency associated to the measurement object for which the A6 event that has been fulfilled e.g. cells in same frequency of the triggered neighbor cells. For the best k-th cell Cell-X1 in the frequency for that A3 event, like at least one of the following: [Predicted RSRP of Cell-X1, Predicted RSRP of Cell-X1 after X seconds, Predicted RSRP of SCell-X1 after 2*X seconds, etc.]. A list of cells may be provided where each element in the list comprises a cell in the frequency associated to the A6 measurement object whose predictions fulfill the A6 conditions, e.g. after k*X seconds, where k and/or N may be configured. The method may comprises a selection or sorting function where only predictions for the best N cells, where N could be configurable in a reporting configuration, are to be comprised.

If the UE 101 is configured with an A6 event associated to a measurement identity (measId) and if report QuantityRS-Indexes and maxNrofRS-IndexesToReport for the associated reportConfig are configured, the UE 101 may derive a layer 3 filtered beam measurements only based on CSI-RS and/or SSB, depending on the associated RS type being configured as SSB or CSI-RS, for each measurement quantity indicated in reportQuantityRS-Indexes. And, when A6 event is triggered, the UE 101 may comprise in the measurement report beam measurement information for the triggered cells, similar beam measurement information for the associated SCell, and similar beam measurement information for other configured serving cells, like the SpCells and other SCells.

Mobility prediction information may be comprised for beams in event-triggered measurements reports associated to an A6 event, for beams of types of cells as listed in this section such as triggered cells, associated SpCell, other configured serving cells, best cells in serving frequencies, non-triggered cells, etc. Below some details will be provided.

Beam measurement information predictions may be associated to the beams to be reported for the associated SCell, according to the criteria defined for A6. At least one of the following in addition to RSRP of beam measurement information for beams 1, 2, 3 of SpCell: [Predicted RSRP of beam-1 of SpCell after X seconds, Predicted RSRP of beam-1 of SpCell after 2*X seconds, . . . Predicted RSRP of beam-1 of SpCell after K*X seconds, Predicted RSRP of beam-2 of SpCell after X seconds, Predicted RSRP of beam-2 of SpCell after 2*X seconds, . . . , Predicted RSRP of beam-3 of SpCell after X seconds, Predicted RSRP of beam-3 of SpCell after 2*X seconds, . . . , Predicted RSRP of beam-3 of SpCell after K*X seconds, . . . ].

Beam measurement information predictions may be associated to the beams to be reported for the triggered neighbour cells according to the criteria defined for A6, e.g. Cell-1, Cell-2, Cell-3. At least one of the following in addition to RSRP of beam measurement information for beams 1, 2, 3 of each triggered cell: [Predicted RSRP of beam-1 of Cell-1 after X seconds, Predicted RSRP of beam-1 of Cell-1 after 2*X seconds, . . . Predicted RSRP of beam-1 of Cell-1 after K*X seconds, Predicted RSRP of beam-2 of Cell-1 after X seconds, Predicted RSRP of beam-2 of Cell-1 after 2*X seconds, . . . , Predicted RSRP of beam-3 of Cell-1 after X seconds, Predicted RSRP of beam-3 of Cell-1 after 2*X seconds, . . . , Predicted RSRP of beam-3 of Cell-1 after K*X seconds, . . . , Predicted RSRP of beam-1 of Cell-2 after X seconds, Predicted RSRP of beam-1 of Cell-2 after 2*X seconds, . . . Predicted RSRP of beam-1 of Cell-2 after K*X seconds, Predicted RSRP of beam-2 of Cell-2 after X seconds, Predicted RSRP of beam-2 of Cell-2 after 2*X seconds, . . . , Predicted RSRP of beam-3 of Cell-2 after X seconds, Predicted RSRP of beam-3 of Cell-2 after 2*X seconds, . . . , Predicted RSRP of beam-3 of Cell-2 after K*X seconds, . . . , Predicted RSRP of beam-1 of Cell-3 after X seconds, Predicted RSRP of beam-1 of Cell-3 after 2*X seconds, . . . Predicted RSRP of beam-1 of Cell-3 after K*X seconds, Predicted RSRP of beam-2 of Cell-3 after X seconds, Predicted RSRP of beam-2 of Cell-3 after 2*X seconds, . . . , Predicted RSRP of beam-3 of Cell-3 after X seconds, Predicted RSRP of beam-3 of Cell-3 after 2*X seconds, . . . , Predicted RSRP of beam-3 of Cell-3 after K*X seconds, . . . ].

The reported prediction values, like predicted RSRP, may be prediction related to whether the condition fulfilled for comprising beam measurements in the report is to remain or not after k*X seconds, where k may be an integer. The criteria to comprise beams for triggered cells may be that measurements should be above the beam quality threshold in measurement object. Hence, like at least one of the following in addition to RSRP of beam measurement information for beams 1, 2, 3 of SpCell and/or triggered cells: [indication=TRUE i.e. Predicted RSRP of beam-1 of Cell-1 after X seconds>beam quality threshold in measObject].

Beam reporting for the triggered cells and serving cells may be used by the first network node 403a to indicate which downlink beams should be configured/re-configured in a potential target cell for beam management related procedures such as TCI state configurations/re-configurations/activations/deactivations, beam switching, Radio Link Monitoring, beam reporting, beam failure detection configuration, beam failure recovery configuration, configuration of contention-free random access resources, e.g. mapped to downlink beams, etc. If in addition to the beam measurements the first network node 403a may obtain predictions concerning beam measurement information the network is able to make more educated decisions concerning these procedures. In the case of contention-free random access resources, the first network node 403a may decide not to configure resources associated to a given beam that is reported as a good one, but whose predictions show that it may become worse after k*X seconds, which may be when the UE 101 tries to perform random access.

Beam measurement information predictions may be associated to other beams of the associated SCell that are not to be comprised in the measurement report according to the A6 criteria. In other words, these may be information about additional beams in SCell. Assuming that according to the specified criteria the UE 101 is configured to report beams 1, 2, 3 of the 6-associated SCell, in addition to these, the UE 101 may report according to the method at least one of the following: [Predicted RSRP of beam-5 of SCell after X seconds, Predicted RSRP of beam-5 of SCell after 2*X seconds, . . . , Predicted RSRP of beam-9 of SCell after X seconds, Predicted RSRP of beam-9 of SCell after 2*X seconds, . . . ,] where beam-9 and beam-5 would have not been necessarily comprised in the A6 measurement report if the method is not applied. A variant where only the state of these beams are comprised is also comprised e.g. an indication that the condition is fulfilled for the predictions after k*X seconds.

Beam measurement information predictions may be associated to other beams of the triggered cells that are not to be comprised in the measurement report according to the A6 criteria. In other words, these may be information about additional beams in triggered neighbour cells fulfilled the A6 criteria. Assuming that according to the specified criteria, the UE 101 may be configured to report beams 1, 2, 3 of a given triggered cell Cell-1, in addition to these the UE 101 may report according to the method at least one of the following: [Predicted RSRP of beam-5 of Cell-1 after X seconds, Predicted RSRP of beam-5 of Cell-1 after 2*X seconds, . . . , Predicted RSRP of beam-9 of Cell-1 after X seconds, Predicted RSRP of beam-9 of Cell-1 after 2*X seconds, . . . ,] where beam-9 and beam-5 would have not been necessarily comprised in the A3v measurement report if the method is not applied. A variant where only the state of these beams are comprised is also comprised e.g. an indication that the condition is fulfilled for the predictions after k*X seconds.

Predicted beam measurement information may be comprised for the cells that are not the SCell triggering the event A6.

Other predicted mobility information may also be comprised in measurement reports triggered by A6 events.

In prior art, the UE 101 may be configured to report the best cells in a serving frequency. According to the present disclosure, the UE 101 may be configured to report the best predicted cells in the serving frequency according to a time-related criteria e.g. in the next X seconds, where X could also be configured by the first network node 403a. There may be multiple lists, one per X value.

General for Other Events

For all reports comprising predictions, likelihood, probabilities and/or accuracies related to the reported predictions may be comprised. The report of these associated information may be configured by the first network node 403a, i.e. UE 101 may comprise this if the first network node 403a configures a field associated to that e.g. in ReportConfig.

For all reports comprising predictions, time-relates information for the prediction may be comprised. The report of this associated information may be configured by the network i.e. UE 101 may only comprise if the first network node 403a configures a field associated to that e.g. in ReportConfig.

One advantage of reporting additional cells that are not triggered has to do with robustness. The first network node 403a may prepare these cells as candidates for re-establishment in failure a handover failure happens or candidates for conditional handover.

Similar principles apply for inter-RAT events like B1 and B2, where mobility information prediction may be associated to inter-RAT cells/beams/frequencies.

Prediction Reporting Content and Structure

Predicted mobility information has been described above. Below, further description is provided. Signaling alternatives to report these predictions with measurements is also described.

Predictions of which neighbor cells and associated neighbor nodes may be target candidates for mobility procedures, e.g. handovers, reconfiguration with sync, SCG addition, SCG change, release with redirect, etc. An application of the predictions of radio measurements reported by the UE 101, e.g. cell level/beam level RSRP, RSRQ, SINR based on SSB and/or CSI-RS, may be to assist the first network node 403a to take decisions related to mobility management such as release with redirect to a target RAT, carrier, cell; handovers; conditional handovers; PSCell additions; PSCell changes, handovers, reconfiguration with sync, conditional handovers, SCG additions, SCG changes, SCG release, release with redirect, conditional SCG addition, conditional SCG change, etc.

The measurement prediction report may be a new message e.g. defined in RRC specifications, where the IEs are similar to the ones defined for measurement reports but contains predictions. The UE 101 may indicate in the report a time related information associated to the prediction e.g. some validity and/or an indication that the reported prediction is the predicted value for a given future time, such as the predicted value in the next X seconds, or the list of cells and/or beams in sequence indicating where the UE 101 is going.

The information reported by the UE 101 may be enriched by a time information associated to the mobility information e.g. Cell A in X seconds, Cell A at time stamp T0, Cell A will have RSRP=Y at time stamp T0, Cell A will have RSRP=Y in X seconds, etc. that information may be used by the network to perform paging, e.g. Radio Access Network (RAN) paging for Inactive UEs 101. There may also be some reporting configuration associated to that time related information e.g. indication to comprise that or a maximum time value so the UE 101 only comprise predictions valid within a certain time window like next X cells the UE 101 will move in the next Y seconds/minutes/hours.

The new message may be as shown below:
MeasurementPredictionReport

The MeasurementPredictionReport message is used for the indication of predicted measurement results.

Signalling radio bearer: SRB1, SRB3
RLC-SAP: AM
Logical channel: DCCH
Direction: UE to Network The MeasurementPredictionReport message may be as follows:

```
-- ASB1START
-- TAG-MEASUREMENTPREDICTIONREPORT-START
MeasurementPredictionReport : : = SEQUENCE {
    criticalExtensions CHOICE {
        measurementPredictionReport MeasurementPredictionReport-IEs,
        criticalExtensionFuture SEQUENCE { }
    }
}
MeasurementPredictionReport -IEs : : = SEQUENCE {
    measPredictionResults MeasPredictionResults,
    lateNonCriticalExtension OCTET STRING OPTIONAL,
    nonCriticalExtension SEQUENCE { } OPTIONAL
}
-- TAG- MEASUREMENTPREDICTIONREPORT -STOP
-- ASN1STOP
```

MeasPredictionResults

The IE MeasPredictionResults covers measured results for intra-frequency, inter-frequency, and inter-RAT mobility.

The MeasPredictionResults information element may be as follows:

```
-- ASN1START
-- TAG-MEASRESULTS-START
MeasPredictionResults : : = SEQUENCE {
    measId MeasId,
    measPredictionResultServingMOListMeasResultServMOList,
    measPredictionResult NeighCells Choice {
    measPredictionResultListNRMeasResultListNR,
    ...,
    measPredictionResultListEUTRA MeasResultListEUTRA
    } OPTIONAL,
    ...,
    [[
    measPredictionResultServFreqlistEUTRA-SCG MeasResultServFreqListEUTRA-SCG OPTIONAL,
    measPredictionResultServFreglistNR-SCG MeasResultServFreglistNR-SCG OPTIONAL,
    measPredictionResultSFTD-EUTRA MeasResultSFTD-EUTRA OPTIONAL,
    measPredictionResultSFTD-NRMeasResultCellSHTD-NROPTIONAL
    ]]
}
MeasResultServMOList : : = SEQUENCE (SiZE (1 . . maxNrofServingCells)) OF MeasResultServMO
MeasResultServMO : : = SEQUENCE {
    servCellIdServCellIndex,
    measResultServingCell MeasResultNR,
    measResultBestNeighCell MeasResultNR OPTIONAL,
    ...
}
MeasResultListNRSEQUENCE (SIZE (1 . . maxcellReport)) OF MeasResultNR
MeasResultNR : : = SEQUENCE {
    physCellId PhysCellId OPTIONAL,
    measResult SEQUENCE {
    cellResults SEQUENCE {
    resultsSSB-Cell MeasQuantityResults OPTIONAL,
    resultsCSI-RS-Cell MeascQuantityResults OPTIONAL
    },
    rsIndexResults SEQUENCE{
    resultsSSB-Indexes ResultsPerSSB IndexList OPTIONAL,
    resultsCSI-RS Indexes ResultsPerCSI-RS-IndexList OPTIONAL
    } OPTIONAL
    },
    ...,
    [[
    cgi-info CGI-InfoNR OPTIONAL
    ]]
}
MeasResultListEUTRA : : = SEQUENCE (SIZE (1 . . maxCellReport)) OF MeasResultEUTRA
MeasResultEUTRA : : = SEQUENCE
    eutra-PhysCellId PhysCellId,
    measResult MeasQuantityResultsEUTRA,
    cgi-info CGI-InfoEUTRA OPTIONAL, . . .
}
MultiBandInfoListEUTRA : : = SEQUENCE (SIZE (1. . maxMultiBands)) OF FreqBandIndicatorEUTRA
MeasQuantityResults : : = SEQUENCE {
    rsrp RSRP-Range OPTIONAL,
    rsrq RSRQ-Range OPTIONAL,
    sinr SINR-Range OPTIONAL
}
```

```
MeasQuantityResultsEUTRA : := SEQUENCE {
  rsrp RSRP-RangeEUTRA OPTIONAL,
  rsrq RSRQ-RangeEUTRA OPTIONAL,
  sinr SINR-RangeEUTRA OPTIONAL
}
ResultsPerSSB-IndexList::= SEQUENCE (SIZE (1. (1 . . maxNrofIndexesToReport2)) OF ResultsPerSSB-
Index
ResultsPerSSB-Index : : = SEQUENCE {
  ssb-Index SSB-Index,
  ssb-Results MeasQuantityResults OPTIONAL
}
ResultsPerCSI-RS Indexlist : : = SEQUENCE (SIZE (1 . . maxNrofIndesesToReport2)) OF
ResultsPerCSI-RS Index
ResultsPerCSI-RS-Index SEQUENCE {
  csi-RS-Index CSI-RS Index,
  csi-RS-Results MeasQuantityResults OPTIONAL
}
MeasResultservFreqListEUTRA-SCG : := SEQUENCE (SIZE (1 . . maxNrofServingCells EUTRA)) OF
MeasResult2EUTRA
MeasResultServFreqListNR SCG : : = SEQUENCE (SIZE (1 . . maxNrofServingCells)) OF
MeasResult2NR
-- TAG-MEASRESULTS-STOP
-- ASN1STOP
```

As described before there may be different predicted mobility information that is comprised in a measurement prediction report, possibly with the measurements comprised in the reported. The measurement prediction information may be comprised in a measurement report, possibly together with measurements results.

MeasResults

The IE MeasResults covers measured results and predictions for intra-frequency, inter-frequency, and inter-RAT mobility.

A MeasResults information element may be as follows:

```
-- ASN1START
-- TAG-MEASRESULTS-START
MeasResults : : = SEQUENCE {
    meas Id MeasId,
    measResultServingMOListMeasResultServMOList,
    measPredictionResultServingMOList MeasResultServMOList,
    measResultNeighCells CHOICE {
    measResultListNR MeasResultListNR,
    . . . ,
    measResultListEUTRA MeasResultListEUTRA
    } OPTIONAL,
    measPredcitionsResultNeighcells CHOICE {
    measPredictionResultListNR MeasResultListNR,
    . . .
    measPredictionResultListEUTRA MeasResultListEUTRA
    } OPTIONAL,
    . . . ,
    [[
    measResultServFreqlistEUTRA-SCG MeasResultServFreqListEUTRA-SCG OPTIONAL,
    measResultServFreqlistNR-SCGMeasResultServFreqListNR-SCGOPTIONAL,
    measResultSFTD-EUTRA MeasResultSFTD-EUTRA OPTIONAL,
    measResultSFTD-NR MeasResultCellSFTD-NR OPTIONAL.
    ]],
    [[
    measPredictionResultServFreqListEUTRA-SCG MeasResultServFreqListEUTRA-SCG OPTIONAL,
    measPredictionResultServFreglistNR-SCG MeasResultServFreqListNR-SCG OPTIONAL,
    measPredictionResultSFTD-EUTRA MeasResultSFTD-EUTRA OPTIONAL,
    measPredictionResultSFTD-NR MeasResultCellSFTD-NR OPTIONAL
    ]]
    }
    MeasResultServMOList : : = SEQUENCE (SIZE (1 . . maxNrofServingCells)) OF MeasResultServMO
    MeasResultservMO ::= SEQUENCE {
      servCellId ServCellIndex,
      measResultServingCell MeasResultNR,
      measResultBestNeighCell MeasResultNR OPTIONAL,
      . . .
    }
    MeasResultLisNR : : = SEQUENCE (SIZE (1 . . maxCellReport)) OF MeasResultNR
    MeasResultNR : : = SEQUENCE }
      physCellId PhysCellId OPTIONAL,
      measResult SEQUENCE {
      cellResults SEQUENCE{
      resultsSSB-Cell MeasQuantityResults OPTAONAL,
      resultsCSI-RS-Cell MeasQuantityResults OPTIONAL
```

```
},
rsIndexResults SEQUENCE{
resultsSSB-Indexes ResultsPerSSB-IndexList OPTIONAL,
resultsCSI-RS Indexes ResultsPerCSI-RS-Indexlist OPTIONAL
} OPTIONAL
},
...,
[[
cgi-Info CGI-InfoNR OPTIONAL
]]
}
MeasResultListEUTRA : : = SEQUENCE (SIZE (1..maxcellReport)) OF MeasResultEUTRA T
MeasResultEUTRA : : = SEQUENCE {
  eutraPhysCellIdPhysCellId,
  measResult MeasQuantityResultsEUTRA,
  cgi-Info CGI-InfoEUTRA OPTIONAL, . . .
}
MultiBandInfoListEUTRA : : = SEQUENCE (SIZE (1 . . maxMultiBands)) OF FreqBandIndicatorEUTRA
MeasouantityResults SEQUENCE {
  rsrp RSRP-Range OPTIONAL,
  rsrq RSRO-Range OPTIONAL,
  sinrSINR-RangeQPTIONAL
}
MeasQuantityResultsEUTRA : : = SEQUENCE {
  rSrp RSRP-RangeEUTRA OPTIONAL,
  rsrq RSRQ-RangeEUTRA OPTIONAL,
  sinr SINR-RangeEUTRA OPTIONAL
}
ResultsPerSSB-IndexList::= SEQUENCE SIZE (1 . . maxNrofIndexesToReport2)) OF ResultsPerSSB-
Index
ResultsPerSSB Index : : = SEQUENCE {
  ssb-Index SSB-Index,
  ssb-Results Meas uantityResults OPTIONAL
}
ResultsPerCSI-RS-Indexlist : : = SEQUENCE { (SIZE (1 . . maxNrofIndexesToReport2)) OF
ResultsPerCSI-RS-Index
ResultsPerCSI-RS-Index SEQUENCE {
  csi-RS-Index CSI-RS-Index,
  csi-RS-Results MeasQuantityResults OPTIONAL
}
MeasResultServFreqlistEUTRA-SCG : : = SEQUENCE (SIZE (1 . . maxNrofServingCells EUTRA)) OF
MeasResult2EUTRA
MeasResultServFreqListNR-SCG : : = SEQUENCE (SIZE (1 . . maxNrofServingCells)) OF
MeasResult2NR
-- TAG-MEASRESULTS-STOP
-- ASN1STOP
```

The UE 101 may report a list of cells and/or beams, e.g. comprising cells and beam identifiers, in the report for the cells and/or beams the UE 101 predicts that is going to, e.g. in the next X seconds, possibly with a certain probability. The UE 101 may comprise the cell and/or beam with an associated likelihood to enter the coverage of that cell and/or beam(s). In a variant, the reporting configuration comprises a likelihood threshold indicating to the UE 101 that only cells with likelihood above the threshold are to be reported.

The UE 101 may have a limited number of predictive cells to be reported. Hence, a sorting function is needed. The UE 101 may use the trigger quantity as sorting quantity to sort cells and/beams accordingly and comprise the ones with highest sorting quantity. In another solution, the likelihood is used as sorting criterion i.e. UE 101 may comprise the cells with highest likelihood.

Network Aspects

The present disclosure relates to a method at a first network node 403a, also called a source network node or source gNB, for performing measurement prediction configuration, measurement configuration and mobility management, the method comprising:

Configuring a UE 101 to perform predictions of radio quality related parameters such as RSRP, RSRQ, SINR in a given frequency, e.g. per cell, per beam, per RS type like SSB and/or CSI-RS, etc.;

Configuring a UE 101 to report these predictions of radio quality related parameters;

Receiving from a UE 101 reports containing measurements and/or prediction of measurements and making mobility decisions based on these reports.

There may be different decisions the first network node 403a may take based on UE reports comprising measurements and/or prediction of measurements and making mobility decisions based on these reports.

Usage of reported measurements and reported measurement predictions for CHO configurations and HO configurations will now be described.

The first network node 403a may receive in a report measurements associated to a set of reported triggered cells, RSRP, RSRQ, SINR for cells C1, C2, C3, and predicted measurements of a set of predicted cells, not necessarily overlapping with the triggered cells, e.g. RSRP, RSRQ, SINR for cells C4, C5, associated to an A3 event. An enhanced version where prediction of measurements may be comprised herein. Upon reception of these measurements and predictions of measurements, the first network node 403a may initiate a CHO preparation procedure, which may be a handover preparation procedure over Xn with a flag indicating this is a CHO, for cells C4 and C5, which are not triggered cells but predicted cells. This is based on the likelihood that C4 and C5 will appear as additional cells anyway that would be later needed to be added to the UE's CHO configuration. This may be done in addition to the CHO preparation of cells C4 and C5. The first network node 403a may verify the predicted values for the measurements of the predicted cells before taking this decision e.g. it only prepares these predicted cells for CHO if predictions are above a certain value and/or associated real/current value, if reported and available, are also above a certain threshold.

Upon receiving from each target candidate cell/node requested based on the predicted measurements that were reported, according to UE methods, the confirmation of acceptance for CHO and the target's configuration for the UE 101, e.g. an RRCReconfiguration message to be applied on top of UE's current configuration, the first network node 403a may have different choices:

The first network node 403a may provide the CHO configurations to the UE 101;

The first network node 403a may store at least one CHO configuration, i.e. it stores the RRCReconfiguration with a reconfiguration with sync per target candidate, or equivalent configuration in another format, for these cells and only provides to the UE upon reception of some further indication/report, different compared to existing CHO where that is provided to the UE 101 upon reception from target candidates.

This sub-sequent indication from the UE 101 may be a measurement report based on an A3 event that contains as triggered cells one of the cells for which the source gNB has a stored CHO configuration, which has been possibly prepared based on the predicted measurements and/or based on real measurements. In response to this indication, the first network node 403a may choose to perform one of the actions:

Configure CHO for at least one cell indicated for the UE 101, e.g. by adding the CHO configuration with a trigger condition for that cell, using an AddMod list structure;

Trigger a handover for at least one cell indicated i.e. directly provide the RRCReconfiguration from the target candidate without any triggering condition so the UE 101 accesses that target directly upon reception of the message;

Delete the CHO for at least one cell indicated in case that cell becomes worse than before and/or achieves a leaving condition for the measurement report. Upon that, first network node 403a may contact the second network node 403b and cancels the previously configured CHO.

Notice that candidate cells chosen by the first network node 403a based on measurement reports or other criteria, e.g. blind configuration of CHO, i.e. they are applicable based on predictions, and also on measurements. The UE 101 may report a set of cells in an A3 event C1, C2, C3 as good candidates for CHO. Then, the first network node 403a may prepare each of these cells, receive an RRCReconfiguration with reconfiguration with sync for each of these cells, i.e. handover commands for target candidates, but does not provide to the UE 101, at least not immediately. The first network node 403a may wait until the occurrence of a further event may be the reception of another measurement report having one of these cells as candidates, the detection of some problem in the source cell, e.g. some L1 reporting that may indicate that the connection with source is not very good and the UE 101 may declare Radio Link Failure (RLF), etc.

Another benefit here is that the present disclosure also works for a first network node 403a capable of CHO and a target candidate capable of CHO, and a UE 101 that is not capable of CHO. In other words, even for these UEs 101, there could be some benefit of having CHO i.e. legacy UEs still benefit from CHO.

The first network node 403a may perform with at least one target candidate a CHO preparation procedure to obtain an RRCReconfiguration. However, upon reception from a target candidate the first network node 403a does not configure the UE 101 and instead, waits for a measurement report fulfilling a trigger condition, e.g. A1, A2, A3, A4, A5, A6, B1, B2, C1, C2, C3, V1, V2, H1, H2 etc., and possibly comprising measurement prediction information. Only upon reception of the measurement report the first network node 403a may give the UE 101 the RRCReconfiguration, i.e. the prepared handover command from the target candidate, or PSCell change/addition, etc. This aims to improve the interruption time since one or multiple targets are prepared when the UE 101 receives the handover command. This may also be implemented for UEs 101 that are no capable of Conditional Handover.

Figure 5:
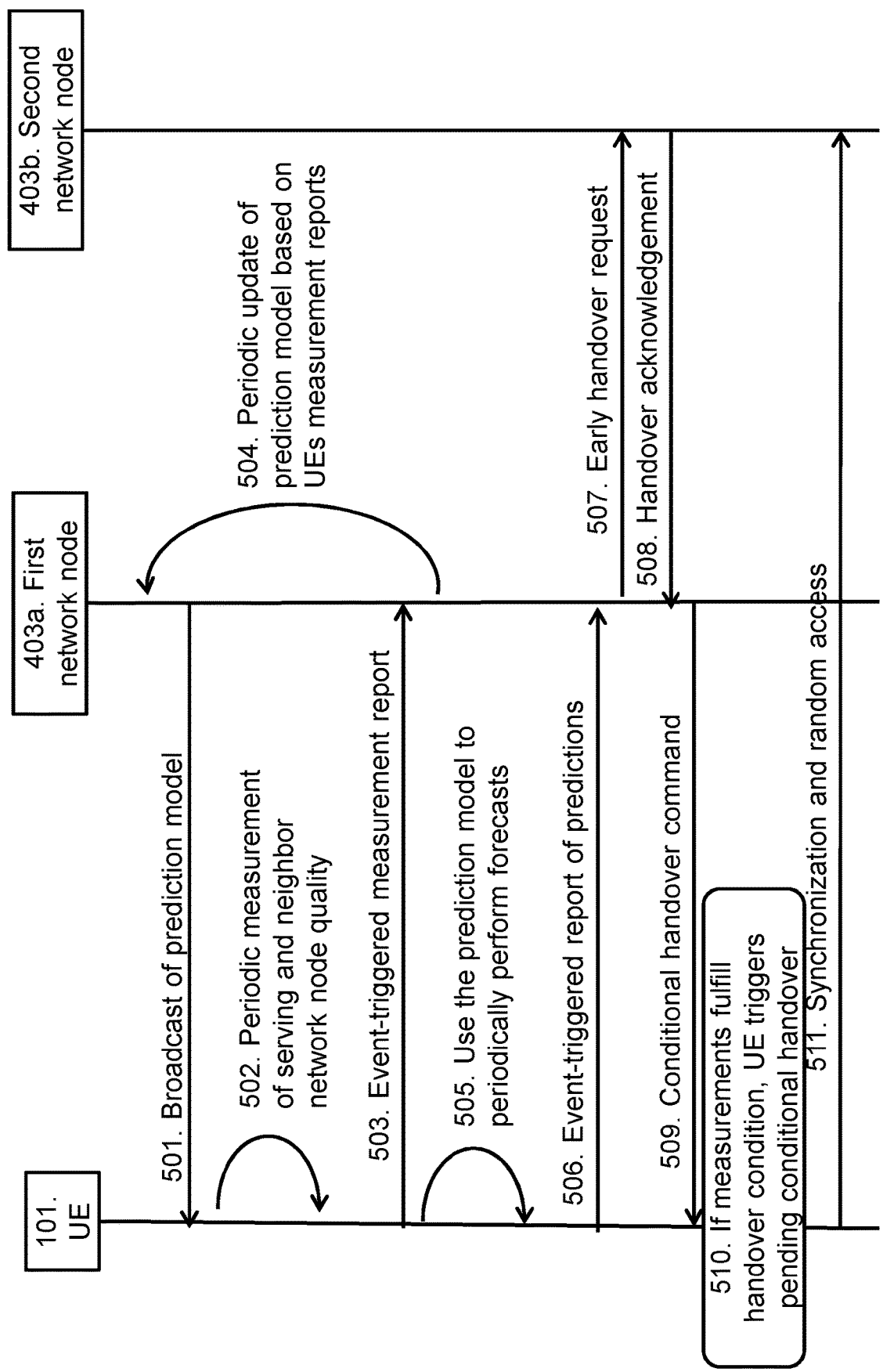
FIG. 5 is a signaling diagram illustrating a method.

The present disclosure may be applied for forecasting candidate second network node 403b for conditional HO is described in FIG. 5. The method illustrated in FIG. 5 comprises at least one of the following steps, which steps may be performed in any suitable order than described below:

Step 501

The first network node 403a broadcasts a prediction model to the UE 101, e.g. a NN information, e.g. number of layers, number of nodes per layer, weights etc. The UE 101 receives the prediction model from the first network node 403a. The prediction model may be a function, a software, hardware etc.

Step 502

The UE 101 performs periodic measurements of quality associated with the serving and neighbor network nodes, e.g. RSRP. The serving network node may be the first network node 403a and the neighbor network node may be the second network node 403b. The result of the periodic measurements of quality may be referred to as network node information, quality measurements etc.

Step 503

The UE 101 sends an event-triggered measurement report to the first network node 403a. The first network node 403a receives the event-triggered measurement report from the UE 101.

Step 504

The first network node 403a performs periodic updates of the prediction model, e.g. NN weights, based on the measurement report from the UE 101. After step 504 has been performed, steps 501, 502 and 503 may be repeated.

Step 505

The UE 101 uses the prediction model to periodically perform forecasts, e.g. the best candidate network nodes 403 for conditional handover, "T" TTIs ahead. Using other words, the UE 101 predicts mobility information such that the mobility information comprises the forecasts.

This step may be performed while the UE 101 is in connected state, e.g. RRC_CONNECTED. In that case the UE 101 may have been configured with a measurement configuration that configured the UE 101 to comprise prediction of mobility information in a measurement report.

That configuration may be part of a reporting configuration, e.g. reportConfig, associated to measurement identity, e.g. measId, and a measurement object, e.g. measObject.

Mobility information may also be measurements, like measurements performed by a UE 101 according to the NR RRC specifications, or other information related to UE mobility such as CBR(s), Aerial UE height(s), etc.

Step 506

The UE 101 sends an event-triggered report of predictions to the first network node 403a, e.g. predicted candidate for network nodes for conditional handover. The first network node 403a receives the event triggered report from the UE 101. The predictions may be reported to the first network node 403a in a measurement report. The event which triggers the report may be e.g. A1, A2, A3, A4, A5, A6, B1, B2, C1, C2, C3, V1, V2, H1, H2 etc.

The first network node 403a receives the reported predicted mobility information from the UE 101, and may use the reported predictions to set the configurations related to e.g. steps 509-511.

Step 507

The first network node 403a sends an early handover request to the second network node 403b. The second network node 403b receives the early handover request from the first network node 403a. Step 507 may be referred to as initiating a conditional handover.

Step 508

The second network node 403b sends a handover acknowledgement to the first network node 403a. The handover acknowledgement may comprise an RRC configuration. The first network node 403a receives the handover acknowledgement from the second network node 403b.

Step 509

The first network node 403a sends a conditional handover command to the UE 101. The UE 101 receives the conditional handover command from the first network node 403a. The conditional handover command may be a pending conditional handover command.

Step 510

If the measurements fulfill the handover condition, the UE 101 triggers the pending conditional handover according to the command from step 509.

Step 511

The UE 101 performs synchronization and random access with the second network node 403b.

In FIG. 5, the first network node 403a currently serving the UE 101 periodically broadcasts information related to a prediction model, e.g., info of a NN, such as number of layers, number of nodes, nodes weights, etc., that will be used by the connected UEs 101 to perform predictions, e.g., the best candidate network nodes 403 for conditional handover 'T' TTIs ahead. On the UE side, as already done in LTE and 5G NR, periodic measurements of serving and neighbor network nodes 403 are performed. These measurements may be event-triggered reported to the first network node 403a, to be used latter on to update the prediction model, and also used by the UE 101 as an input in the prediction model to predict, e.g., the best candidate second network nodes 403b 'T' TTIs ahead. These predictions are event-triggered reported to the first network node 403a, e.g., they may be reported when the UE 101 identifies that 'T' TTIs ahead the best candidate second network nodes 403b to be connected to is not its first network node 403a. After receiving this report, the first network node 403a will send an early handover request to the candidate second network nodes 403b, e.g. candidate target second network nodes 403b. The first network node 403a will inform the UE 101 with a conditional HO command which the second network node 403b answered with an ACK. Finally, if the measurements fulfill a handover condition, the UE 101 will trigger pending conditional handover and will directly synchronize to the second network node 403b.

The present disclosure may be a standalone solution that does not need initial data coming from a predefined dataset to be used. From time instant 0, it may be described as follow: at the beginning, the first network node 403a does not have received any UE measurement report. In an online manner, the first network node 403a will build an historical dataset by adding new reported measured data samples. These samples are used to train the prediction model.

Figure 6:
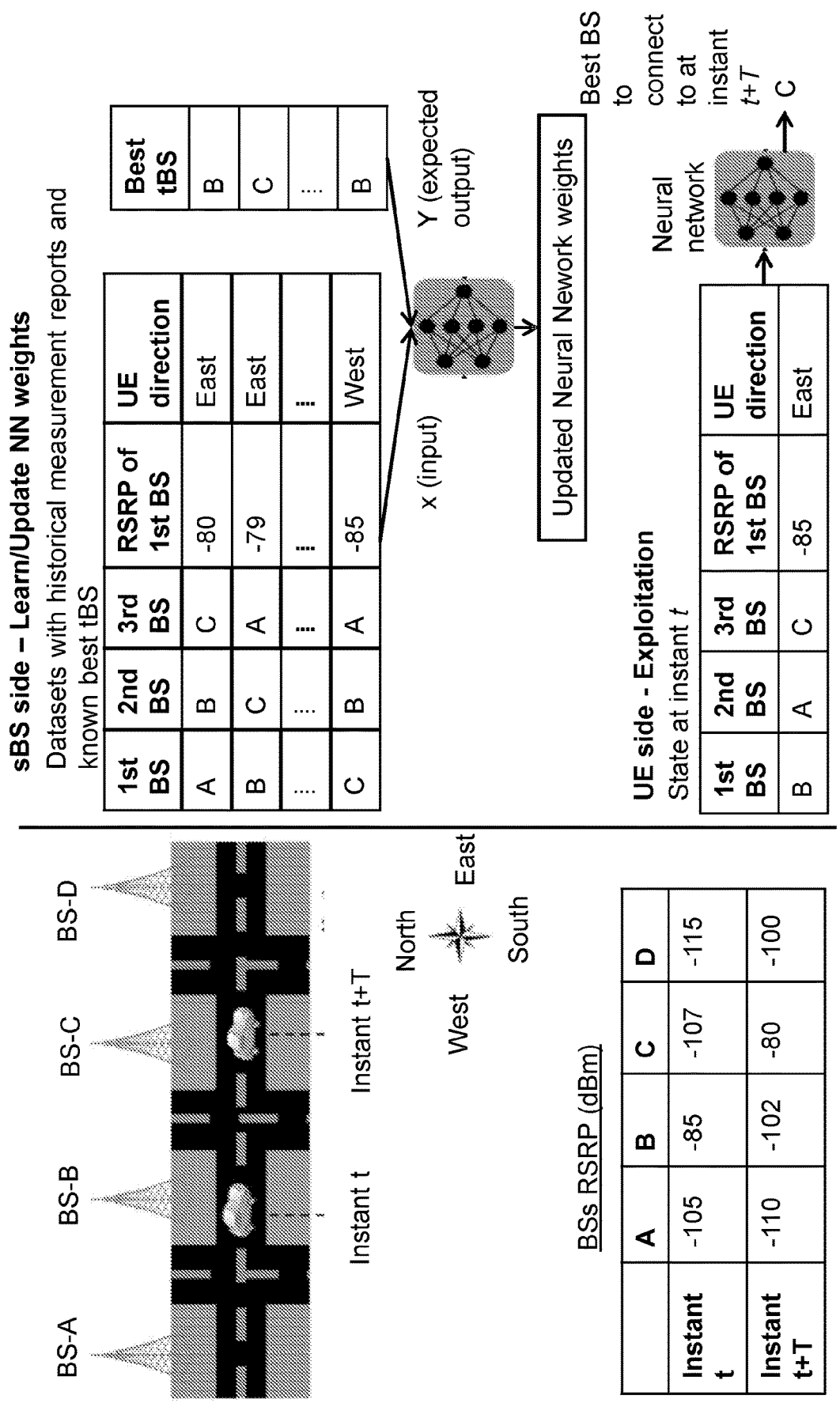
FIG. 6 is a block diagram illustrating update of weights and prediction of a second network node.

FIG. 6 illustrates how the first network node 403a, e.g. the serving network node, updates a prediction model. The prediction model may be a NN, and the first network node 403a updates the NN weights. FIG. 6 also illustrates how the UE 101 may use a NN to predict the best candidate second network node 403b to connect to, 'T' TTIs ahead. In FIG. 6, a network node is represented by a base station (BS), the first network node 403a is represented by a serving base station (sBS) and the second network node 403b is represented by a target BS (tBS).

The left hand side of FIG. 6 is for a UE 101 moving in a street from instant t to instant t+T. Below this picture, a table presents the measured BSs RSRP at both instants: t and t+T. The right hand side of FIG. 6 illustrates how the sBS updates the NN weights and how the UE 101 uses the NN. The input of the NN may be a vector comprising 5 elements: the first three elements are the indexes of the 3 BSs with higher RSRP, the fourth element is a discrete value of RSRP of the best measured BS and the last element is the UE moving direction. The sBS aggregates the UE reported measurements in a dataset which is periodically used to update the NN weight. For this methods such as gradient descent may be used where for each training instance the backpropagation algorithm first makes a prediction, e.g. forward pass, measures the error, then goes through each layer reverse to measure the error contribution from each connection, e.g. reverse pass, and finally slightly tweaks the connection weights to reduce the error, e.g. a gradient descent step.

Configuration of RAN areas for a given UE that is to be moved to Inactive state will now be described. The first network node 403a may receive the reported list of cells that the UE 101 may move to or predicted measurement results per cell, and takes that into account to configure a RAN area to the UE 101, e.g. as a list of cells, Tracking Area identities, RAN area identities. By knowing where the UE 101 is going the first network node 403a may decide that the UE 101 does not perform RAN area updates within this route, since the first network node 403a knows with some level of likelihood where the UE 101 is moving.

The information reported by the UE 101 may be enriched by a time information associated to the mobility information e.g. Cell A in X seconds, Cell A at time stamp T0, Cell A will have RSRP=Y at time stamp T0, Cell A will have RSRP=Y in X seconds, etc. that information may be used by the first network node 403a to perform paging, e.g. RAN paging for Inactive UEs 101. In other words, if the first network node 403a received a prediction report indicating that the UE 101 will likely be camping on Cell A in X seconds, if a paging message comes to that UE 101 around that time, the first network node 403a first tries to page the UE 101 at cell A.

Other network aspects have been described above in the UE description for specific predictions e.g. in the case of the events A1, A2, A3, A4, A5, A6, B1, B2, C1, C2, C3, V1, V2, H1 or H2.

The present disclosure is applicable to scenarios where networks are deployed in factories where the UE 101 may know its trajectory with more accuracy.

Figure 7:
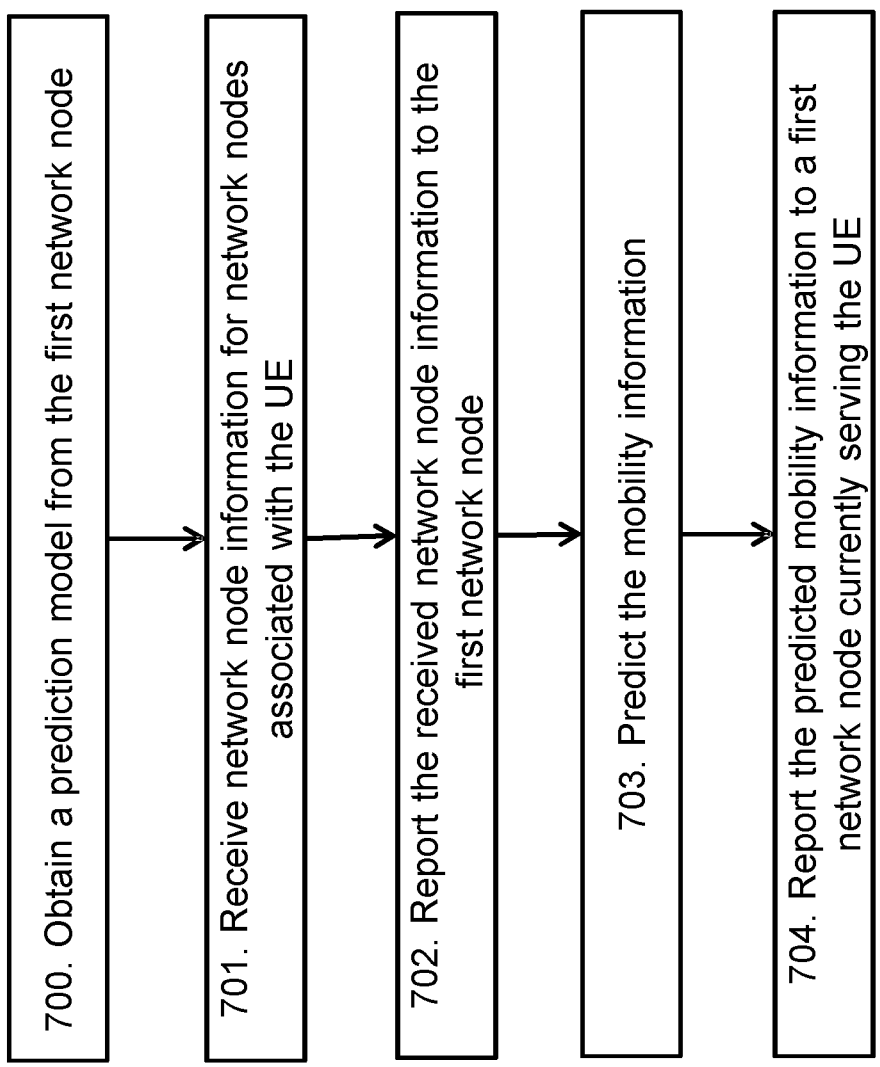
FIG. 7 is a flow chart illustrating a method performed by the UE.

The method described above will now be described seen from the perspective of the UE 101. FIG. 7 is a flowchart describing the present method in the UE 101 for handling mobility information in a communications network 400. The method comprises at least one of the following steps to be performed by the UE 101, which steps may be performed in any suitable order than described below:

Step 700

This step corresponds to step 501 in FIG. 5. The UE 101 may obtain a prediction model from the first network node 403*a*. The prediction model may indicate how to perform the prediction of the mobility information. This step may be described as the UE 101 may obtain information indicating a prediction model, where the information is the actual prediction model or an address to a location or node where the prediction model can be obtained, e.g. a cloud memory, a network memory etc.

The prediction model may be obtained for a first time, or the prediction model may be an updated prediction model, see step 504 in FIG. 5, that may replace a previously obtained prediction model.

The prediction model may be referred to as prediction information.

The prediction model may be a function, a software, hardware etc.

Step 701

This step corresponds to step 502 in FIG. 5. The UE 101 may receive network node information for network nodes 403*a*, 403*b* associated with the UE 101.

The network node information may be RSRP.

The network nodes 403*a*, 403*b* may be a serving network node and/or a neighbor network node.

The network node information may be a result of the periodic measurements of quality associated with the serving and neighbor network nodes, e.g. RSRP. The network node information may be referred to as quality measurements.

Step 702

This step corresponds to step 503 in FIG. 5. The UE 101 may report the received network node information from step 701 to the first network node 403*a*. Reporting the network node information may also be referred to as providing network node information or transmitting network node information to the first network node 403*a*.

The network node information may be reported to the first network node 403*a* in a measurement report.

The network node information may be reported periodically or when triggered by a measurement event. The measurement event may be A1, A2, A3, A4, A5, A6, B1, B2, C1, C2, C3, V1, V2, H1 or H2 etc.

Step 703

This step corresponds to step 505 in FIG. 5. The UE 101 predicts the mobility information.

The mobility information may be associated with a mobility procedure. The mobility procedure may be one or more of conditional handover, handover measurement configuration, measurement reporting, setup of multi-radio dual connectivity, reconfiguration of multi-radio dual connectivity, setup or carrier aggregation, reconfiguration of carrier aggregation and release with redirect. The setup of multi-radio dual connectivity may be PSCell addition. The reconfiguration of multi-radio dual connectivity may be PSCell change. The setup of carrier aggregation and the reconfiguration of carrier aggregation may be one or both of SCell activation and deactivation, etc. The mobility information may be the best candidate second network node 403*b* for conditional handover, "T" TTIs ahead, a currently serving cell, other serving cells, non-serving cells, SpCell, triggered cell etc.

The mobility information may be predicted using the prediction model from step 700.

The prediction of the mobility information may be based one or more input parameters. The one or more input parameters may be at least one of: network node information, sensor information, UE connection parameters, mobility history parameters and time information.

The mobility information may be associated with the UE's 101 mobility in the communications network 400, e.g. in that it is associated with the first network node 403*a* currently serving the UE 101 or associated with other network nodes currently serving the UE 101 or network nodes not serving the UE 101 SpCell triggered cell.

The mobility information may comprise one or more radio quality related parameters. The radio quality related parameters may comprise one or more of RSRP, RSRQ and SINR, a list of one or more cells, a list of one or more beams, a list of one or more Reference Signals, RS, type coverage the UE 101 is moving to, time information. The RSRP, RSRQ and SINR may be for a frequency and in different levels of granularities.

The time information may be related to the validity of the prediction. The UE 101 may report a predicted RSRP for a cell X and a time information T1 for which the prediction is related. T1 may be measured in milliseconds starting from the time the UE 101 transmitted the report and indicates the predicted RSRP value within T1 milliseconds, i.e. how RSRP is going to be after T1 milliseconds. The time information may be related to for how long a certain value of the mobility information is expected to be stable or remain within a certain measurement interval, plus or minus X dBs. So if the UE 101 reports an RSRP value and a time T2 associate, it means that the value is expected to remain for T2 milliseconds, as an outcome of the UE prediction for T2.

In other words, the mobility information may comprise one or more of the following: measurements or a specific cell the UE 101 is entering its coverage area, a specific cell the UE 101 is leaving its coverage area, a specific beam or reference signal—like an SS/PBCH Block coverage—the UE 101 is entering its coverage area, a specific or reference signal—like an SS/PBCH Block coverage—the UE 101 is leaving its coverage area, etc.

This step may be performed while the UE 101 is in connected state, e.g. RRC_CONNECTED. In that case the UE 101 may have been configured with a measurement configuration that configured the UE 101 to comprise prediction of mobility information in a measurement report. That configuration may be part of a reporting configuration, e.g. reportConfig, associated to measurement identity, e.g. measId, and a measurement object, e.g. measObject.

Mobility information may also be measurements, like measurements performed by a UE 101 according to the NR RRC specifications, or other information related to UE mobility such as CBR(s), Aerial UE height(s), etc.

Step 704

This step corresponds to step 506 in FIG. 5. The UE 101 reports the predicted mobility information to a first network node 403*a* currently serving the UE 101 in the communications network 400. The first network node 403*a* currently serving the UE 101 may be a serving network node 403*a*.

The predicted mobility information may be reported periodically or when triggered by a measurement event, e.g. as configured in reportConfig. The measurement event may be A1, A2, A3, A4, A5, A6, B1, B2, C1, C2, C3, V1, V2, H1, H2 etc.

The predicted mobility information may be comprised in a measurement report when being reported to the first network node 403a. The measurement report may be an RRC measurement report.

The first network node 403a receives the reported predicted mobility information from the UE 101, and may use the reported predictions to set the configurations related to e.g. steps 509-511 in FIG. 5.

The predicted mobility information may be reported when the UE 101 is in connected state. The connected state may be RRC_CONNECTED. In that case the UE 101 may have been configured with a measurement configuration that configured the UE 101 to comprise prediction of mobility information in a measurement report. That configuration may be part of a reporting configuration, e.g. reportConfig, associated to measurement identity, e.g. measId, and a measurement object, e.g. measObject.

Figure 8:
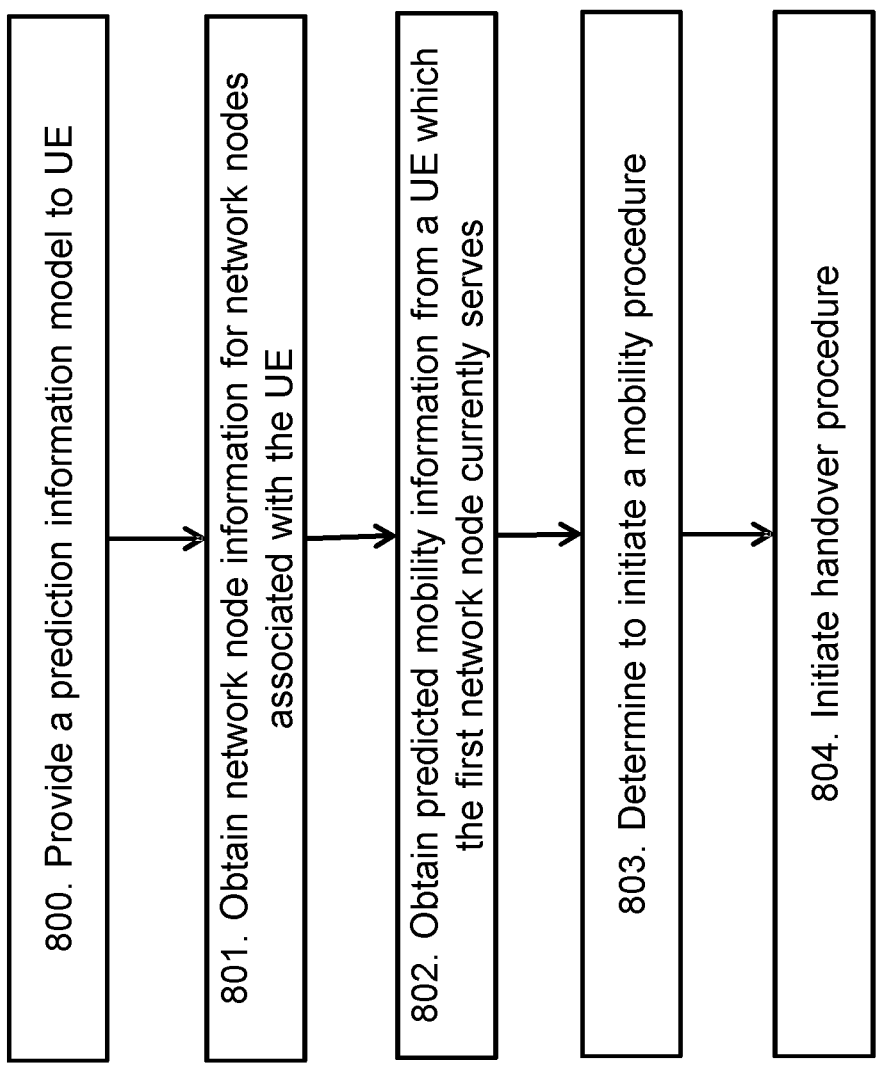
FIG. 8 is a flow chart illustrating a method performed by the first network node.

The method described above will now be described seen from the perspective of the first network node 403a. FIG. 8 is a flowchart describing the present method in the first network node 403a for handling mobility information in a communications network 400. The first network node 403a may be an eNB or a gNB or a Central Unit (CU) or a Distributed Unit (DU). The method comprises at least one of the following steps to be performed by the first network node 403a, which steps may be performed in any suitable order than described below:

Step 800

This step corresponds to step 501 in FIG. 5. The first network node 403a may provide a prediction model to UE 101. The prediction model may indicate how to perform a prediction of the mobility information.

The prediction model may be provided for a first time, or the prediction model may be an updated prediction model (see step 504 in FIG. 5) which may replace a previously provided prediction model. When the prediction model is an updated prediction model it may be provided for second more times.

The prediction model may be a function, a software, hardware etc.

Step 801

This step corresponds to step 503 in FIG. 5. The first network node 403 may obtain, from the UE 101, network node information for network nodes 403a, 403b associated with the UE 101. The network node information may be in a measurement report. The network node information may be used in determining the prediction model in step 800, and then step 801 may be performed before step 800.

The network node information may be obtained periodically or when triggered by a measurement event. The measurement event may be A1, A2, A3, A4, A5, A6, B1, B2, C1, C2, C3, V1, V2, H1 or H2 etc.

Step 802

This step corresponds to step 506 in FIG. 5. The first network node 403a obtains predicted mobility information from the UE 101. The first network node 403a currently serves the UE 101. The first network node 403 may be a serving network node or a sBS.

The predicted mobility information may be obtained periodically or when triggered by a measurement event.

The mobility information may be associated with the UE's 101 mobility in the communications network 400, e.g. in that it is associated with the first network node 403a currently serving the UE 101 or associated with other network nodes currently serving the UE 101 or network nodes not serving the UE 101 SpCell triggered cell.

The mobility information may be associated with a mobility procedure. The mobility procedure is one or more of conditional handover, handover, measurement configuration, measurement reporting, setup of multi-radio dual connectivity, reconfiguration of multi-radio dual connectivity, setup or carrier aggregation, reconfiguration of carrier aggregation and release with redirect. The setup of multi-radio dual connectivity may be PSCell addition. The reconfiguration of multi-radio dual connectivity may be PSCell change. The setup of carrier aggregation and reconfiguration of carrier reconfiguration may be one or both of SCell activation and deactivation, etc.

The mobility information may comprise one or more radio quality related parameters. The radio quality related parameters may comprise one or more of RSRP, RSRQ and SINR, a list of one or more cells, a list of one or more beams, a list of one or more Reference Signals, RS, type coverage the UE 101 is moving to, time information. The RSRP, RSRQ and SINR may be for a frequency and in different levels of granularities.

The time information may be related to validity of the prediction. The UE 101 may report a predicted RSRP for a cell X and a time information T1 for which the prediction is related. T1 could be measured in milliseconds starting from the time the UE 101 transmitted the report and indicates the predicted RSRP value within T1 milliseconds, i.e. how RSRP is going to be after T1 milliseconds. The prediction may indicate for how long a certain value is expected to be stable or remain within a certain measurement interval, plus or minus X dBs. So if the UE 101 reports an RSRP value and a time T2 associate, it means that the value may be expected to remain for T2 milliseconds, as an outcome of the UE prediction for T2.

The mobility information may comprise one or more of the following: measurements or a specific cell the UE 101 is entering its coverage area, a specific cell the UE 101 is leaving its coverage area, a specific beam or reference signal—like an SS/PBCH Block coverage—the UE 101 is entering its coverage area, a specific or reference signal—like an SS/PBCH Block coverage—the UE 101 is leaving its coverage area, etc.

This step may be performed while the UE 101 is in connected state, e.g. RRC_CONNECTED. In that case the UE 101 may have been configured with a measurement configuration that configured the UE 101 to comprise prediction of mobility information in a measurement report. That configuration may be part of a reporting configuration, e.g. reportConfig, associated to measurement identity, e.g. measId, and a measurement object, e.g. measObject.

Mobility information may also be measurements, like measurements performed by a UE 101 according to the NR RRC specifications, or other information related to UE mobility such as CBR(s), Aerial UE height(s), etc.

The predicted mobility information may be comprised in a measurement report when being obtained from the first UE 101. The measurement report may be a RRC measurement report.

Step 803

This step corresponds to step 507 in FIG. 5. Based on the predicted mobility information, the first network node 403a determines to initiate a mobility procedure associated with the UE 101. The mobility procedure may be initiated when a condition is fulfilled, e.g. a condition associated with the predicted mobility information or another condition. The fulfilled condition may be that an early handover is to be performed, that an early handover request has been sent to the second network node 403b, or any other suitable condition, that a handover is pending. The condition may be network configured. The condition may be that a radio condition is fulfilled, e.g. one or more of the A1, A2, A3, A4, A5, A6, B1, B2, H1, H2, C1, C2, C3, V1, V2, H1 or H2 events. The condition may be that the quality of the target cell or beam becomes X dB stronger than the serving cell etc.

The mobility procedure may be conditional handover, handover or release with redirect.

Step 804

This step corresponds to step 507 and step 508 in FIG. 5. The first network node 403a initiates the mobility procedure.

Figure 9A:
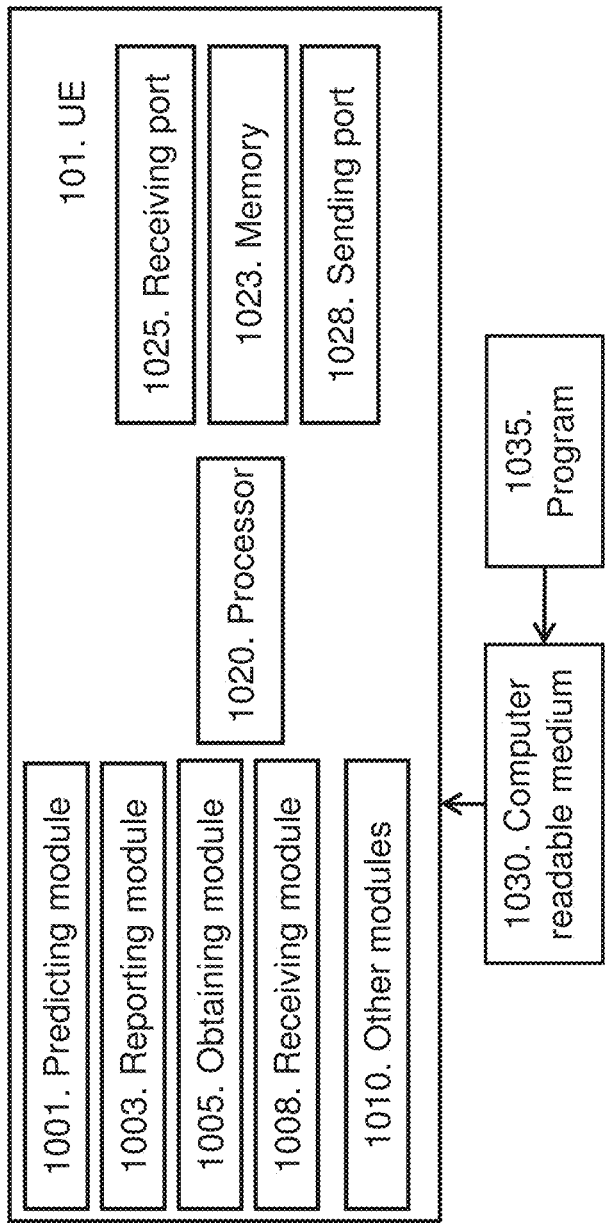
FIG. 9a is a schematic drawing illustrating a UE.
Figure 9B:
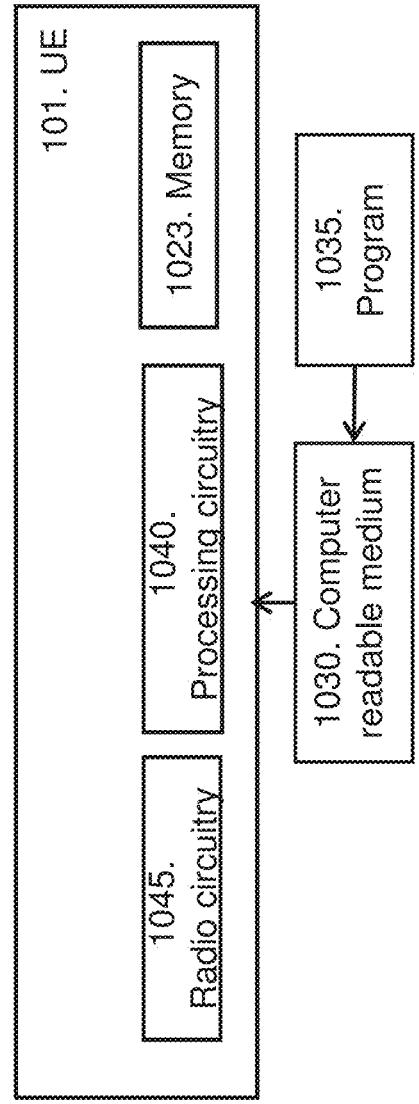
FIG. 9b is a schematic drawing illustrating a UE.

To perform the method steps shown in FIG. 7 for handling mobility information in a communications network 400, the UE 101 may comprise an arrangement as shown in FIG. 9a and/or FIG. 9b.

The UE 101 is adapted to, e.g. by means of a predicting module 1001, predict the mobility information. The mobility information may be associated with a mobility procedure. The mobility procedure may be conditional handover, handover measurement configuration, measurement reporting, setup of multi-radio dual connectivity, reconfiguration of multi-radio dual connectivity, setup or carrier aggregation, reconfiguration of carrier aggregation and release with redirect. The mobility information may be predicted using the prediction model. The prediction of the mobility information may be based one or more input parameters. The one or more input parameters may be at least one of: network node information, sensor information, UE connection parameters, mobility history parameters and time information. The mobility information may be predicted using the prediction model.

The mobility information may comprise one or more radio quality related parameters. The radio quality related parameters may comprise one or more of RSRP, RSRQ, SINR, a list of one or more cells, a list of one or more beams, a list of one or more RS, type coverage the UE 101 is moving to, time information. The RSRP, RSRQ and SINR may be for a frequency and in different levels of granularities.

The UE 101 is adapted to, e.g. by means of a reporting module 1003, report the predicted mobility information to a first network node 403a. The first network node 403a currently serves the UE 101 in the communications network 400. The predicted mobility information may be reported periodically or when triggered by a measurement event. The predicted mobility information may be comprised in a measurement report when being reported to the first network node 403a. The measurement report may be a RRC measurement report. The predicted mobility information may be reported when the UE 101 is in connected state. The connected state may be RRC connected.

The UE 101 may be adapted to, e.g. by means of an obtaining module 1005, obtain a prediction model from the first network node 403a. The prediction model may indicate how to perform the prediction of the mobility information. The prediction model may be obtained for a first time, or the prediction model may be an updated prediction model that may replace a previously obtained prediction model.

The predicted mobility information may be reported periodically or when triggered by a measurement event.

The UE 101 may be adapted to, e.g. by means of a receiving module 1008, receive network node information for network nodes 403a, 403b associated with the UE 101.

The UE 101 may be adapted to, e.g. by means of the reporting module 1003, report the received network node information to the first network node 403a.

The UE 101 may be adapted to, e.g. by means of the receiving module 1008, receive network node information for network nodes 403a, 403b associated with the UE 101.

The UE 101 may be adapted to, e.g. by means of the reporting module 903, report the received network node information to the first network node 403a.

The present disclosure in the UE 101 may be implemented through one or more processors, such as a processor 1020 in the UE 101 depicted in FIG. 9a, together with computer program code for performing the functions and actions of described herein. A processor, as used herein, may be understood to be a hardware component. The program code mentioned above may also be provided as a computer program product, for instance in the form of a data carrier carrying computer program code for performing the methods herein when being loaded into the UE 101. One such carrier may be in the form of a CD ROM disc. It is however feasible with other data carriers such as a memory stick. The computer program code may furthermore be provided as pure program code on a server and downloaded to the UE 101.

The UE 101 may comprise a memory 1023 comprising one or more memory units. The memory 1023 is arranged to be used to store obtained information, store data, configurations, schedulings, and applications etc. to perform the methods herein when being executed in the UE 101.

The UE 101 may receive information from, e.g. the first network node 403a, through a receiving port 1025. The receiving port 1025 may be, for example, connected to one or more antennas in UE 101. The UE 101 may receive information from another structure in the communications network 400 through the receiving port 1005. Since the receiving port 1025 may be in communication with the processor 1020, the receiving port 1025 may then send the received information to the processor 1020. The receiving port 1025 may also be configured to receive other information.

The processor 1020 in the UE 101 may be configured to transmit or send information to e.g. first network node 403a or another structure in the communications network 400, through a sending port 1028, which may be in communication with the processor 1020, 15 and the memory 1023.

The UE 101 may comprise a predicting module 1001, the reporting module 1003, the obtaining module 1005, the receiving module 1008, other modules 1010 etc.

The predicting module 1001, the reporting module 1003, the obtaining module 1005, the receiving module 1008, other modules 1010 described above may refer to a combination of analog and digital circuits, and/or one or more processors configured with software and/or firmware, e.g., stored in memory, that, when executed by the one or more processors such as the processor 1020, perform as described above. One or more of these processors, as well as the other digital hardware, may be comprised in a single Application-Specific Integrated Circuit (ASIC), or several processors and various digital hardware may be distributed among several separate components, whether individually packaged or assembled into a System-on-a-Chip (SoC).

The different units 1001-1010 described above may be implemented as one or more applications running on one or more processors such as the processor 1020.

Thus, the methods described herein for the UE 101 may be respectively implemented by means of a computer program 1030 product, comprising instructions, i.e., software code portions, which, when executed on at least one processor 1020, cause the at least one processor 1020 to carry out the actions described herein, as performed by the UE 101. The computer program 1030 product may be stored on a computer-readable storage medium 1035. The computer-readable storage medium 1035, having stored thereon the computer program 1030, may comprise instructions which, when executed on at least one processor 1020, cause the at least one processor 1020 to carry out the actions described herein, as performed by the UE 101. The computer-readable storage medium 1035 may be a non-transitory computer-readable storage medium, such as a CD ROM disc, or a memory stick. The computer program 1030 product may be stored on a carrier containing the computer program 1035 just described, wherein the carrier is one of an electronic signal, optical signal, radio signal, or the first computer-readable storage medium 1035, as described above.

The UE 101 may comprise a communication interface configured to facilitate communications between the UE 101 and other nodes or devices, e.g., the first network node 403*a*, or another structure. The interface may, for example, comprise a transceiver configured to transmit and receive radio signals over an air interface in accordance with a suitable standard.

The UE 101 may comprise the following arrangement depicted in FIG. 9*b*. The UE 101 may comprise a processing circuitry 1040, e.g., one or more processors such as the processor 1020, in the UE 101 and the memory 1023. The UE 101 may also comprise a radio circuitry 1045, which may comprise e.g., the receiving port 1025 and the sending port 1028. The processing circuitry 1040 may be configured to, or operable to, perform the method actions according to FIG. 5 and/or FIG. 6, in a similar manner as that described in relation to FIG. 9*a*. The radio circuitry 1045 may be configured to set up and maintain at least a wireless connection with the UE 101. Circuitry may be understood herein as a hardware component.

The UE 101 may be operative to operate in the communications network 400. The UE 101 may comprise the processing circuitry 1040 and the memory 1023. The memory 1023 comprises instructions executable by the processing circuitry 1040. The UE 101 is operative to perform the actions described herein in relation to the UE 101, e.g. in FIG. 5 and/or FIG. 6.

Figure 10A:
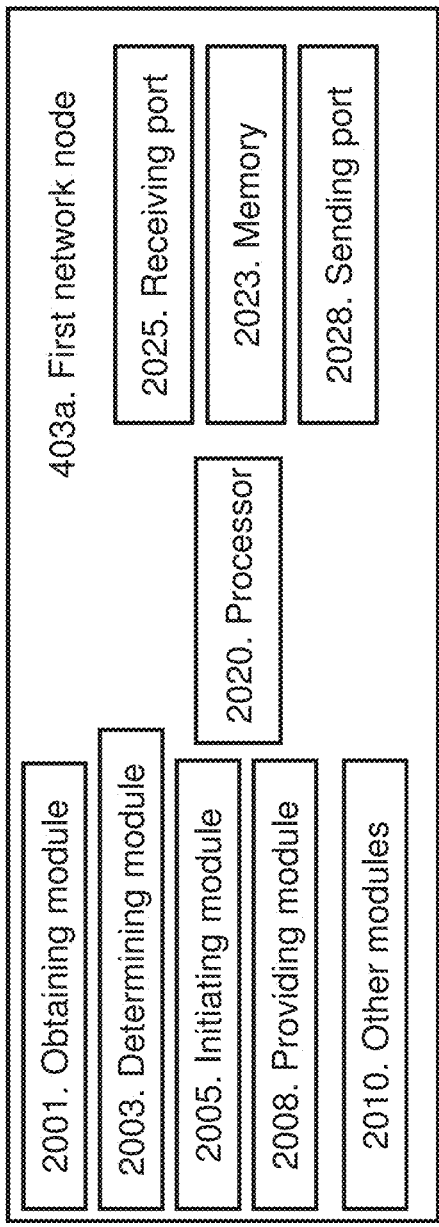
FIG. 10a is a schematic drawing illustrating a first network node.
Figure 10B:
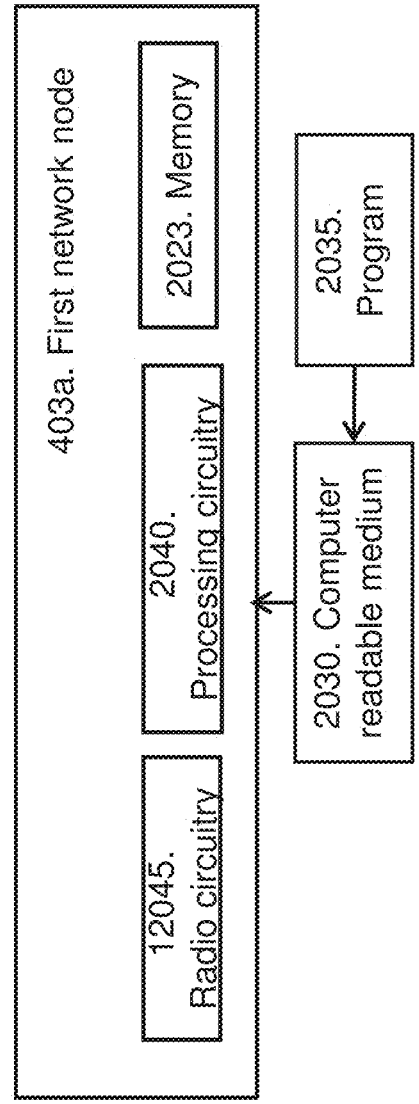
FIG. 10b is a schematic drawing illustrating a first network node.

To perform the method steps shown in FIG. 8 for handling mobility information in a communications network 400, the first network node 403*a* may comprise an arrangement as shown in FIG. 10*a* and/or FIG. 10*b*. The first network node 403*a* may be an eNB or a gNB or CU or DU.

The first network node 403*a* is adapted to, e.g. by means of an obtaining module 2001, obtain predicted mobility information from a UE 101. The first network node 403*a* currently serves the UE 101. The predicted mobility information may be obtained periodically or when triggered by a measurement event. The predicted mobility information may be comprised in a measurement report when being obtained from the first UE 101.

The first network node 403*a* is adapted to, e.g. by means of a determining module 2003, based on the predicted mobility information, determine to initiate a mobility procedure associated with the UE 101. The mobility procedure may be initiated when a condition is fulfilled. The condition may be associated with the predicted mobility information. The mobility information may be associated with a mobility procedure. The mobility procedure may be one or more of conditional handover, handover, measurement reporting, setup of multi-radio dual connectivity, reconfiguration of multi-radio dual connectivity, setup or carrier aggregation, reconfiguration of carrier aggregation and release with redirect The mobility information may comprise one or more radio quality related parameters. The radio quality related parameters may comprise one or more of RSRP, RSRQ, SINR, a list of one or more cells, a list of one or more beams, a list of one or more Reference Signals, RS, type coverage the UE 101 is moving to, time information. The RSRP, RSRQ and SINR may be for a frequency and in different levels of granularities.

The fulfilled condition may be that an early handover is to be performed, that an early handover request has been sent to the second network node 403*b*, or any other suitable condition, that a handover is pending. The condition may be network configured. The condition may be that a radio condition is fulfilled, e.g. one or more of the A1, A2, A3, A4, A5, A6, B1, B2, H1, H2, C1, C2, C3, V1, V2, H1 or H2 events. The condition may be that the quality of the target cell or beam becomes X dB stronger than the serving cell etc.

The first network node 403*a* is adapted to, e.g. by means of an initiating module 2005, initiate the mobility procedure.

The first network node 403*a* may be adapted to, e.g. by means of a providing module 2008, provide a prediction model to UE 101. The prediction model may indicate how to perform a prediction of the mobility information. The prediction model may be provided for a first time, or the prediction model may be an updated prediction model that may replace a previously provided prediction model.

The first network node 403*a* may be adapted to, e.g. by means of the obtaining module 2001, obtain, from the UE 101, network node information for network nodes 403*a*, 403*b* associated with the UE 101.

The present disclosure in the first network node 403*a* may be implemented through one or more processors, such as a processor 2020 in the first network node 403*a* depicted in FIG. 10*a*, together with computer program code for performing the functions and actions described herein. A processor, as used herein, may be understood to be a hardware component. The program code mentioned above may also be provided as a computer program product, for instance in the form of a data carrier carrying computer program code for performing the methods herein when being loaded into the first network node 403*a*. One such carrier may be in the form of a CD ROM disc. It is however feasible with other data carriers such as a memory stick. The computer program code may furthermore be provided as pure program code on a server and downloaded to the first network node 403*a*.

The first network node 403*a* may comprise a memory 2023 comprising one or more memory units. The memory 2023 is arranged to be used to store obtained information, store data, configurations, schedulings, and applications etc. to perform the methods herein when being executed in the first network node 403*a*.

The first network node 403*a* may receive information from, e.g. the UE 101, through a receiving port 2025. The receiving port 2025 may be, for example, connected to one or more antennas in first network node 403*a*. The first network node 403*a* may receive information from another structure in the communications network 400 through the receiving port 2025. Since the receiving port 2025 may be in communication with the processor 2020, the receiving port 2025 may then send the received information to the processor 2020. The receiving port 2025 may also be configured to receive other information.

The processor 2020 in the first network node 403a may be configured to transmit or send information to e.g. UE 101 or another structure in the communications network 400, through a sending port 2028, which may be in communication with the processor 2020, and the memory 2023.

The first network node 403a may comprise the obtaining module 2001, the determining module 2003, the initiating module 2005, the providing module 2008, other modules 2010 etc.

The obtaining module 2001, the determining module 2003, the initiating module 2005, the providing module 2008, other modules 2010 described above may refer to a combination of analog and digital circuits, and/or one or more processors configured with software and/or firmware, e.g., stored in memory, that, when executed by the one or more processors such as the processor 2020, perform as described above. One or more of these processors, as well as the other digital hardware, may be comprised in a single ASIC, or several processors and various digital hardware may be distributed among several separate components, whether individually packaged or assembled into a SoC.

The different units 2001-2010 described above may be implemented as one or more applications running on one or more processors such as the processor 2020.

Thus, the methods described herein for the first network node 403a may be respectively implemented by means of a computer program 2030 product, comprising instructions, i.e., software code portions, which, when executed on at least one processor 2020, cause the at least one processor 2020 to carry out the actions described herein, as performed by the first network node 403a. The computer program 2030 product may be stored on a computer-readable storage medium 2035. The computer-readable storage medium 2035, having stored thereon the computer program 2030, may comprise instructions which, when executed on at least one processor 2020, cause the at least one processor 2020 to carry out the actions described herein, as performed by the first network node 403a. The computer-readable storage medium 2035 may be a non-transitory computer-readable storage medium, such as a CD ROM disc, or a memory stick. The computer program 2030 product may be stored on a carrier containing the computer program 2035 just described, wherein the carrier is one of an electronic signal, optical signal, radio signal, or the first computer-readable storage medium 2035, as described above.

The first network node 403a may comprise a communication interface configured to facilitate communications between the first network node 403a and other nodes or devices, e.g., the UE 101, or another structure. The interface may comprise a transceiver configured to transmit and receive radio signals over an air interface in accordance with a suitable standard.

The first network node 403a may comprise the following arrangement depicted in FIG. 10b. The first network node 403a may comprise a processing circuitry 2040, e.g., one or more processors such as the processor 2020, in the first network node 403a and the memory 2023. The first network node 403a may also comprise a radio circuitry 2045, which may comprise e.g., the receiving port 2025 and the sending port 2028. The processing circuitry 2040 may be configured to, or operable to, perform the method actions according to FIG. 5 and/or FIG. 7, in a similar manner as that described in relation to FIG. 10a. The radio circuitry 2045 may be configured to set up and maintain at least a wireless connection with the first network node 403a. Circuitry may be understood herein as a hardware component.

The first network node 403a may be operative to operate in the communications network 400. The first network node 403a may comprise the processing circuitry 2040 and the memory 2023. The memory 2023 comprises instructions executable by the processing circuitry 2040. The first network node 403a is operative to perform the actions described herein in relation to the first network node 403a, e.g. in FIG. 5 and/or FIG. 7.

UE Aspects

A method at a wireless terminal, also called a UE 101, for assisting mobility management, the method comprising:

Predicting mobility information, such as radio quality related parameters such as RSRP, RSRQ, SINR in a given frequency in different levels of granularities such as per cell, per beam, per RS type like SSB and/or CSI-RS, list of cells and/or list of beams and/or list of RS type coverage, like SSB identifier coverage or CSI-RS identifier coverage, the UE 101 is moving to, etc.;

Reporting predicted values to a serving node, i.e. the first network node 401a, upon a condition, for example, determined by a network configuration provided to the UE 101.

Mobility related prediction information may be comprised in event-triggered measurement reports, like A1, A2, A3, A4, A5, A6, B1, B2, H1, H2, C1, C2, C3, V1, V2, H1 or H2 events, triggered by conditions related to real measurements. Hence, mobility prediction information is reported when a measurement report is triggered.

There may be different ways on how the prediction is performed at the UE 101.

The different prediction models may be used in different ways, based on different set of parameters locally known at the UE 101, but not necessarily known at the network.

A new reporting configuration, e.g. configuration in reportConfigNR, may indicate, to the UE 101, the possibility to comprise predicted measurements in a measurement report triggered by real/current measurements, for example, in an A3 event or periodic measurement reports. Currently, the UE 101 comprises at least for the trigger quantity cell measurements for the triggered cells and RSRP/RSRQ for the SpCell. The UE 101 comprises predicted RSRP, RSRQ, SINR for triggered cells and/or non-triggered cells, e.g. depending on quality of the predictions, and/or any other predicted mobility information, such as next cell/beam, e.g. coverage of a given reference signal represented by an identifier or index, the UE 101 is most likely to enter, a list of cells/beams the UE 101 is likely to move towards, etc. There may be different manners to define what is comprised in the prediction reports, e.g., only predicted values that triggered the events, current/real measurements for the same entities that are being predicted, etc.

There may be different manners on how the predictions are reported by the UE 101, e.g., based on which triggers. The UE 101 may report predictions periodically, w.f. where network may have configured periodicity and/or pre-determined slots where these predictions are to be reported. The UE 101 may be configured by the network with an Ax/Bx-like event configuration and may be configured to comprise mobility prediction information in event-triggered measurement reports.

First Network Node Aspects

A method at a first network node 403a, also called a source gNodeB or source network node, for performing measurement prediction configuration, measurement configuration and mobility management, the method comprising:
  Configuring a UE 101 to perform predictions of radio quality related parameters such as RSRP, RSRQ, SINR in a given frequency, e.g. per cell, per beam, per RS type like SSB and/or CSI-RS, etc.;
  Configuring a UE 101 to report these predictions of radio quality related parameters;
  Receiving, from a UE 101, reports containing measurements and/or prediction of measurements and making mobility decisions based on these reports.

There may be different decisions the first network node 401a may take based on UE reports containing measurements and/or prediction of measurements, and the first network node 401 may take mobility decisions based on these reports. The reported measurements and reported measurement predictions may be used for CHO configurations and handover configurations. The information may be used for other mobility related configurations such as SCG addition, SCG change, like a PSCell change, SCell addition, SCell change, SCell activation, SCell deactivation, Release with Redirect, etc.

The term real measurement or current measurement used herein refers to a radio measurement, such as the measurements, e.g. RRC related measurements, configured by the network for a connected UE. These measurements may also be called RRM measurements, since they assist RRM decisions at the network side and/or L3 measurements, since they are responsibility of the RRC protocol, also called Layer 3 in the Control Plane RAN protocol stack. Having NR as an example, these measurements to be performed by the UE 101 and reported may be at least one of the following:
  NR measurements;
  Inter-RAT measurements of E-UTRA frequencies.

These measurements may be based on different reference signals. In the case of SS/PBCH block(s), these measurements, or in more general terms, measurement information, are:
  Measurement results per SS/PBCH block;
  Measurement results per cell based on SS/PBCH block(s);
  SS/PBCH block(s) indexes.

In the case of CSI-RS these measurements, or in more general terms, measurement information, are:
  Measurement results per CSI-RS resource;
  Measurement results per cell based on CSI-RS resource(s);
  CSI-RS resource measurement identifiers.

Each of these measurements may be associated to a measurement quantity, such as RSRP, RSRQ or SINR. For example, a real measurement or a current measurement may refer to the cell level or beam level RSRP based on RS type SSB, for an NR carrier frequency in the NR RAT. Hence, the term measurement prediction is used to refer to a prediction of a radio measurement as one of the measurements described above as a real/current measurement. In other words, the methods herein relate to a prediction of NR or inter-RAT measurements, prediction of measurement results per RS type, i.e. SS/PBCH block or CSI-RS, prediction of cell measurement or beam measurements, e.g. cell level RSRP, cell level RSRQ, cell level SINR, beam level RSRP, beam level RSRQ, beam level SINR.

These real/current measurements may be used as input to predictions models so the UE 101 is able to predict mobility information such as radio quality related parameters such as RSRP, RSRQ, SINR in a given frequency in different levels of granularities such as per cell, per beam, per RS type like SSB and/or CSI-RS, list of cells and/or list of beams and/or list of RS type coverage, like SSB identifier coverage or CSI-RS identifier coverage the UE 101 is moving to, etc.

The present disclosure relates to prediction at the UE side of mobility information such as radio conditions of serving and/or neighbor cells, in serving and/or neighbor frequencies, a list of cells and/or beams the UE 101 is moving to, and the comprising of these predictions in measurement reports, such as the existing periodic measurement reports and event-triggered measurement reports.

Further Extensions and Variations

Telecommunication network connected via an intermediate network to a host computer in accordance with some embodiments.

Figure 11:
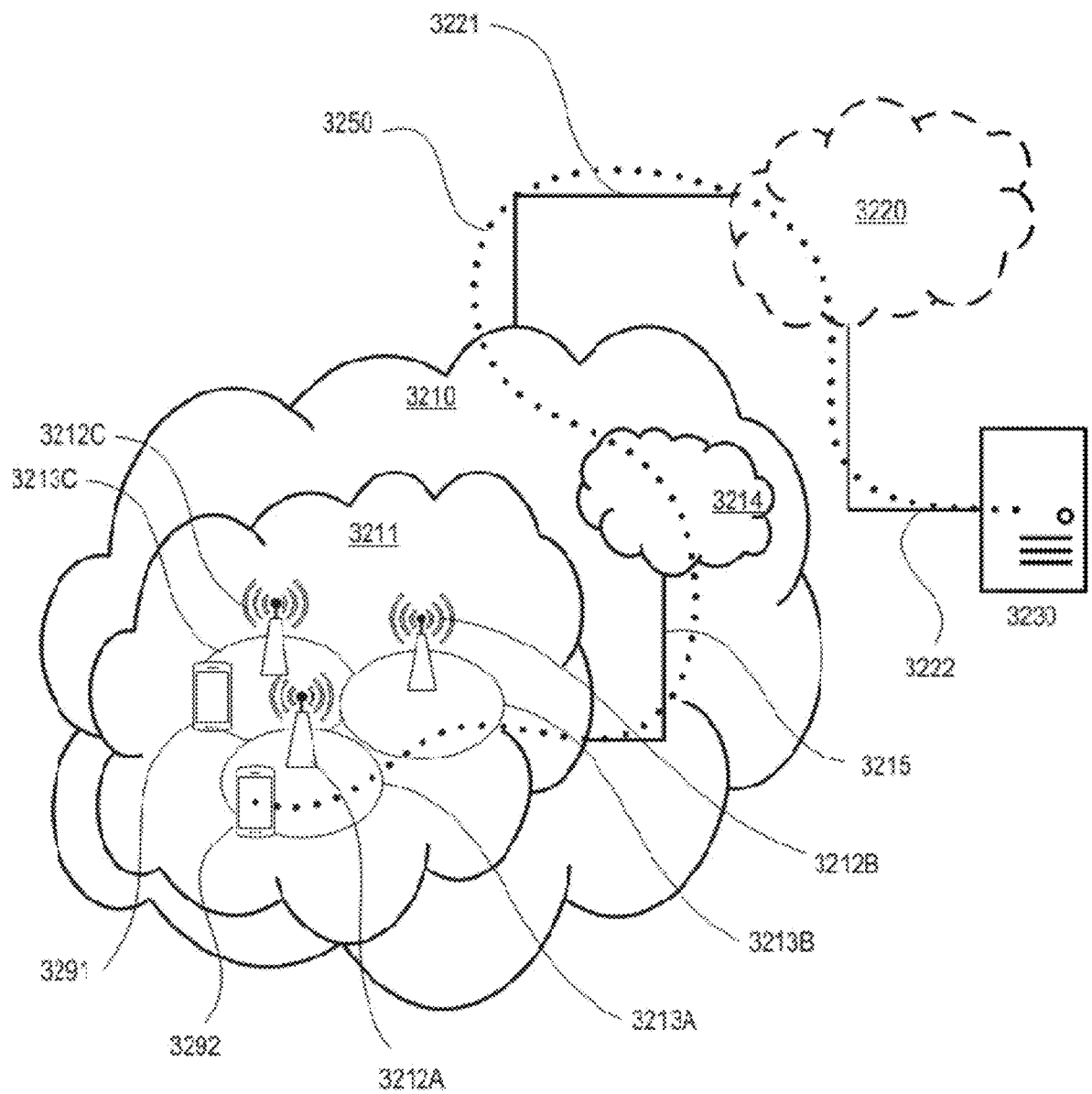
FIG. 11 is a schematic block diagram illustrating a telecommunication network connected via an intermediate network to a host computer.

With reference to FIG. 11, in accordance with an embodiment, a communication system comprises telecommunication network 3210 such as the communications network 400, for example, a 3GPP-type cellular network, which comprises access network 3211, such as a radio access network, and core network 3214. Access network 3211 comprises a plurality of network nodes 403. Base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to core network 3214 over a wired or wireless connection 3215. A plurality of user equipments, such as the UE 101 may be comprised in the communications network 400. In fig., a first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in FIG. 11, there may be a situation where a sole UE is in the coverage area or where a sole UE is connecting to the corresponding base station 3212. Any of the UEs 3291, 3292 may be considered examples of the UE 101.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication network 400 of FIG. 11 as a whole enables connectivity between the connected UEs 3291, 3292 and host computer 3230. The connectivity may be described as an Over-The-Top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. Base station 3212 may not or need not be informed about the past routing of an incoming downlink communication with data originating from host computer 3230 to be forwarded or handed over to a connected UE 3291. Similarly, base station 3212 need not be aware of the future routing of an outgoing uplink communication originating from the UE 3291 towards the host computer 3230.

In relation to FIGS. 330-370 which are described next, it may be understood that the base station may be considered an example of the network node 403.

Figure 12:
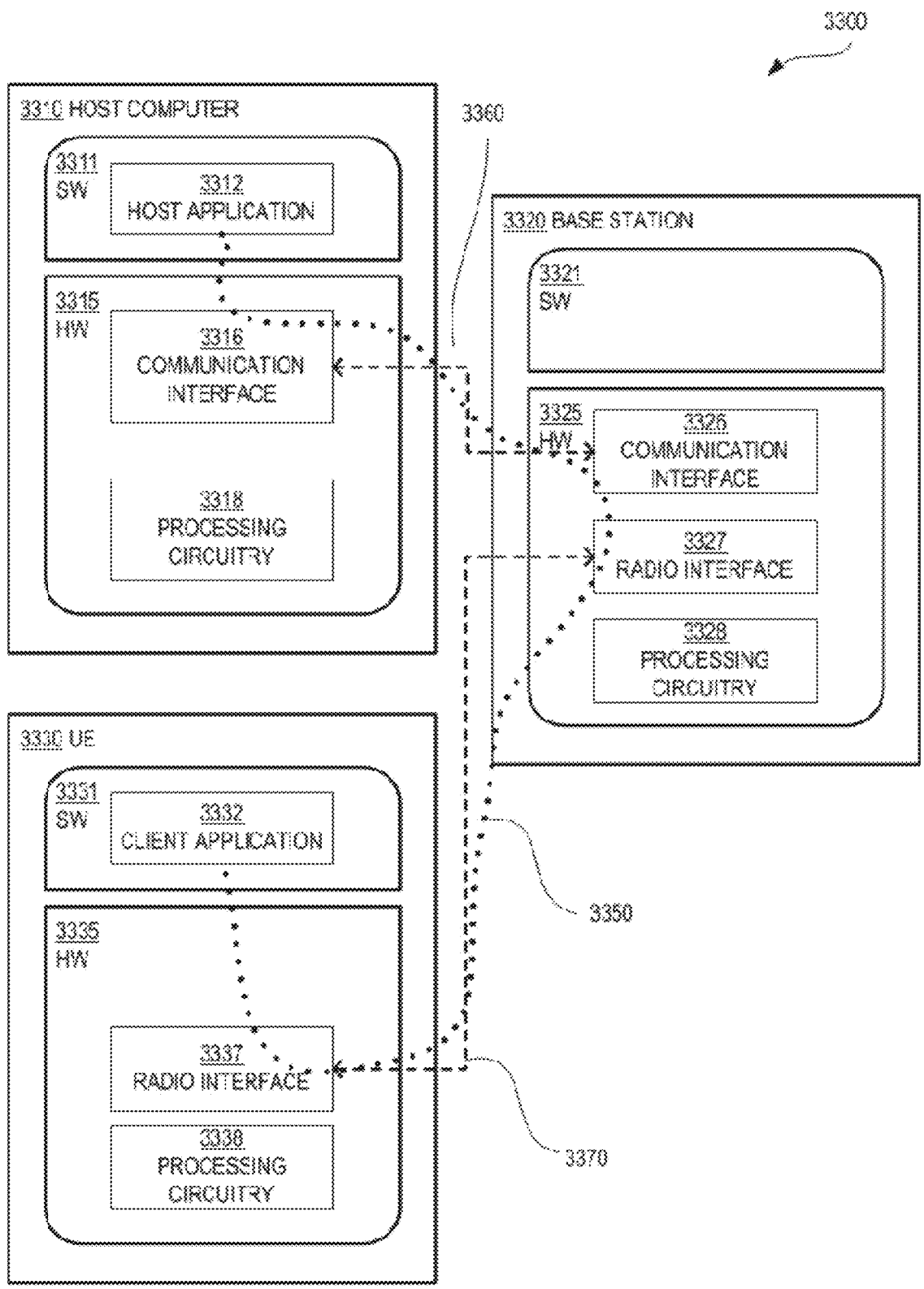
FIG. 12 is a schematic block diagram of a host computer communicating via a base station with a UE over a partially wireless connection.

FIG. 12 illustrates a host computer communicating via a network node 403 with a UE 101 20 over a partially wireless connection. The network node 403 may be the first network node 403*a* or the second network node 403*b*.

The UE 101 and the network node 403, e.g., a base station and host computer discussed in the preceding paragraphs will now be described with reference to FIG. 12. In communication system 3330, such as the communications network 400, host computer 3310 comprises hardware 3315 comprising communication interface 3316 configured to set up and maintain a wired or wireless connection with an interface of a different communication device of communication system 3300. Host computer 3310 comprises processing circuitry 3318, which may have storage and/or processing capabilities. Processing circuitry 3318 may comprise one or more programmable processors, application-specific integrated circuits, field programmable gate arrays or combinations of these (not shown) adapted to execute instructions. Host computer 3310 comprises software 3311, which is stored in or accessible by host computer 3310 and executable by processing circuitry 3318. Software 3311 comprises host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 comprises the network node 403 exemplified in FIG. 12 as a base station 3320 provided in a telecommunication system and comprising hardware 3325 enabling it to communicate with host computer 3310 and with UE 3330. Hardware 3325 may comprise communication interface 3326 for setting up and maintaining a wired or wireless connection with an interface of a different communication device of communication system 3300, as well as radio interface 3327 for setting up and maintaining at least wireless connection 3370 with the UE 101, exemplified in FIG. 12 as a UE 3330 located in a coverage area served by base station 3320. Communication interface 3326 may be configured to facilitate connection 3360 to host computer 3310. Connection 3360 may be direct or it may pass through a core network (not shown in FIG. 12) of the telecommunication system and/or through one or more intermediate networks outside the telecommunication system. Hardware 3325 of base station 3320 may comprise processing circuitry 3328, which may comprise one or more programmable processors, application-specific integrated circuits, field programmable gate arrays or combinations of these (not shown) adapted to execute instructions. Base station 3320 may have software 3321 stored internally or accessible via an external connection.

Communication system 3300 comprises UE 3330 already referred to. It's hardware 3335 may comprise radio interface 3337 configured to set up and maintain wireless connection 3370 with a base station serving a coverage area in which UE 3330 is currently located. Hardware 3335 of UE 3330 comprises processing circuitry 3338, which may comprise one or more programmable processors, application-specific integrated circuits, field programmable gate arrays or combinations of these (not shown) adapted to execute instructions. UE 3330 comprises software 3331, which is stored in or accessible by UE 3330 and executable by processing circuitry 3338. Software 3331 comprises client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 12 may be similar or identical to host computer 3230, one of base stations 3212*a*, 3212*b*, 3212*c* and one of UEs 3291, 3292 of FIG. 11, respectively. This is to say, the inner workings of these entities may be as shown in FIG. 12 and independently, the surrounding network topology may be that of FIG. 11.

In FIG. 12, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may take decisions by which it dynamically changes the routing, e.g., on the basis of load balancing consideration or reconfiguration of the network.

The present disclosure improves the performance of OTT services provided to UE 3330 using OTT connection 3350, in which wireless connection 3370 forms the last segment. More precisely, the present disclosure may improve the spectrum efficiency, and latency, and thereby provide benefits such as reduced user waiting time, better responsiveness and extended battery lifetime.

A measurement procedure may be provided for the purpose of monitoring data rate, latency and other factors on which the present disclosure improve. There may be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. Sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may comprise message format, retransmission settings, preferred routing etc. The reconfiguring need not affect base station 3320, and it may be unknown or imperceptible to base station 3320. Measurements may comprise proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

FIG. 13 illustrates a communication system comprising a host computer, a base station and a user equipment. FIG. 13 is a flowchart illustrating a method implemented in a communication system. The communication system comprises a host computer, a base station and a UE which may be those described with reference to FIG. 11 and FIG. 12. For simplicity of the present disclosure, only drawing references to FIG. 13 will be comprised in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated. In step 3440 (which may also be optional), the UE executes a client application associated with the host application executed by the host computer.

FIG. 14 illustrates methods implemented in a communication system comprising a host computer, a base station and a UE. FIG. 14 is a flowchart illustrating a method implemented in a communication system. The communication system comprises a host computer, a base station and a UE which may be those described with reference to FIG. 11 and FIG. 12. For simplicity, only drawing references to FIG. 14 will be comprised in this section. In step 3510 of the method, the host computer provides user data. In an optional substep (not shown) the host computer provides the user data by executing a host application. In step 3520, the host computer initiates a transmission carrying the user data to the UE. The transmission may pass via the base station. In step 3530 (which may be optional), the UE receives the user data carried in the transmission.

FIG. 15 illustrates methods implemented in a communication system comprising a host computer, a base station and a UE. FIG. 15 is a flowchart illustrating a method implemented in a communication system. The communication system comprises a host computer, a first network node 103 and a UE 101 which may be those described with reference to FIG. 11 and FIG. 12. For simplicity, only drawing references to FIG. 15 will be comprised in this section. In step 3610 (which may be optional), the UE 101 receives input data provided by the host computer. Additionally or alternatively, in step 3620, the UE 101 provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may consider user input received from the user.

Regardless of the specific manner in which the user data was provided, the UE initiates, in substep 3630 (which may be optional), transmission of the user data to the host computer. In step 3640 of the method, the host computer receives the user data transmitted from the UE.

FIG. 16 illustrates methods implemented in a communication system comprising a host computer, a base station and a UE. FIG. 16 is a flowchart illustrating a method implemented in a communication system. The communication system comprises a host computer, a base station and a UE which may be those described with reference to FIG. 11 and FIG. 12. For simplicity, only drawing references to FIG. 16 will be comprised in this section. In step 3710 (which may be optional), the base station receives user data from the UE. In step 3720 (which may be optional), the base station initiates transmission of the received user data to the host computer. In step 3730 (which may be optional), the host computer receives the user data carried in the transmission initiated by the base station.

Some embodiments may be summarized as follows:

A base station configured to communicate with a UE 101, the base station comprising a radio interface and processing circuitry configured to perform one or more of the actions described herein as performed by the first network node 403a.

A communication network 400 comprising a host computer comprising:
processing circuitry configured to provide user data; and
a communication interface configured to forward the user data to a cellular network for transmission to a UE 101,
wherein the cellular network comprises a first network node 103 having a radio interface and processing circuitry, the base station's processing circuitry configured to perform one or more of the actions described herein as performed by the first network node 403a.

The communication network 400 may comprise the first network node 403a.

The communication network 400 may comprise the UE 101, wherein the UE 101 is configured to communicate with the first network node 403a.

The communication network 400, wherein:
the processing circuitry of the host computer is configured to execute a host application, thereby providing the user data; and
the UE 101 comprises processing circuitry configured to execute a client application associated with the host application.

A method implemented in a first network node 403a, comprising one or more of the actions described herein as performed by the first network node 403a.

A method implemented in a communication network 400 comprising a host computer, a base station and a UE 101, the method comprising:
at the host computer, providing user data; and
at the host computer, initiating a transmission carrying the user data to the UE 101 via a cellular network comprising the first network node 403a, wherein the first network node 403a performs one or more of the actions described herein as performed by the first network node 403a.

The method may comprise:
at the first network node 403a, transmitting the user data.
The user data may be provided at the host computer by executing a host application, and the method may comprise:
at the UE 101, executing a client application associated with the host application.

A UE 101 configured to communicate with a first network node 103, the UE 101 comprising a radio interface and processing circuitry configured to perform one or more of the actions described herein as performed by the UE 101.

A communication network 400 comprising a host computer comprising:
processing circuitry configured to provide user data; and
a communication interface configured to forward user data to a cellular network for transmission to a UE 101,
wherein the UE comprises a radio interface and processing circuitry, the UE's processing circuitry configured to perform one or more of the actions described herein as performed by the UE 101.

The communication network 400 may comprise the UE 101.

The communication network 400, wherein the cellular network comprises a first network node 403a configured to communicate with the UE 101.

The communication network 400, wherein:

the processing circuitry of the host computer is configured to execute a host application, thereby providing the user data; and the UE's processing circuitry is configured to execute a client application associated with the host application.

A method implemented in a UE 101, comprising one or more of the actions described herein as performed by the UE 101.

A method implemented in a communication network 400 comprising a host computer, a first network node 403a and a UE 101, the method comprising:

at the host computer, providing user data; and at the host computer, initiating a transmission carrying the user data to the UE 101 via a cellular network comprising the base station, wherein the UE 101 performs one or more of the actions described herein as performed by the UE 101.

The method may comprise:

at the UE 101, receiving the user data from the first network node 403a.

A UE 101 configured to communicate with a first network node 403a, the UE 101 comprising a radio interface and processing circuitry configured to perform one or more of the actions described herein as performed by the UE 101.

A communication network 400 comprising a host computer comprising:

a communication interface configured to receive user data originating from a transmission from a UE 101 to a first network node 403a, wherein the UE 101 comprises a radio interface and processing circuitry, the UE's processing circuitry configured to: perform one or more of the actions described herein as performed by the UE 101.

The communication network 400 may comprise the UE 101.

The communication network 400 may comprise the first network node 403a, wherein the first network node 403a comprises a radio interface configured to communicate with the UE 101 and a communication interface configured to forward to the host computer the user data carried by a transmission from the UE 101 to the first network node 403a.

The communication network 400, wherein:

the processing circuitry of the host computer is configured to execute a host application; and the UE's processing circuitry is configured to execute a client application associated with the host application, thereby providing the user data.

The communication network 400, wherein:

the processing circuitry of the host computer is configured to execute a host application, thereby providing request data; and the UE's processing circuitry is configured to execute a client application associated with the host application, thereby providing the user data in response to the request data.

A method implemented in a UE 101, comprising one or more of the actions described herein as performed by the UE 101.

The method may comprise:

providing user data; and forwarding the user data to a host computer via the transmission to the first network node 403a.

A method implemented in a communication network 400 comprising a host computer, a first network node 403a and a UE 101, the method comprising:

at the host computer, receiving user data transmitted to the first network node 403a from the UE 101, wherein the UE 101 performs one or more of the actions described herein as performed by the UE 101.

The method may comprise:

at the UE 101, providing the user data to the first network node 403a.

The method may comprise:

at the UE 101, executing a client application, thereby providing the user data to be transmitted; and at the host computer, executing a host application associated with the client application.

The method may comprise:

at the UE 101, executing a client application; and at the UE 101, receiving input data to the client application, the input data being provided at the host computer by executing a host application associated with the client application, wherein the user data to be transmitted is provided by the client application in response to the input data.

A first network node 403a configured to communicate with a UE 101, the first network node 403a comprising a radio interface and processing circuitry configured to perform one or more of the actions described herein as performed by the first network node 403a.

A communication network 400 comprising a host computer comprising a communication interface configured to receive user data originating from a transmission from a UE 101 to a base station, wherein the first network node 403a comprises a radio interface and processing circuitry, the base station's processing circuitry configured to perform one or more of the actions described herein as performed by the first network node 403a.

The communication network 400 may comprise the first network node 403a.

The communication network 400 may comprise the UE 101, wherein the UE 101 is configured to communicate with the first network node 403a.

The communication network 400 wherein:

the processing circuitry of the host computer is configured to execute a host application;

the UE 101 is configured to execute a client application associated with the host application, thereby providing the user data to be received by the host computer.

A method implemented in a first network node 403a, comprising one or more of the actions described herein as performed by any of the first network node 403a.

A method implemented in a communication network 400 comprising a host computer, a first network node 403a and a UE 101, the method comprising:

at the host computer, receiving, from the first network node 403a, user data originating from a transmission which the base station has received from the UE 101, wherein the UE 101 performs one or more of the actions described herein as performed by the UE 101.

The method may comprise:

at the first network node 103, receiving the user data from the UE 101.

The method may comprise:
at the first network node 103, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step.

In general, the usage of "first", "second", "third", "fourth", and/or "fifth" herein may be understood to be an arbitrary way to denote different elements or entities, and may be understood to not confer a cumulative or chronological character to the nouns they modify, unless otherwise noted, based on context.

The term "at least one of A and B" should be understood to mean "only A, only B, or both A and B.", where A and B are any parameter, number, indication used herein etc.

It should be emphasized that the term "comprises/comprising" when used herein is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods may, without departing from the present disclosure, be performed in another order than the order in which they appear herein.

The invention claimed is:

1. A method performed by a User Equipment, UE, for handling mobility information in a communications network, the method comprising:
predicting the mobility information, wherein the mobility information is associated with a mobility procedure wherein the mobility procedure is a conditional handover; and
reporting the predicted mobility information to a first network node currently serving the UE in the communications network.

2. The method according to claim 1, wherein the predicted mobility information is reported periodically or when triggered by a measurement event.

3. The method according to claim 1, wherein the mobility information comprises one or more radio quality related parameters, and wherein the one or more radio quality related parameters comprises one or more of: a Reference Signals Received Power, RSRP, a Reference Signal Received Quality, RSRQ, a Signal to Interference plus Noise Ratio, SINR, a list of one or more cells, a list of one or more beams, a list of one or more Reference Signals, RS, type coverage the UE is moving to, time information wherein the RSRP, RSRQ and SINR are for a frequency and in different levels of granularities.

4. The method according to claim 1, wherein the predicted mobility information is comprised in a measurement report when being reported to the first network node.

5. The method according to claim 1, wherein the predicted mobility information is reported when the UE is in connected state.

6. The method according to claim 1, comprising:
obtaining a prediction model from the first network node, wherein the prediction model indicates how to perform the prediction of the mobility information; and
wherein the mobility information is predicted using the prediction model.

7. The method according to claim 6, wherein the prediction model is obtained for a first time; or
wherein the prediction model is an updated prediction model that replaces a previously obtained prediction model.

8. The method according to claim 1, comprising:
receiving network node information for network nodes associated with the UE; and
reporting the received network node information to the first network node.

9. The method according to claim 1, wherein the prediction of the mobility information is based one or more input parameters, and
wherein the one or more input parameters are at least one of: network node information, sensor information, UE connection parameters, mobility history parameters and time information.

10. A method performed by a first network node for handling mobility information in a communications network, the method comprising:
obtaining predicted mobility information from a User Equipment, UE, which UE the first network node currently serves, wherein the mobility information is associated with a mobility procedure wherein the mobility procedure is a conditional handover;
based on the predicted mobility information, determining to:
initiate a mobility procedure associated with the UE; and
initiating the mobility procedure.

11. The method according to claim 10, wherein the predicted mobility information is obtained periodically or when triggered by a measurement event.

12. The method according to claim 10, comprising:
obtaining, from the UE, network node information for network nodes associated with the UE.

13. The method according to claim 10, wherein the mobility information comprises one or more radio quality related parameters, and wherein the one or more radio quality related parameters comprises one or more of: a Reference Signals Received Power, RSRP, a Reference Signal Received Quality, RSRQ, a Signal to Interference plus Noise Ratio, SINR, a list of one or more cells, a list of one or more beams, a list of one or more Reference Signals, RS, type coverage the UE is moving to, time information wherein the RSRP, RSRQ and SINR are for a frequency and in different levels of granularities.

14. The method according to claim 10, wherein the predicted mobility information is comprised in a measurement report when being obtained from the first UE.

15. The method according to claim 10, comprising:
providing a prediction model to UE, wherein the prediction model indicates how to perform a prediction of the mobility information.

16. The method according to claim 15, wherein the prediction model is provided for a first time; or
  wherein the prediction model is an updated prediction model that replaces a previously provided prediction model.

17. A User Equipment, UE, for handling mobility information in a communications network, the UE being configured to:
  predict the mobility information, wherein the mobility information is associated with a mobility procedure wherein the mobility procedure is a conditional handover; and
  report the predicted mobility information to a first network node currently serving the UE in the communications network.

18. A first network node for handling mobility information in a communications network, the first network node being configured to:
  obtain predicted mobility information from a User Equipment, UE, which UE the first network node currently serves, wherein the mobility information is associated with a mobility procedure wherein the mobility procedure is a conditional handover;
  based on the predicted mobility information, determine to initiate a mobility procedure associated with the UE; and
  initiate the mobility procedure.

* * * * *